US012614190B2

(12) United States Patent
Wilson et al.

(10) Patent No.: US 12,614,190 B2
(45) Date of Patent: Apr. 28, 2026

(54) GRAPHICAL USER INTERFACE INCLUDING ISSUE QUEUE MANAGEMENT FOR AN ISSUE TRACKING SYSTEM

(71) Applicant: Atlassian Pty Ltd., Sydney (AU)

(72) Inventors: David Wilson, Sydney (AU); Kimberly Rawsthorne, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 170 days.

(21) Appl. No.: 18/375,293

(22) Filed: Sep. 29, 2023

(65) Prior Publication Data

US 2025/0111380 A1 Apr. 3, 2025

(51) Int. Cl.
*G06Q 30/016* (2023.01)
*G06F 3/0482* (2013.01)

(52) U.S. Cl.
CPC ......... *G06Q 30/016* (2013.01); *G06F 3/0482* (2013.01)

(58) Field of Classification Search
CPC ............................ G06Q 30/016; G06F 3/0482
See application file for complete search history.

(56) References Cited

U.S. PATENT DOCUMENTS

| | | | |
|---|---|---|---|
| 11,556,225 B1 * | 1/2023 | Romagnoli .... | G06Q 10/063114 |
| 11,769,017 B1 * | 9/2023 | Gray ....................... | G06F 40/56 |
| | | | 704/9 |
| 2018/0239507 A1 * | 8/2018 | Bui ....................... | G06F 3/0482 |
| 2021/0097070 A1 * | 4/2021 | Robichaud ............ | G06F 3/0482 |

* cited by examiner

*Primary Examiner* — Cao H Nguyen

(74) *Attorney, Agent, or Firm* — Brownstein Hyatt Farber Schreck, LLP

(57) ABSTRACT

A computer-implemented method for defining and creating a request intake flow for an issue tracking system is described. Embodiments described herein include systems and techniques for creating custom portal intake flows for an issue tracking system. The systems may include a user interface that allows portal intake flows to be generated and the user to select the information and workflow for an intake flow during the generation process. Embodiments are also directed to system and methods for creating dynamic summaries for issues managed by an issue tracking system. The dynamic summaries may be generated using a generative output model, as described herein, and provide information to a user about a current status, history or other events associated with an issue. Embodiments are directed to systems and methods for using a generative output engine to provide suggestions for creating a project management interface for an issue tracking system.

17 Claims, 27 Drawing Sheets

200b

300a

400

502

606

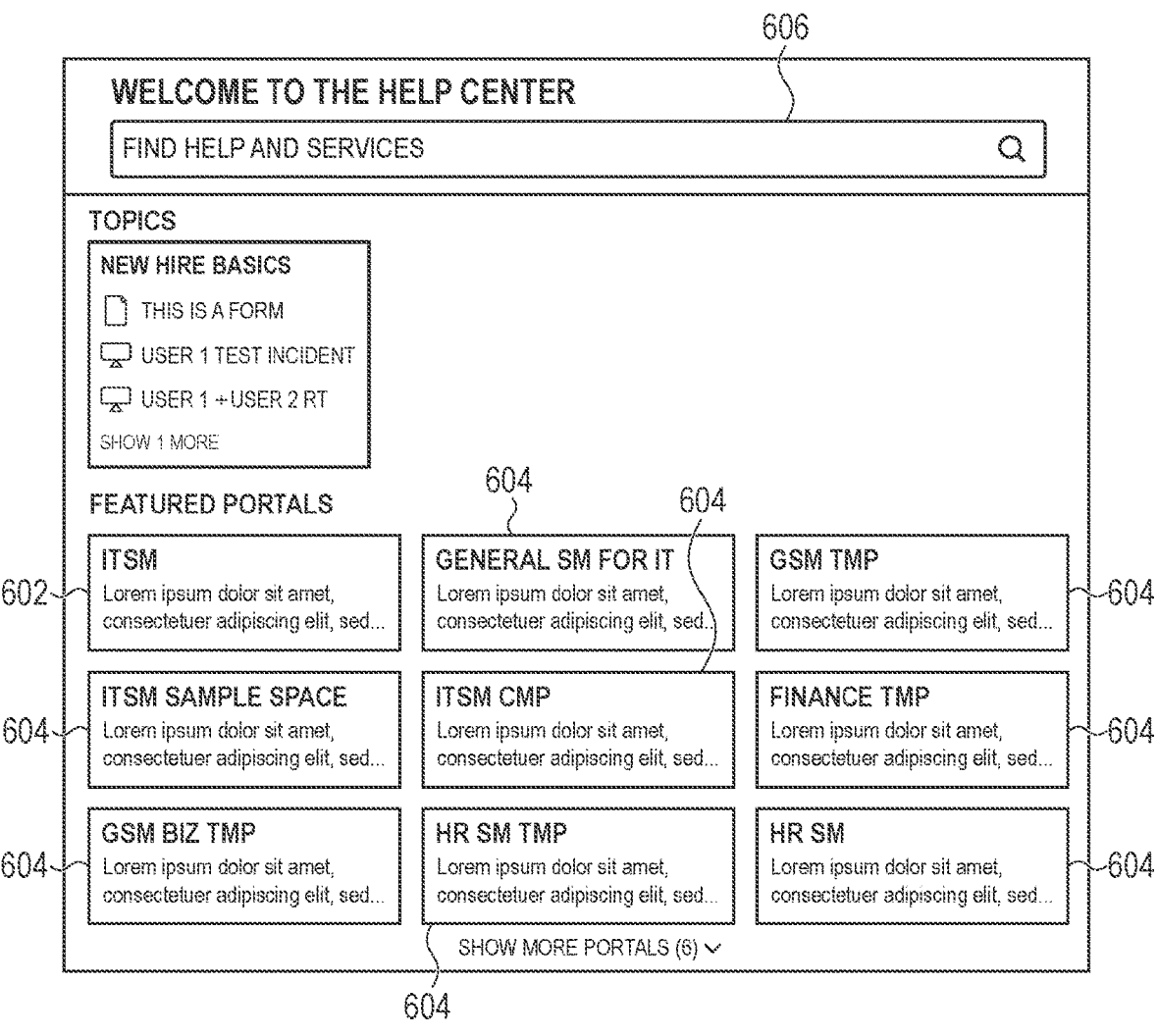

WELCOME TO THE HELP CENTER

FIND HELP AND SERVICES                                    🔍

TOPICS

NEW HIRE BASICS

📄 THIS IS A FORM

🖥 USER 1 TEST INCIDENT

🖥 USER 1 +USER 2 RT

SHOW 1 MORE

FEATURED PORTALS 604                    604

ITSM
Lorem ipsum dolor sit amet,
consectetuer adipiscing elit, sed...

GENERAL SM FOR IT
Lorem ipsum dolor sit amet,
consectetuer adipiscing elit, sed...

GSM TMP
Lorem ipsum dolor sit amet,
consectetuer adipiscing elit, sed...

602                                                        604

ITSM SAMPLE SPACE
Lorem ipsum dolor sit amet,
consectetuer adipiscing elit, sed...

ITSM CMP
Lorem ipsum dolor sit amet,
consectetuer adipiscing elit, sed...

FINANCE TMP
Lorem ipsum dolor sit amet,
consectetuer adipiscing elit, sed...

604                                                        604

GSM BIZ TMP
Lorem ipsum dolor sit amet,
consectetuer adipiscing elit, sed...

HR SM TMP
Lorem ipsum dolor sit amet,
consectetuer adipiscing elit, sed...

HR SM
Lorem ipsum dolor sit amet,
consectetuer adipiscing elit, sed...

604                                                        604

SHOW MORE PORTALS (6) ⌄

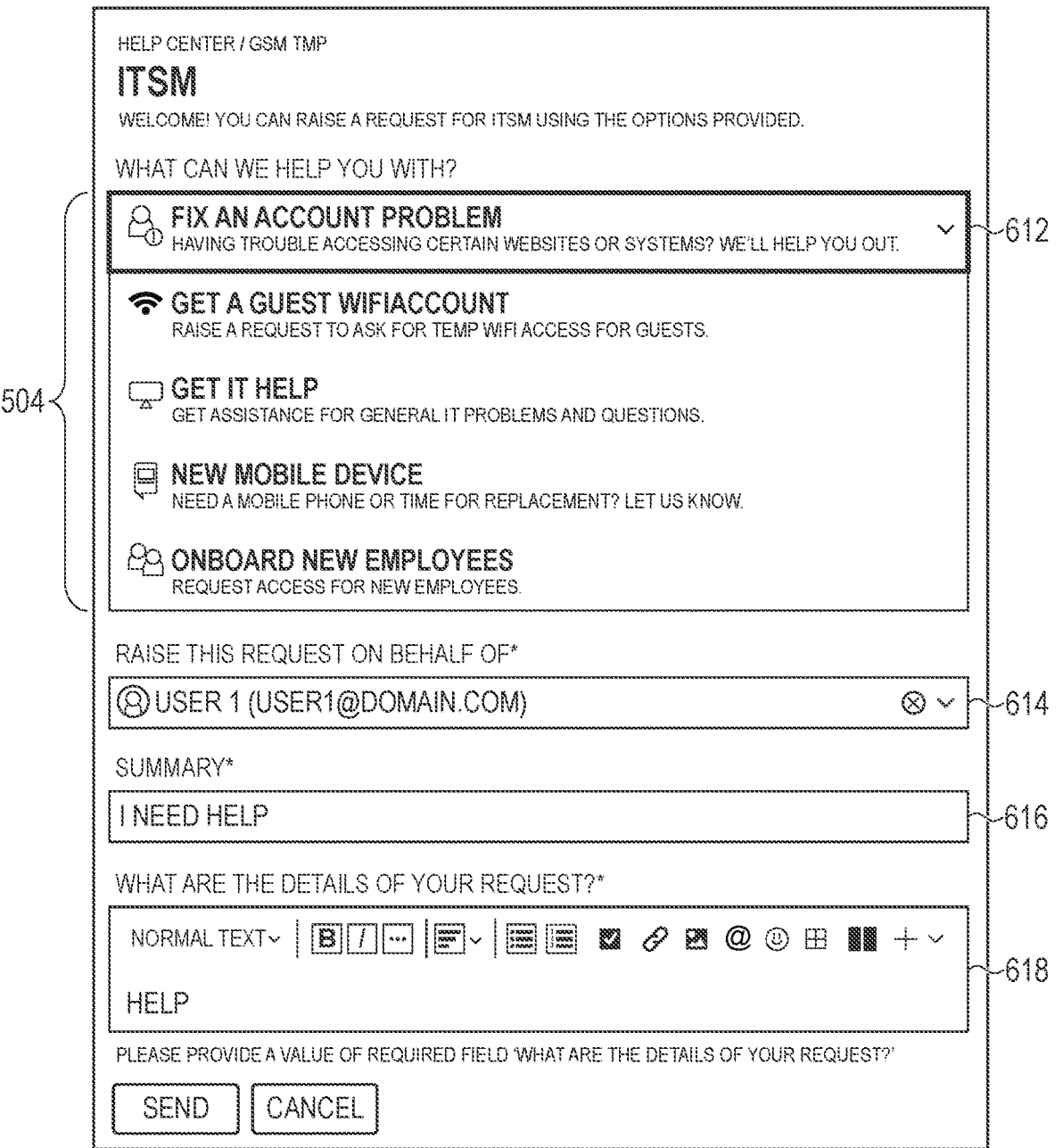

HELP CENTER / GSM TMP

ITSM

WELCOME! YOU CAN RAISE A REQUEST FOR ITSM USING THE OPTIONS PROVIDED.

WHAT CAN WE HELP YOU WITH?

FIX AN ACCOUNT PROBLEM
HAVING TROUBLE ACCESSING CERTAIN WEBSITES OR SYSTEMS? WE'LL HELP YOU OUT.
  —612

GET A GUEST WIFI ACCOUNT
RAISE A REQUEST TO ASK FOR TEMP WIFI ACCESS FOR GUESTS.

GET IT HELP
GET ASSISTANCE FOR GENERAL IT PROBLEMS AND QUESTIONS.

NEW MOBILE DEVICE
NEED A MOBILE PHONE OR TIME FOR REPLACEMENT? LET US KNOW.

ONBOARD NEW EMPLOYEES
REQUEST ACCESS FOR NEW EMPLOYEES.

504

RAISE THIS REQUEST ON BEHALF OF*

USER 1 (USER1@DOMAIN.COM)    ⊗ ∨   —614

SUMMARY*

I NEED HELP   —616

WHAT ARE THE DETAILS OF YOUR REQUEST?*

NORMAL TEXT ∨ | B *I* ⋯ | ▤ ∨ | ▤ ▤ ☑ 𝒪 ▨ @ ☺ ⊞ ▥ + ∨   —618

HELP

PLEASE PROVIDE A VALUE OF REQUIRED FIELD 'WHAT ARE THE DETAILS OF YOUR REQUEST?'

[ SEND ] [ CANCEL ]

DISPLAY A FIRST INTERFACE FOR SELECTING AND CONFIGURING AN INTAKE REQUEST TYPE ~702

RECEIVE USER INPUTS TO THE FIRST INTERFACE ~704

DISPLAY A SECOND INTERFACE FOR SELECTING AND CONFIGURING A WORKFLOW TYPE ~706

RECEIVE USER INPUTS TO THE SECOND INTERFACE ~708

GENERATE A NEW PORTAL INTAKE FLOW USING USER INPUTS TO THE FIRST AND SECOND INTERFACES ~710

FIG. 13

1400
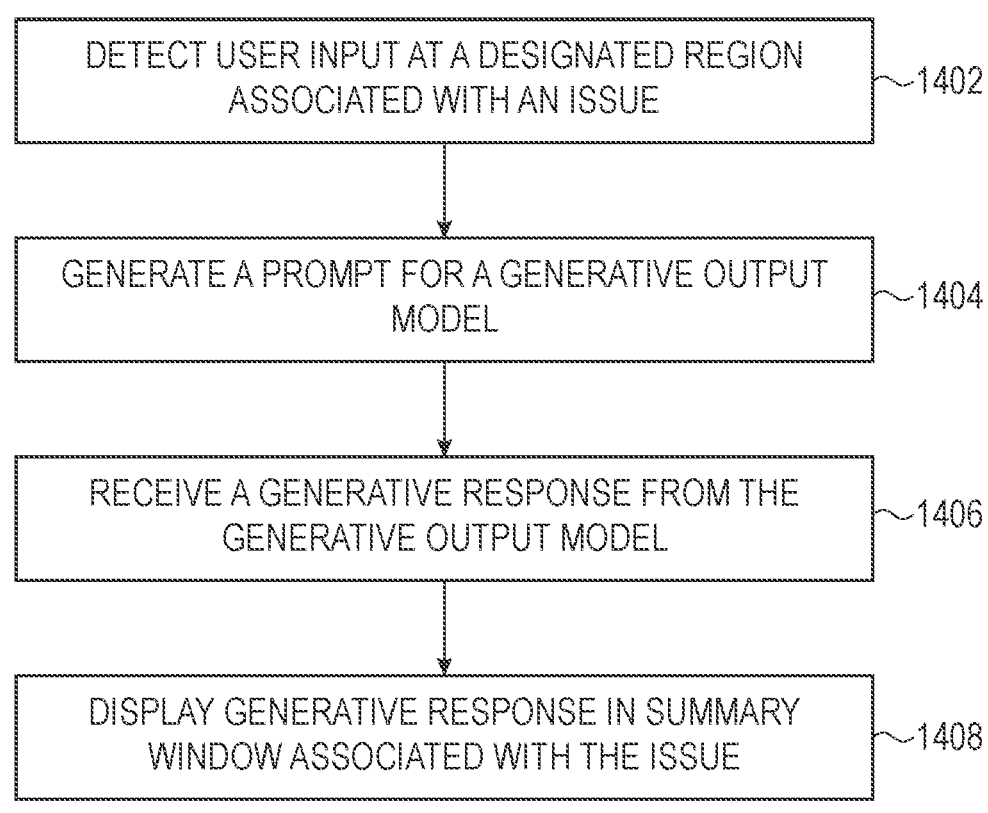
| DETECT USER INPUT AT A DESIGNATED REGION ASSOCIATED WITH AN ISSUE | ~1402 |
| GENERATE A PROMPT FOR A GENERATIVE OUTPUT MODEL | ~1404 |
| RECEIVE A GENERATIVE RESPONSE FROM THE GENERATIVE OUTPUT MODEL | ~1406 |
| DISPLAY GENERATIVE RESPONSE IN SUMMARY WINDOW ASSOCIATED WITH THE ISSUE | ~1408 |
*FIG. 14*

CREATE NEW PROJECT WITH ATLASSIAN INTELLIGENCE

PROJECT DESCRIPTION

*I'M HERE TO HELP YOU CONFIGURE YOUR PROJECT.*
*TELL ME HOW YOU WANT TO USE THIS PROJECT.*

✳ ATLASSIAN INTELLIGENCE        [CANCEL] [ESC] [GO ↵]       ～1704

PROJECT DESCRIPTION

[🖼]  *ENTER A PROJECT NAME*        ～1706

TEAM

[👥 *HR*                                              ⌄]       ～1708

⊘ SAMPLE DATA ～1710

[CANCEL] [GENERATE]  ～1712

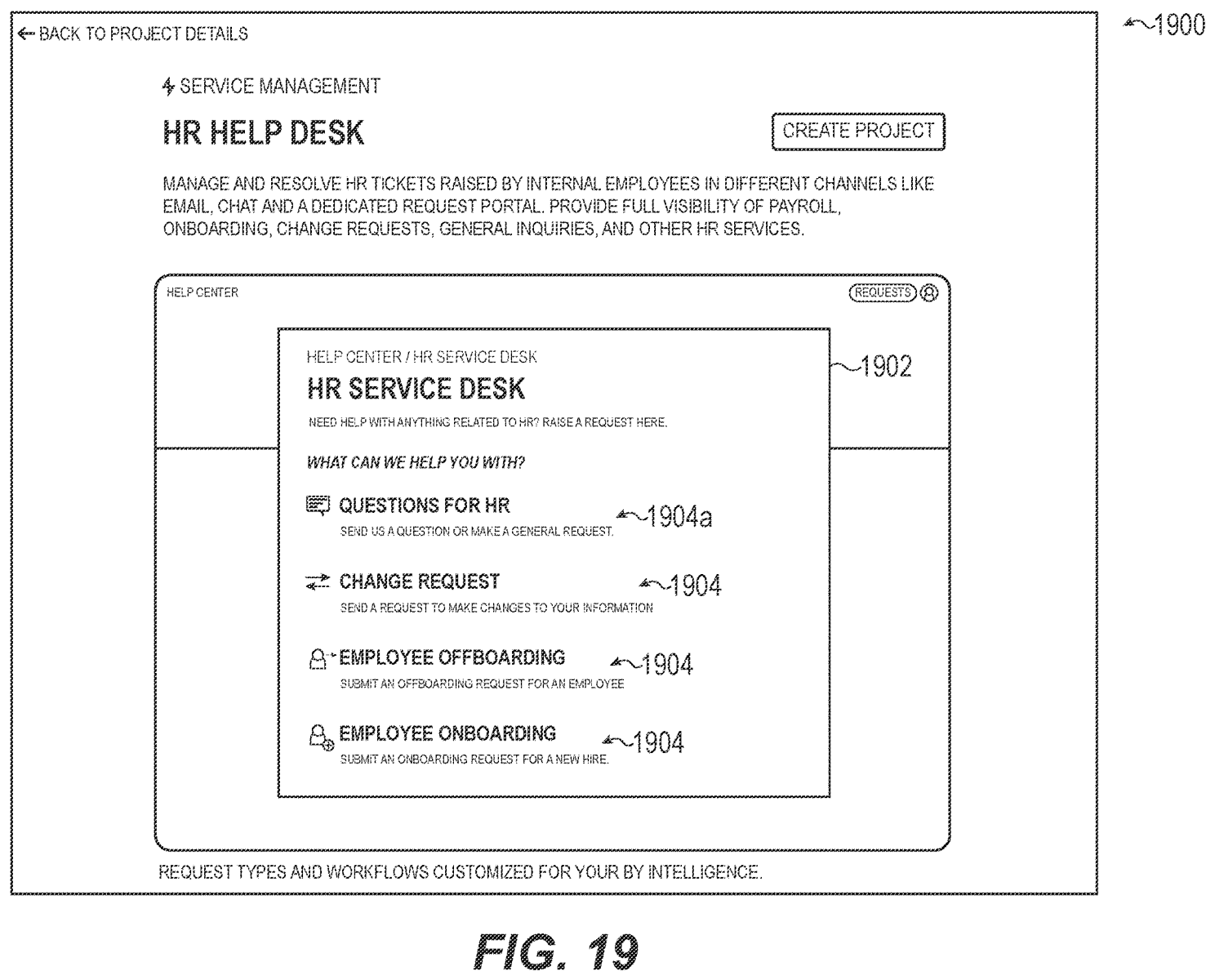

← 1900

← BACK TO PROJECT DETAILS

↳ SERVICE MANAGEMENT

HR HELP DESK

MANAGE AND RESOLVE HR TICKETS RAISED BY INTERNAL EMPLOYEES IN DIFFERENT CHANNELS LIKE EMAIL, CHAT AND A DEDICATED REQUEST PORTAL. PROVIDE FULL VISIBILITY OF PAYROLL, ONBOARDING, CHANGE REQUESTS, GENERAL INQUIRIES, AND OTHER HR SERVICES.

CREATE PROJECT

REQUESTS ◉

← 1902

HELP CENTER

HELP CENTER / HR SERVICE DESK

HR SERVICE DESK

NEED HELP WITH ANYTHING RELATED TO HR? RAISE A REQUEST HERE.

*WHAT CAN WE HELP YOU WITH?*

▣ QUESTIONS FOR HR  ← 1904a
SEND US A QUESTION OR MAKE A GENERAL REQUEST.

⇄ CHANGE REQUEST  ← 1904
SEND A REQUEST TO MAKE CHANGES TO YOUR INFORMATION

🙎 EMPLOYEE OFFBOARDING  ← 1904
SUBMIT AN OFFBOARDING REQUEST FOR AN EMPLOYEE

🙎⊕ EMPLOYEE ONBOARDING  ← 1904
SUBMIT AN ONBOARDING REQUEST FOR A NEW HIRE.

REQUEST TYPES AND WORKFLOWS CUSTOMIZED FOR YOUR BY INTELLIGENCE.

*FIG. 19*

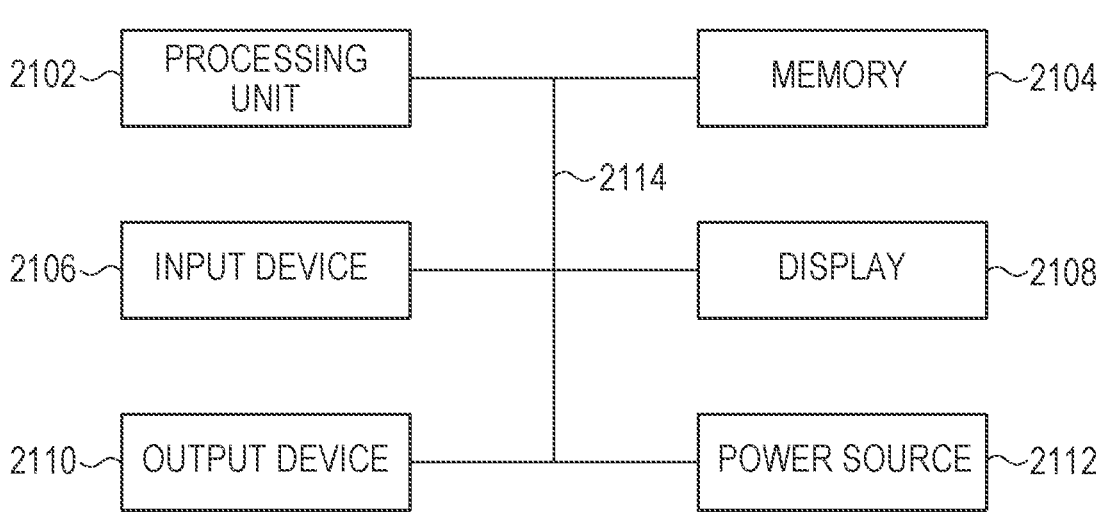
FIG. 21

GRAPHICAL USER INTERFACE INCLUDING ISSUE QUEUE MANAGEMENT FOR AN ISSUE TRACKING SYSTEM

FIELD

The described embodiments relate generally to a system and graphical user interface for generating and managing tickets or issues in an issue tracking platform. More particularly, the present embodiments relate to a system and interface for creating new projects or intake flows for an issue tracking platform.

BACKGROUND

Modern information technology system management employs a variety of software platforms that can be used to assist with the timely resolution of technical problems and software bugs that may be experienced by a user base. Traditionally, these systems are tailored or specially adapted to handle a specific type of technical issue or user problem. Creating new processes or interfaces within existing software can be tedious and time consuming. Similarly, using a common interface for a wide variety of use cases can also be inefficient and result in wasted computing resources. The systems and techniques described herein can be used to easily adapt the processes and interfaces used in a software platform used as an information technology system management system.

SUMMARY

Embodiments are directed to a computer-implemented method for creating a portal intake flow for an issue tracking system. The method can include receiving, at a first web-based service, a request to generate a new portal intake flow for a second web-based service. Subsequent to receiving the request, the method can include causing display of a first interface that includes a first selection panel including a first set of tiles, each tile corresponding to an intake request type for the second web-based service, and a first preview panel including a dynamic preview of an intake interface for a selected tile of the first set of tiles, the dynamic preview including a set of intake fields arranged in accordance with an intake form layout. In response to selecting an intake request type using the first interface, the method can include causing display of a second interface that includes a second selection panel including a second set of tiles, each tile corresponding to a workflow type for processing an issue using the issue tracking system and a second preview panel including a schematic preview of a particular workflow for a selected tile of the second set of tiles. Subsequent to selecting a workflow using the second interface, the method can include creating the new portal intake flow for the second web-based service, where the new portal intake flow is configured to generate a new issue using a particular intake interface configured in accordance with the intake request type and having the particular workflow configured in accordance with the selected workflow.

Embodiments are also directed to a computer-implemented method for creating a portal intake flow for an issue tracking system. The method can include causing display of a first interface, the first interface comprising a first selection panel including a first set of tiles, each tile corresponding to an intake request type for a web-based service. In response to a selection of a tile of the first set of tiles, the method can include causing display, in the first interface, a first preview panel including a dynamic preview of an intake interface for the selected tile, where the dynamic preview includes a set of intake fields arranged in accordance with an intake form layout. In response to selection of an option to add an intake request type to a new portal intake flow, the method can include causing display of a second interface, where the second interface includes a second selection panel including a second set of tiles, each tile corresponding to a workflow type for processing an issue using the issue tracking system. In response to selection of a tile of the second set of tiles, the method can include causing display, in the second interface, of a second preview panel including a schematic preview of a particular workflow for a selected tile of the second set of tiles and subsequent to selecting a workflow using the second interface, creating the new portal intake flow for the web-based service.

Embodiments are further directed to a computer-implemented method for configuring project management features for an issue tracking system. The method can include receiving, at a first web-based service, a request to generate a project management interface for a second web-based service. Subsequent to receiving the request, the method can include causing display of an interface that includes a selection panel including a set of tiles, where each tile corresponds to a feature type for the second web-based service and a selectable option for activating or deactivating the feature type in the project management interface and a preview panel including a dynamic preview of a feature interface for a selected tile of the set of tiles, where the dynamic preview include a set of fields arranged in accordance with a feature interface layout. Subsequent to receiving a first selection for activating a first feature type at the selection panel and a second selection for deactivating a second feature type at the selection panel, the method can include creating a new project management interface for the second web-based service, the new project management interface comprising a first feature interface for the first feature type.

Embodiments are directed to a computer-implemented method for creating dynamic summaries for an issue tracking system. The method can include causing display of a list of issues in a queue, where each issue is displayed in a row and includes at least one selectable element that, in response to a user selection, redirects the user to an issue detail view for the issue associated with the selectable element and an action count indicating activity for the issue. In response to a user input over a designated region of a particular row in the list of issues, the method can include generating a summary window, where the generation of the summary window includes identifying an issue corresponding to the designated region of the particular row, extracting content from a set of fields corresponding to the issue generating a prompt including predetermined text directed to a command and the extracted content from the set of fields, and transmitting the prompt to a generative output model. In response to transmitting the prompt to the generative output model, the method can include receiving a generative response and causing display of the summary window over at least a portion the list of issues in the queue, where the summary window includes at least a portion of the generative response.

Embodiments are also directed to a computer-implemented method for creating dynamic summaries for groups of issues managed by an issue tracking system. The method can include causing display of an interface that includes a list of issues in a queue, where each issue is displayed in a row and includes at least one selectable element that, in response to a user selection, redirects the user to an issue detail view for the issue associated with the selectable element. The interface can also include a selectable element for selecting a grouping category for the list of issues in the queue. In response to a selection of a particular grouping category, the method can include assigning each issue in the list of issues to a group in accordance with the grouping category and causing the interface to display the list of issues in accordance with an assigned group for each issue. In response to a user input over a designated region of a particular group in the list of issues, the method can include generating a summary window that includes retrieving content corresponding to issues assigned to the particular group, generating a prompt including predetermined text directed to a command and the retrieved content corresponding to the issues assigned to the particular group and transmitting the prompt to a generative output model. In response to transmitting the prompt to the generative output model, the method can include receiving a generative response and causing display of the summary window over at least a portion the particular group, where the summary window comprised at least a portion of the generative response.

Embodiments are further directed to a server system that includes a memory allocation defined by a data store storing one or more executable assets and a working memory allocation; and a processor allocation configured to load the one or more executable assets from the data store and into the working memory allocation to instantiate an instance of a client application on a client device. The one or more executable assets can be configured to cause display of a list of issues in a queue, where each issue is displayed in a row and includes at least one selectable element that, in response to a user selection, redirects the user to an issue detail view for the issue associated with the selectable element. In response to a user input over a designated region of a particular row in the list of issues, the processor can generate a summary window that includes generating a prompt including predetermined text directed to a command and extracted content for the issue and transmitting the prompt to a generative output model. In response to transmitting the prompt to the generative output model, the process or can receive a generative response and cause display of the summary window over at least a portion the list of issues in the queue, where the summary window includes at least a portion of the generative response.

Embodiments are directed to a computer-implemented method for creating a project management interface for an issue tracking system. The method can include causing display of a project creation interface comprising an input region for receiving user input describing the project. In response to receiving natural language text as user input at the input region, the method can include generating a prompt that includes at least a portion the natural language text and predetermined text directed to a command. The method can include transmitting the prompt to a generative output model, and in response to transmitting the prompt to the generative output model, receiving a generative response. The method can include generating the project management interface using the generative response and causing display of a preview panel including a dynamic preview of the project management interface, where the dynamic preview includes a subset of the set of project intake flows identified using the generative response.

Embodiments are also directed to a computer-implemented method for configuring project management features for an issue tracking system. The method can include receiving, at a first web-based service, a request to generate a project management interface for a second web-based service and subsequent to receiving the request, causing display of a first interface. The first interface can include an input region for receiving user input describing the project and a second input region for selecting a project type. In response to receiving user input at the first and second input regions, the method can include generating a prompt that includes user input from the first region and predetermined text directed to a command, and transmitting the prompt to a generative output model. In response to transmitting the prompt to the generative output model, the method can include receiving a generative response including a list of items and a ranking of the list of items. Subsequent to receiving the generative response, the method can include creating the project management interface for the second web-based service, where the project management interface is configured using the list of items to identify a set of project intake flows and arrangement of the project intake flows.

Embodiments are further directed to a computer-implemented method for creating a portal intake flow for an issue tracking system. The method can include receiving, at a first web-based service, a request to generate a new portal intake flow for a second web-based service. Subsequent to receiving the request, the method can include causing display of a dynamic preview of the new portal intake flow that includes one or more fields and a generative input option. In response to receiving user selection of a generative input option, the method can include generating a prompt including predetermined text directed to a command, and a set of fields that can be used as part of the portal intake flow and in response to transmitting the prompt to the generative output model, receiving a generative response and causing display of one or more suggestions for modifying the one or more fields included in the portal intake flow based on the generative response. Subsequent to selection of a suggestion of the one or more suggestions, the method can include creating the new portal intake flow, the new portal intake flow configured to generate a new issue using set of fields displayed in the dynamic preview.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIGS. 6A-6C depict an example graphical user interface of a help desk portal in an issue tracking system, such as described herein.

FIG. 13 depicts an interface that arranges a list of issues in a queue and groups issues according to one or more criteria.

FIG. 14 depicts an example process for generating a summary window comprising a generative response.

FIG. 15 depicts a list of issues in a queue corresponding to issues management by an issue tracking system and summary window comprising a generative response to an issue in the list of issues.

FIG. 19 depicts an interface that includes a dynamic preview of a project management interface created using a generative output model.

FIG. 21 depicts an example hardware for devices of the systems described herein.

The use of the same or similar reference numerals in different figures indicates similar, related, or identical items.

Figure 1:
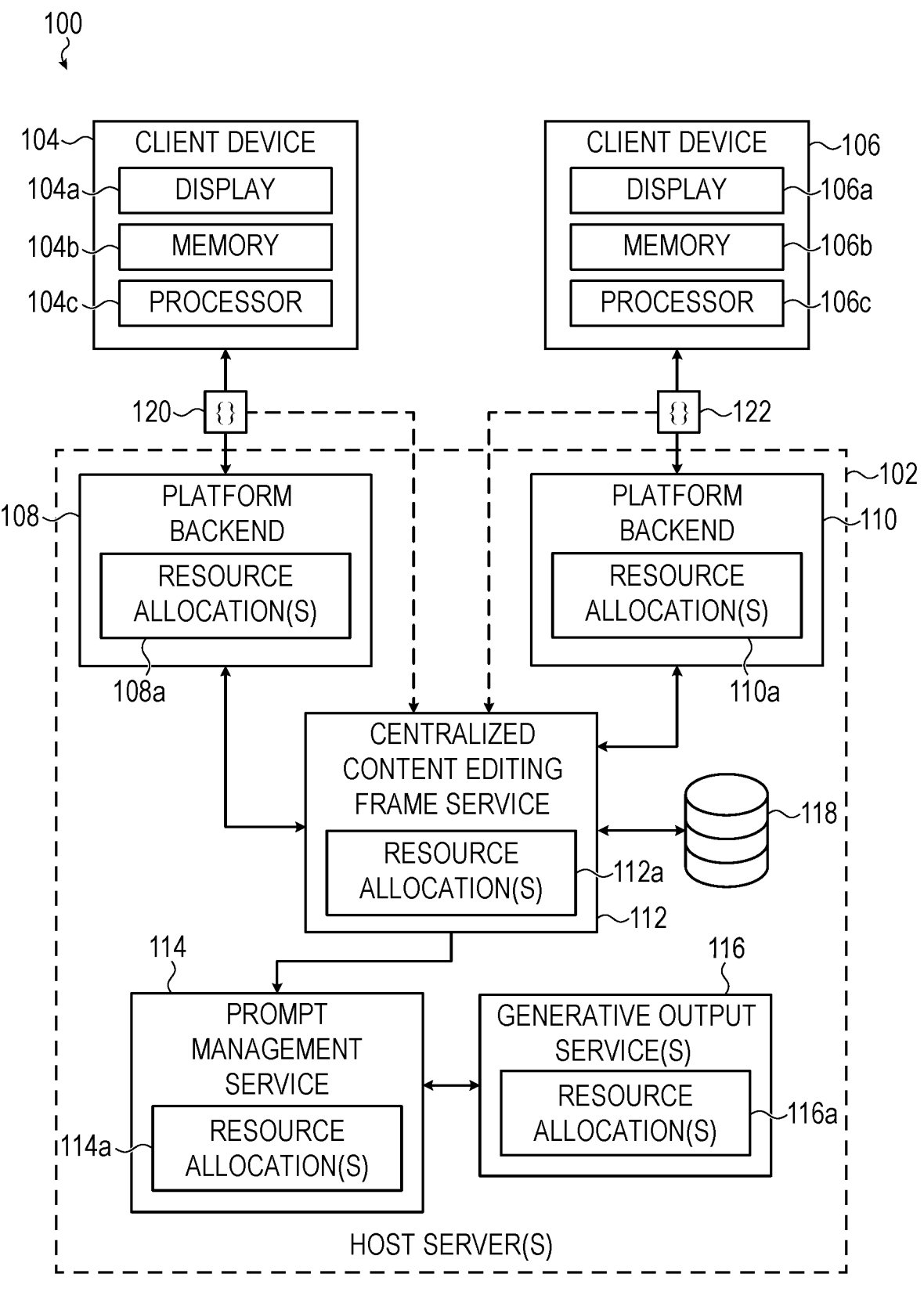
FIG. 1 depicts a simplified diagram of a system, such as described herein that can include and/or may receive input from a generative output engine.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications and equivalents as can be included within the spirit and scope of the described embodiments as defined by the appended claims.

An issue tracking system may be configured with one or more portal intake flows which are used to collect information from a user about an issue they are experiencing. The portal intake flow may include a user interface where a user enters information that will be used to troubleshoot a particular issue. In some cases, different issues may require different information from a user. Accordingly, an issue tracking system may have multiple different portal intake flows which are each configured to troubleshoot a specific issue of set of issues. The different portal intake flows can be organized into different categories which may be based on a request type. For example, a first category may include one or more portal intake flows relating the information technology (IT), a second category may include one or more portal intake flows relating to legal, a third category may include one or more portal intake flows relating to human resources (HR) and so on.

If a user has an issue/request, they may navigate to a particular category of intake flows based on the type of issue/request and select a particular intake flow. For example, if a user has an issue logging in, they may view portal intake flows associated with IT issues and select a particular intake flow directed to login issues. The portal intake flow for login issues may include inputs relevant to solving the login issue. For example, the user interface (UI) for the portal intake flow may include input areas for entering a summary of the issue, identifying the user, identifying a location of the user, identifying a particular platform or service associated with the issue, an area for a description of steps the user has already taken, and so on. In response to a user entering information into the portal intake flow and submitting the request, the issue tracking system can generate a ticket which may start an issue resolution and tracking process.

As another example, if a user has a question for human resources, the issue tracking system may have one or more portal intake flows that are associated with HR, which may include a portal intake flow for sending a question to HR. In response to a user selecting the portal intake flow for submitting a question to HR, the system may present a UI that includes input areas for obtaining information relevant to HR. For example, the UI may include an include input areas for entering a summary of the issue, identifying the user, entering the question for HR and a requested response date.

In many cases, an issue tracking system may be configured for an organization or client and have a set of predefined intake flows, which may not be able to be changed by the organization or have limited ability to configure aspects of the pre-defined intake flows. The pre-defined intake flows may not collect information that is relevant to a particular organization and set of users. This may result in underutilization and/or lower the efficiency of the issue tracking system.

Embodiments described herein include systems and techniques for creating custom portal intake flows for an issue tracking system. The systems may include a user interface that allows portal intake flows to be generated and the user to select the information and workflow for an intake flow during the generation process. The process for generating a new portal intake flow may include displaying a first UI that includes a first selection panel having a set of tiles that each correspond to an intake request type. The first selection panel may arrange and/or display tiles based on a category associated with the request types. For example, the first UI may display tiles corresponding to intake request types for IT. As another example, the first UI may display tiles corresponding to intake request types for HR.

The system may receive a user input indicating a selection of a particular tile of the set of tiles. In response to the selection of a particular time, the system may display in the first UI, a first preview panel including a dynamic preview of an intake interface for the request type associated with the selected tile. The intake interface may include intake fields that are used to collect information related to the particular request type as part of the intake portal flow. For example, the fields may include fields for identifying the requestor or a user associated with the request, fields for providing a summary of the issue/request, and so on. The fields displayed in the dynamic preview may be a set of default fields associated with a particular request type. For example, an IT request type may have different fields than an HR request type. Additionally a first IT request type may have different fields from a second different IT request type.

The fields shown in the dynamic preview in the first UI may be configurable by the user. For example, the user may remove fields for the request type, add fields for the request type, change parameters and/or information associated with a field, and so on. As part of the portal intake flow generation process, the fields associated with the intake flow may be customized by a user. Accordingly, when the system generates the portal intake flow it will be initially configured with the fields that are selected and/or customized as part of the generation process.

In response to the system receiving a selection of a particular intake request type, the system may cause a second UI to be displayed. The second UI may include a second selection panel that includes a second set of tiles each corresponding to a workflow type for processing an issue using the issue tracking system. A workflow type may define a process that is used by the issue tracking system to handle a corresponding issue. The workflow type may define a set of statuses and transitions as part of the process for handling an issue. For example, when an issue is first submitted using the portal intake flow, the issue tracking system may define "to-do" or pending status, once the issue has been picked up or begun to be worked on, the system may update the status to "in progress," and once the issue has been resolved the system may update the status to "completed." The process intake flow may also define actions that occur in response to updates to the status or actions taken on the issue.

The issue tracking system may include different workflow types and the user may select a tile corresponding to the desired workflow type to assign that workflow to the portal intake flow. In some cases, the second UI can also display a preview panel that includes a schematic of a particular workflow for a selected tile of the second set of tiles. For example, if the system detects an input to a particular tile corresponding to a particular workflow type, the system may cause a preview of the particular workflow to be displayed in the preview panel. The preview of the particular workflow may include a flow diagram that outlines the workflow process and/or steps taken in response to particular events occurring. In some cases, a user may modify a particular workflow in the preview panel.

In response to a selection of a workflow using the second interface, the system can create the new portal intake flow based on the inputs/selections during the generation process. The new portal intake flow be used by the issue tracking system to generate a new issue using a UI that is configured in accordance with the selected and/or modified intake request type and having a workflow configured in accordance with the selected workflow. Accordingly, the process of generating the portal intake flow allows a user to configure the workflow during the generation process.

Embodiments are also directed to system and methods for creating dynamic summaries for issues managed by an issue tracking system. The dynamic summaries may be generated using a generative output model, as described herein, and provide information to a user about a current status, history or other events associated with an issue. The dynamic summaries may provide relevant information to a user without having to access a detailed view for a particular issue and review information in the detailed view. Accordingly, the systems and methods described herein may display relevant information about one or more issues that are displayed in a queue interface without having to be redirected to a detailed view for a particular issue.

An issue tracking system may display an interface that includes a list of issues arranged in a queue. Each issue in the queue may be displayed in a row that includes various details relating to the issue, including a summary, an issue type/classification, a user assigned to the issue, a status, a resolution time, and a creation date. In some cases, the issues may be arranged in the list in an order that each issue was received, based on when a last action was taken on an issue, and/or according to other criteria. In some cases, the system and methods provided herein may allow the issue displayed in the queue to be grouped according to one or more criteria. The user interface may include an option to select a grouping category, which may cause the issues to be arranged in accordance with a selected grouping category. For example, if an assignee grouping category is selected, the system may determine an arrangement of the issues in the queue based on a user each issue is assigned to. As another example, if a priority grouping category is selected, the system may determine an arrangement of the issues in the queue based on a priority associated with each issue. Accordingly, the systems and methods described herein can include arranging inputs based on one or more parameters (e.g., a selected grouping category).

In some cases, the system may be configured to generate and display a summary window for an issue that includes information about the issue. The summary window may be generated in response to a user input over a designated region of a particular row associated with an issue. For example, the user input may include hovering a pointer over the designated region, a touch input at the designated region, and/or any other suitable user input. The summary input can include a generative response that is received from a generative output model. The generative response may be based on a prompt submitted to the generative output model and the prompt may include a command and content related to the issue. The command can cause the generative output model to generate a response including particular summary information. For example, in some cases, the command may cause the generative output to include a summary of the issue and include information about events associated with the issue. For example, the events may include a summary of an activity log that includes comments, work history, and approvals associated with the issue. The events may include a current status and indicate what input is required to advance the issue to the next stage. The summary window can be displayed over at least a portion of the list of issues and include at least a portion of the generative output. Accordingly, in response to the user input at a particular region associated with an issue, the system may provide additional details about that issue without needing to display a detailed issue view.

Embodiments are directed to systems and methods for using a generative output engine to provide suggestions for creating a project management interface for an issue tracking system. In some cases, the system may utilize a generative output engine to configure a project management interface, which may be used by users of the system to create new issues and/or requests that are managed by the issue tracking system. The system may display an interface that captures user input and generates a prompt for a generative output engine based on the user input. For example, the user input may include natural language request of what type of project management interface the user wants to create and/or features associated with the project management interface. The natural language request may be submitted in a prompt along with a command and/or data from the issue tracking system to a generative output engine. The command(s) can include instructions for how to process the data, output formats and so on.

The system may use generative output received in response to a prompt to create a project management interface. In some cases, the prompt may include a command to return portal intake flows to use in a specific project management interface, for example, portal intake flows for a project management interface sued by an HR team. The generative output may return a list of recommended portal intake flows and the system may generate a project management interface that includes the recommended portal intake flows. In some cases, the system can display a dynamic preview of the project management interface, which may allow a user to modify aspects of the interface. For example, the user may change an arrangement of the portal intake flows, add and/or remove various portal intake flow and so on. Additionally or alternatively, a user may submit feedback on the generated portal intake flow which may be used to generate a second prompt for a generative output engine. The second prompt may request the generative output engine to provide suggested changes based on the user input.

Additionally or alternatively, the system may utilize a generative output engine to recommend changes to one or more portal intake flows. For example, a configuration interface for a portal intake flow may include one or more fields that generate input regions for the portal intake flow. The system may include an option to utilize a generative output engine to make recommendations about the fields. For example, in response to initiating a generative output process, the system may create a prompt for the generative output engine which may be a preconfigured prompt and/or include user input such as natural language commands. The system may submit the prompt to the generative output engine and receive a generative response. The generative response may be used to suggest one or more changes to the fields included in the portal intake flow. For example, the generative response may include a recommendation to add one or more fields, remove one or more fields, change an arrangement of the fields, change parameters of a field (e.g., a title, type of input, etc.) and/or change other featured related to the project intake flow.

These foregoing and other embodiments are discussed below with reference to FIGS. 1-21. However, those skilled in the art will readily appreciate that the detailed description given herein with respect to these figures is for explanation only and should not be construed as limiting.

Embodiments described herein relate to systems and methods for automatically generating content, generating API requests and/or request bodies, structuring user-generated content, and/or generating structured content in collaboration platforms, such as documentation systems, issue tracking systems, project management platforms, and the like.

Automatically generated content can supplement, summarize, format, and/or structure existing tenant-owned user-generated content created by a user while operating a software platform, such as described herein. In one embodiment, user-generated content can be supplemented by an automatically generated summary. The generated summary may be prepended to the content such that when the content is rendered for other users, the summary appears first. In other cases, the summary may be appended to an end of the document. In yet other examples, the generated summary may be transmitted to another application, messaging system, or notification system. For example, a generated document summary can be attached to an email, a notification, a chat or ITSM support message, or the like, in lieu of being attached or associated with the content it summarizes.

In another example, user-generated content can be supplemented by automatic insertion of format markers or style classes (e.g., markdown tags, CSS classes, and the like) into the user-generated content itself. In other examples, user-generated content can be rewritten and/or restructured to include more detail, to remove unnecessary detail, and/or to adopt a more neutral or positive tone. These examples are not exhaustive.

In yet other examples, multiple disparate user-generated content items, stored in different systems or in different locations, can be collapsed together into a single summary or list of summaries.

In addition to embodiments in which automatically generated content is generated in respect of existing user-generated content (and/or appended thereto), automatically generated content as described herein can also be used to supplement API requests and/or responses generated within a multiplatform collaboration environment. For example, in some embodiments, API request bodies can be generated automatically leveraging systems described herein. The API request bodies can be appended to an API request provided as input to any suitable API of any suitable system. In many cases, an API with a generated body can include user-specific, API-specific, and/or tenant-specific authentication tokens that can be presented to the API for authentication and authorization purposes.

The request bodies, in these embodiments, can be structured so as to elicit particular responses from one or more software platforms' API endpoints. For example, a documentation platform may include an API endpoint that causes the documentation platform to create a new document from a specified template. Specifically, in these examples, a request to this endpoint can be generated, in whole or in part, automatically. In other cases, an API request body can be modified or supplemented by automatically generated output, as described herein.

For example, an issue tracking system may present an API endpoint that causes creation of new issues in a particular project. In this example, string or other typed data such as a new issue titles, new issue state, new issue description, and/or new issue assignee fields can be automatically generated and inserted into appropriate fields of a JSON-formatted request body. Submitting the request, as modified/ supplemented by automatically generated content, to the API endpoint can result in creation of an appropriate number of new issues.

In another example, a trouble ticket system (e.g., an information technology service management or "ITSM" system) may include an interface for a service agent to chat with or exchange information with a customer experiencing a problem. In some cases, automatically generated content can be displayed to the customer, whereas in other cases, automatically generated content can be displayed to the service agent.

For example, in the first case, automatically generated content can summarize and/or link to one or more documents that outline troubleshooting steps for common problems. In these examples, the customer experiencing an issue can receive through the chat interface, one or more suggestions that (1) summarize steps outlined in comprehensive documentation, (2) link to a relevant portion of comprehensive documentation, or (3) prompt the customer to provide more information. In the second case, a service agent can be assisted by automatically generated content that (1) summarizes steps outlined in comprehensive documentation and/or one or more internal documentation tools or platforms, (2) link to relevant portions of comprehensive help documentation, or (3) prompt the service agent to request more information from the customer. In some cases, generated content can include questions that may help to further narrowly characterize the customer's problem. More generally, automatically generated content can assist either or both service agents and customers in ITSM environments.

The foregoing embodiments are not exhaustive of the manners by which automatically generated content can be used in multi-platform computing environments, such as those that include more than one collaboration tool.

More generally and broadly, embodiments described herein include systems configured to automatically generate content within environments defined by software platforms. The content can be directly consumed by users of those software platforms or indirectly consumed by users of those software platforms (e.g., formatting of existing content, causing existing systems to perform particular tasks or sequences of tasks, orchestrate complex requests to aggregate information across multiple documents or platforms, and so on) or can integrate two or more software platforms together (e.g., reformatting or recasting user generated content from one platform into a form or format suitable for input to another platform).

Scalable Network Architecture for Automatic Content Generation

More specifically, systems and methods described herein can leverage a scalable network architecture that includes an input request queue, a normalization (and/or redaction) preconditioning processing pipeline, an optional secondary request queue, and a set of one or more purpose-configured large language model instances (LLMs) and/or other trained classifiers or natural language processors.

Collectively, such engines or natural language processors may be referred to herein as "generative output engines." A system incorporating a generative output engine can be referred to as a "generative output system" or a "generative output platform." Broadly, the term "generative output engine" may be used to refer to any combination of computing resources that cooperate to instantiate an instance of software (an "engine") in turn configured to receive a string prompt as input and configured to provide, as deterministic or pseudo-deterministic output, generated text which may include words, phrases, paragraphs and so on in at least one of (1) one or more human languages, (2) code complying with a particular language syntax, (3) pseudocode conveying in human-readable syntax an algorithmic process, or (4) structured data conforming to a known data storage protocol or format, or combinations thereof.

The string prompt (or "input prompt" or simply "prompt") received as input by a generative output engine can be any suitably formatted string of characters, in any natural language or text encoding.

In some examples, prompts can include non-linguistic content, such as media content (e.g., image attachments, audiovisual attachments, files, links to other content, and so on) or source or pseudocode. In some cases, a prompt can include structured data such as tables, markdown, JSON formatted data, XML formatted data, and the like. A single prompt can include natural language portions, structured data portions, formatted portions, portions with embedded media (e.g., encoded as base64 strings, compressed files, byte streams, or the like) pseudocode portions, or any other suitable combination thereof.

The string prompt may include letters, numbers, whitespace, punctuation, and in some cases formatting. Similarly, the generative output of a generative output engine as described herein can be formatted/encoded according to any suitable encoding (e.g., ISO, Unicode, ASCII as examples).

In these embodiments, a user may provide input to a software platform coupled to a network architecture as described herein. The user input may be in the form of interaction with a graphical user interface affordance (e.g., button or other UI element), or may be in the form of plain text. In some cases, the user input may be provided as typed string input provided to a command prompt triggered by a preceding user input.

For example, the user may engage with a button in a UI that causes a command prompt input box to be rendered, into which the user can begin typing a command. In other cases, the user may position a cursor within an editable text field and the user may type a character or trigger sequence of characters that cause a command-receptive user interface element to be rendered. As one example, a text editor may support slash commands-after the user types a slash character, any text input after the slash character can be considered as a command to instruct the underlying system to perform a task.

Regardless of how a software platform user interface is instrumented to receive user input, the user may provide an input that includes a string of text including a natural language request or instruction (e.g., a prompt). The prompt may be provided as input to an input queue including other requests from other users or other software platforms. Once the prompt is popped from the queue, it may be normalized and/or preconditioned by a preconditioning service.

The preconditioning service can, without limitation: append additional context to the user's raw input; may insert the user's raw input into a template prompt selected from a set of prompts; replace ambiguous references in the user's input with specific references (e.g., replace user-directed pronouns with user IDs, replace @mentions with user IDs, and so on); correct spelling or grammar; translate the user input to another language; or other operations. Thereafter, optionally, the modified/supplemented/hydrated user input can be provided as input to a secondary queue that meters and orders requests from one or more software platforms to a generative output system, such as described herein. The generative output system receives, as input, a modified prompt and provides a continuation of that prompt as output which can be directed to an appropriate recipient, such as the graphical user interface operated by the user that initiated the request or such as a separate platform. Many configurations and constructions are possible.

Large Language Models

An example of a generative output engine of a generative output system as described herein may be a large language model (LLM). Generally, an LLM is a neural network specifically trained to determine probabilistic relationships between members of a sequence of lexical elements, characters, strings or tags (e.g., words, parts of speech, or other subparts of a string), the sequence presumed to conform to rules and structure of one or more natural languages and/or the syntax, convention, and structure of a particular programming language and/or the rules or convention of a data structuring format (e.g., JSON, XML, HTML, Markdown, and the like).

More simply, an LLM is configured to determine what word, phrase, number, whitespace, nonalphanumeric character, or punctuation is most statistically likely to be next in a sequence, given the context of the sequence itself. The sequence may be initialized by the input prompt provided to the LLM. In this manner, output of an LLM is a continuation of the sequence of words, characters, numbers, whitespace, and formatting provided as the prompt input to the LLM.

To determine probabilistic relationships between different lexical elements (as used herein, "lexical elements" may be a collective noun phase referencing words, characters, numbers, whitespace, formatting, and the like), an LLM is trained against as large of a body of text as possible, comparing the frequency with which particular words appear within N distance of one another. The distance N may be referred to in some examples as the token depth or contextual depth of the LLM.

In many cases, word and phrase lexical elements may be lemmatized, part of speech tagged, or tokenized in another manner as a pretraining normalization step, but this is not required of all embodiments. Generally, an LLM may be trained on natural language text in respect of multiple domains, subjects, contexts, and so on; typical commercial LLMs are trained against substantially all available internet text or written content available (e.g., printed publications, source repositories, and the like). Training data may occupy petabytes of storage space in some examples.

As an LLM is trained to determine which lexical elements are most likely to follow a preceding lexical element or set of lexical elements, an LLM must be provided with a prompt that invites continuation. In general, the more specific a prompt is, the fewer possible continuations of the prompt exist. For example, the grammatically incomplete prompt of "can a computer" invites completion, but also represents an initial phrase that can begin a near limitless number of probabilistically reasonable next words, phrases, punctuation, and whitespace. A generative output engine may not provide a contextually interesting or useful response to such an input prompt, effectively choosing a continuation at random from a set of generated continuations of the grammatically incomplete prompt.

By contrast, a narrower prompt that invites continuation may be "can a computer supplied with a 30 W power supply consume 60 W of power?" A large number of possible correct phrasings of a continuation of this example prompt exist, but the number is significantly smaller than the preceding example, and a suitable continuation may be selected or generated using a number of techniques. In many cases, a continuation of an input prompt may be referred to more generally as "generated text" or "generated output" provided by a generative output engine as described herein.

Generally, many written natural languages, syntaxes, and well-defined data structuring formats can be probabilistically modeled by an LLM trained by a suitable training dataset that is both sufficiently large and sufficiently relevant to the language, syntax, or data structuring format desired for automatic content/output generation.

In addition, because punctuation and whitespace can serve as a portion of training data, generated output of an LLM can be expected to be grammatically and syntactically correct, as well as being punctuated appropriately. As a result, generated output can take many suitable forms and styles, if appropriate in respect of an input prompt.

Further, as noted above in addition to natural language, LLMs can be trained on source code in various highly structured languages or programming environments and/or on data sets that are structured in compliance with a particular data structuring format (e.g., markdown, table data, CSV data, TSV data, XML, HTML, JSON, and so on).

As with natural language, data structuring and serialization formats (e.g., JSON, XML, and so on) and high-order programming languages (e.g., C, C++, Python, Go, Ruby, JavaScript, Swift, and so on) include specific lexical rules, punctuation conventions, whitespace placement, and so on. In view of this similarity with natural language, an LLM generated output can, in response to suitable prompts, include source code in a language indicated or implied by that prompt.

For example, a prompt of "what is the syntax for a while loop in C and how does it work" may be continued by an LLM by providing, in addition to an explanation in natural language, a C++ compliant example of a while loop pattern. In some cases, the continuation/generative output may include format tags/keys such that when the output is rendered in a user interface, the example C++ code that forms a part of the response is presented with appropriate syntax highlighting and formatting.

As noted above, in addition to source code, generative output of an LLM or other generative output engine type can include and/or may be used for document structuring or data structuring, such as by inserting format tags (e.g., markdown). In other cases, whitespace may be inserted, such as paragraph breaks, page breaks, or section breaks. In yet other examples, a single document may be segmented into multiple documents to support improved legibility. In other cases, an LLM generated output may insert cross-links to other content, such as other documents, other software platforms, or external resources such as websites.

In yet further examples, an LLM generated output can convert static content to dynamic content. In one example, a user-generated document can include a string that contextually references another software platform. For example, a docubentation platform document may include the string "this document corresponds to project ID 123456, status of which is pending." In this example, a suitable LLM prompt may be provided that causes the LLM to determine an association between the documentation platform and a project management platform based on the reference to "project ID 123456."

In response to this recognized context, the LLM can wrap the substring "project ID 123456" in anchor tags with an embedded URL in HTML-compliant syntax that links directly to project 123456 in the project management platform, such as: "<a href='https://example link/123456>project 123456</a>".

In addition, the LLM may be configured to replace the substring "pending" with a real-time updating token associated with an API call to the project management system. In this manner, this manner, the LLM converts a static string within the document management system into richer content that facilitates convenient and automatic cross-linking between software products, which may result in additional downstream positive effects on performance of indexing and search systems.

In further embodiments, the LLM may be configured to generate as a portion of the same generated output a body of an API call to the project management system that creates a link back or other association to the documentation platform. In this manner, the LLM facilities bidirectional content enrichment by adding links to each software platform.

More generally, a continuation produced as output by an LLM can include not only text, source code, pseudocode, structured data, and/or cross-links to other platforms, but it also may be formatted in a manner that includes titles, emphasis, paragraph breaks, section breaks, code sections, quote sections, cross-links to external resources, inline images, graphics, table-backed graphics, and so on.

In yet further examples, static data may be generated and/or formatted in a particular manner in a generative output. For example, a valid generative output can include JSON-formatted data, XML-formatted data, HTML-formatted data, markdown table formatted data, comma-separated value data, tab-separated value data, or any other suitable data structuring defined by a data serialization format.

Transformer Architecture

In many constructions, an LLM may be implemented with a transformer architecture. In other cases, traditional encoder/decoder models may be appropriate. In transformer topologies, a suitable self-attention or intra-attention mechanism may be used to inform both training and generative output. A number of different attention mechanisms, including self-attention mechanisms, may be suitable.

In sum, in response to an input prompt that at least contextually invites continuation, a transformer-architected LLM may provide probabilistic, generated, output informed by one or more self-attention signals. Even still, the LLM or a system coupled to an output thereof may be required to select one of many possible generated outputs/continuations.

In some cases, continuations may be misaligned in respect of conventional ethics. For example, a continuation of a prompt requesting information to build a weapon may be inappropriate. Similarly, a continuation of a prompt requesting to write code that exploits a vulnerability in software may be inappropriate. Similarly, a continuation requesting drafting of libelous content in respect of a real person may be inappropriate. In more innocuous cases, continuations of an LLM may adopt an inappropriate tone or may include offensive language.

In view of the foregoing, more generally, a trained LLM may provide output that continues an input prompt, but in some cases, that output may be inappropriate. To account for these and other limitations of source-agnostic trained LLMs, fine tuning may be performed to align output of the LLM with values and standards appropriate to a particular use case. In many cases, reinforcement training may be used. In particular, output of an untuned LLM can be provided to a human reviewer for evaluation.

The human reviewer can provide feedback to inform further training of the LLM, such as by filling out a brief survey indicating whether a particular generated output: suitably continues the input prompt; contains offensive language or tone; provides a continuation misaligned with typical human values; and so on.

This reinforcement training by human feedback can reinforce high quality, tone neutral, continuations provided by the LLM (e.g., positive feedback corresponds to positive reward) while simultaneously disincentivizing the LLM to produce offensive continuations (e.g., negative feedback corresponds to negative reward). In this manner, an LLM can be fine-tuned to preferentially produce desirable, inoffensive, generative output which, as noted above, can be in the form of natural language and/or source code.

Generative Output Engines & Generative Output Systems

Independent of training and/or configuration of one or more underlying engines (typically instantiated as software), it may be appreciated that generally and broadly, a generative output system as described herein can include a physical processor or an allocation of the capacity thereof (shared with other processes, such as operating system processes and the like), a physical memory or an allocation thereof, and a network interface. The physical memory can include datastores, working memory portions, storage portions, and the like. Storage portions of the memory can include executable instructions that, when executed by the processor, cause the processor to (with assistance of working memory) instantiate an instance of a generative output application, also referred to herein as a generative output service.

The generative output application can be configured to expose one or more API endpoints, such as for configuration or for receiving input prompts. The generative output application can be further configured to provide generated text output to one or more subscribers or API clients. Many suitable interfaces can be configured to provide input to and to receive output from a generative output application, as described herein.

For simplicity of description, the embodiments that follow reference generative output engines and generative output applications configured to exchange structured data with one or more clients, such as the input and output queues described above. The structured data can be formatted according to any suitable format, such as JSON or XML. The structured data can include attributes or key-value pairs that identify or correspond to subparts of a single response from the generative output engine.

For example, a request to the generative output engine from a client can include attribute fields such as, but not limited to: requester client ID; requester authentication tokens or other credentials; requester authorization tokens or other credentials; requester username; requester tenant ID or credentials; API key(s) for access to the generative output engine; request timestamp; generative output generation time; request prompt; string format form generated output; response types requested (e.g., paragraph, numeric, or the like); callback functions or addresses; generative engine ID; data fields; supplemental content; reference corpuses (e.g., additional training or contextual information/data) and so on. A simple example request may be JSON formatted, and may be:

```
{
    "prompt" : "Generate five words of placeholder text in the English
    language.",
    "API_KEY": "hx-Y5u4zx3kaF67AzkXK1hC",
    "user_token": "PkcLe7Co2G-50AoIVojGJ"
}
```

Similarly, a response from the generative output engine can include attribute fields such as, but not limited to: requester client ID; requester authentication tokens or other credentials; requester authorization tokens or other credentials; requester username; requester role; request timestamp; generative output generation time; request prompt; generative output formatted as a string; and so on. For example, a simple response to the preceding request may be JSON formatted and may be:

```
{
    "response" : "Hello world text goes here.",
    "generation_time_ms" : 2
{
```

In some embodiments, a prompt provided as input to a generative output engine can be engineered from user input. For example, in some cases, a user input can be inserted into an engineered template prompt that itself is stored in a database. For example, an engineered prompt template can include one or more fields into which user input portions thereof can be inserted. In some cases, an engineered prompt template can include contextual information that narrows the scope of the prompt, increasing the specificity thereof.

For example, some engineered prompt templates can include example input/output format cues or requests that define for a generative output engine, as described herein, how an input format is structured and/or how output should be provided by the generative output engine.

Prompt Pre-Configuration, Templatizing, & Engineering

As noted above, a prompt received from a user can be preconditioned and/or parsed to extract certain content therefrom. The extracted content can be used to inform selection of a particular engineered prompt template from a database of engineered prompt templates. Once the selected prompt template is selected, the extracted content can be inserted into the template to generate a populated engineered prompt template that, in turn, can be provided as input to a generative output engine as described herein.

In many cases, a particular engineered prompt template can be selected based on a desired task for which output of the generative output engine may be useful to assist. For example, if a user requires a summary of a particular document, the user input prompt may be a text string comprising the phrase "generate a summary of this page." A software instance configured for prompt preconditioning— which may be referred to as a "preconditioning software instance" or "prompt preconditioning software instance"— may perform one or more substitutions of terms or words in this input phrase, such as replacing the demonstrative pronoun phrase "this page" with an unambiguous unique page ID. In this example, preconditioning software instance can provide an output of "generate a summary of the page with id 123456" which in turn can be provided as input to a generative output engine.

In an extension of this example, the preconditioning software instance can be further configured to insert one or more additional contextual terms or phrases into the user input. In some cases, the inserted content can be inserted at a grammatically appropriate location within the input phrase or, in other cases, may be appended or prepended as separate sentences.

For example, in an embodiment, the preconditioning software instance can insert a phrase that adds contextual information describing the user making the initial input and request. In this example, output of the prompt preconditioning instance may be "generate a summary of the page with id 123456 with phrasing and detail appropriate for the role of user 76543." In this example, if the user requesting the summary is an engineer, a different summary may be provided than if the user requesting the summary is a manager or executive.

In yet other examples, prompt preconditioning may be further contextualized before a given prompt is provided as input to a generative output engine. Additional information that can be added to a prompt (sometimes referred to as "contextual information" or "prompt context" or "supplemental prompt information") can include but may not be limited to: user names; user roles; user tenure (e.g., new users may benefit from more detailed summaries or other generative content than long-term users); user projects; user groups; user teams; user tasks; user reports; tasks, assignments, or projects of a user's reports, and so on.

For example, in some embodiments, a user-input prompt may be "generate a table of all my tasks for the next two weeks, and insert the table into my home page in my personal space." In this example, a preconditioning instance can replace "my" with a reference to the user's ID or another unambiguous identifier associated with the user. Similarly, the "home page in my personal space" can be replaced, contextually, with a page identifier that corresponds to that user's personal space and the page that serves as the homepage thereof. Additionally, the preconditioning instance can replace the referenced time window in the raw input prompt based on the current date and based on a calculated date two weeks in the future. With these two modifications, the modified input prompt may be "generate a table of the tasks assigned to User 1234 dating from Jan. 1, 2023-Jan. 14, 2023 (inclusive), and insert the generated table into page 567." In these embodiments, the preconditioning instance may be configured to access session information to determine the user ID.

In other cases, the preconditioning service may be configured to structure and submit a query to an active directory service or user graph service to determine user information and/or relationships to other users. For example, a prompt of "summarize the edits to this page made by my team since I last visited this page" could determine the user's ID, team members with close connections to that user based on a user graph, determine that the user last visited the page three weeks prior, and filter attribution of edits within the last three weeks to the current page ID based on those team members. With these modifications, the prompt provided to the generative output engine may be:

```
{
    "raw_prompt" : summarize the edits to this page made by my team
since I last visited this page",
    "modified_prompt" : "Generate a summary of each paragraph tagged
with an editId attribute matching editId=1, editId=51, editId=165,
editId=99 within the following HTML-formatted content:
[HTML-formatted content of the page]."
}
```

Similarly, the preconditioning service may utilize a project graph, issue graph, or other data structure that is generated using edges or relationships between system object that are determined based on express object dependencies, user event histories of interactions with related objects, or other system activity indicating relationships between system objects. The graphs may also associate system objects with particular users or user identifiers based on interaction logs or event histories.

Generally, a preconditioning service, as described herein, can be configured to access and append significant contextual information describing a user and/or users associated with the user submitting a particular request, the user's role in a particular organization, the user's technical expertise, the user's computing hardware (e.g., different response formats may be suitable and/or selectable based on user equipment), and so on.

In further implementations of this example, a snippet of prompt text can be selected from a snippet dictionary or table that further defines how the requested table should be formatted as output by the generative output engine. For example, a snippet selected from a database and appended to the modified prompt may be:

```
{
    "snippet123_table_from_tasks" : "The table should be formatted
as a three-column table with multiple rows. The leftmost column should
be titled 'Title' and the corresponding content of each row of this
column should be the title attribute of a task. The middle column should
be titled 'Created Date' and the corresponding content of each row
of this column should be the creation date of the task. The rightmost
column should be titled 'Status' and the corresponding content of
each row of this column should be the status attribute of the selected
task."
}
```

The foregoing examples of modifications and supplements to user input prompt are not exhaustive. Other modifications are possible. In one embodiment, the user input of "generate a table of all my tasks for the next two weeks" may be converted, supplemented, modified, and/or otherwise preconditioned to:

```
}
    "modified_prompt" : "Find all tasks assigned to User 1234
dating from Jan 01, 2023 - Jan 14, 2023 (inclusive). Create a table in
which each found task corresponds to a respective row of that table. The
table should be formatted as a markdown table, in plain text, with three
columns. The leftmost column should be titled 'Title' and the
corresponding content of each row of this column should be the title
attribute of a respective task. The middle column should be titled
'Created Date' and the corresponding content of each row of this
column should be the creation date of the respective task. The rightmost
column should be titled 'Status' and the corresponding content of
each row of this column should be the status attribute of the
respective task."
}
```

The operations of modifying a user input into a descriptive paragraph or set of paragraphs that further contextualize the input may be referred to as "prompt engineering." In many embodiments, a preconditioning software instance may serve as a portion of a prompt engineering service configured to receive user input and to enrich, supplement, and/or otherwise hydrate a raw user input into a detailed prompt that may be provided as input to a generative output engine as described herein.

In other embodiments, a prompt engineering service may be configured to append bulk text to a prompt, such as document content in need of summarization or contextualization.

In other cases, a prompt engineering service can be configured to recursively and/or iteratively leverage output from a generative output engine in a chain of prompts and responses. For example, a prompt may call for a summary of all documents related to a particular project. In this case, a prompt engineering service may coordinate and/or orchestrate several requests to a generative output engine to summarize a first document, a second document, and a third document, and then generate an aggregate response of each of the three summarized documents.

In yet other examples, staging of requests may be useful for other purposes.

Authentication & Authorization

Still further embodiments reference systems and methods for maintaining compliance with permissions, authentication, and authorization within a software environment. For example, in some embodiments, a prompt engineering service can be configured to append to a prompt one or more contextualizing phrases that direct a generative output engine to draw insight from only a particular subset of content to which the requesting user has authorization to access.

In other cases a prompt engineering service may be configured to proactively determine what data or database calls may be required by a particular user input. If data required to service the user's request is not authorized to be accessed by the user, that data and/or references to it may be restricted/redacted/removed from the prompt before the prompt is submitted as input to a generative output engine. The prompt engineering service may access a user profile of the respective user and identify content having access permissions that are consistent with a role, permissions profile, or other aspect of the user profile.

In other embodiments, a prompt engineering service may be configured to request that the generative output engine append citations (e.g., back links) to each page or source from which information in a generative response was based. In these examples, the prompt engineering service or another software instance can be configured to iterate through each link to determine (1) whether the link is valid, and (2) whether the requesting user has permission and authorization to view content at the link. If either test fails, the response from the generative output engine may be rejected and/or a new prompt may be generated specifically including an exclusion request such as "Exclude and ignore all content at XYZ.url"

In yet other examples, a prompt engineering service may be configured to classify a user input into one of a number of classes of request. Different classes of request may be associated with different permissions handling techniques. For example, a class of request that requires a generative output engine to resource from multiple pages may have different authorization enforcement mechanisms or workflows than a class of request that requires a generative output engine to resource from only a single location.

These foregoing examples are not exhaustive. Many suitable techniques for managing permissions in a prompt engineering service and generative output engine system may be possible in view of the embodiments described herein.

More generally, as noted above, a generative output engine may be a portion of a larger network and communications architecture as described herein. This network can include input queues, prompt constructors, engine selection logical elements, request routing appliances, authentication handlers and so on.

Collaboration Platforms Integrated with Generative Output Systems

In particular, embodiments described herein are focused to leveraging generative output engines to produce content in a software platform used for collaboration between multiple users, such as documentation tools, issue tracking systems, project management systems, information technology service management systems, ticketing systems, repository systems, telecommunications systems, messaging systems, and the like, each of which may define different environments in which content can be generated by users of those systems.

For example, a documentation system may define an environment in which users of the documentation system can leverage a user interface of a frontend of the system to generate documentation in respect of a project, product, process, or goal. For example, a software development team may use a documentation system to document features and functionality of the software product. In other cases, the development team may use the documentation system to capture meeting notes, track project goals, and outline internal best practices.

Other software platforms store, collect, and present different information in different ways. For example, an issue tracking system may be used to assign work within an organization and/or to track completion of work, a ticketing system may be used to track compliance with service level agreements, and so on. Any one of these software platforms or platform types can be communicably coupled to a generative output engine, as described herein, in order to automatically generate structured or unstructured content within environments defined by those systems.

For example, a documentation system can leverage a generative output engine to, without limitation: summarize individual documents; summarize portions of documents; summarize multiple selected documents; generate document templates; generate document section templates; generate suggestions for cross-links to other documents or platforms; generate suggestions for adding detail or improving conciseness for particular document sections; and so on.

More broadly, it may be appreciated that a single organization may be a tenant of multiple software platforms, of different software platform types. Generally and broadly, regardless of configuration or purpose, a software platform that can serve as source information for operation of a generative output engine as described herein may include a frontend and a backend configured to communicably couple over a computing network (which may include the open Internet) to exchange computer-readable structured data.

The frontend may be a first instance of software executing on a client device, such as a desktop computer, laptop computer, tablet computer, or handheld computer (e.g., mobile phone). The backend may be a second instance of software executing over a processor allocation and memory allocation of a virtual or physical computer architecture. In many cases, although not required, the backend may support multiple tenancies. In such examples, a software platform may be referred to as a multitenant software platform.

For simplicity of description, the multitenant embodiments presented herein reference software platforms from the perspective of a single common tenant. For example, an organization may secure a tenancy of multiple discrete software platforms, providing access for one or more employees to each of the software platforms. Although other organizations may have also secured tenancies of the same software platforms which may instantiate one or more backends that serve multiple tenants, it is appreciated that data of each organization is siloed, encrypted, and inaccessible to, other tenants of the same platform.

In many embodiments, the frontend and backend of a software platform—multitenant or otherwise—as described herein are not collocated, and communicate over a large area and/or wide area network by leveraging one or more networking protocols, but this is not required of all implementations.

A frontend of a software platform as described herein may be configured to render a graphical user interface at a client device that instantiates frontend software. As a result of this architecture, the graphical user interface of the frontend can receive inputs from a user of the client device, which, in turn, can be formatted by the frontend into computer-readable structured data suitable for transmission to the backend for storage, transformation, and later retrieval. One example architecture includes a graphical user interface rendered in a browser executing on the client device. In other cases, a frontend may be a native application executing on a client device. Regardless of architecture, it may be appreciated that generally and broadly a frontend of a software platform as described herein is configured to render a graphical user interface to receive inputs from a user of the software platform and to provide outputs to the user of the software platform.

Input to a frontend of a software platform by a user of a client device within an organization may be referred to herein as "organization-owned" content. With respect to a particular software platform, such input may be referred to as "tenant-owned" or "platform-specific" content. In this manner, a single organization's owned content can include multiple buckets of platform-specific content.

Herein, the phrases "tenant-owned content" and "platform-specific content" may be used to refer to any and all content, data, metadata, or other information regardless of form or format that is authored, developed, created, or otherwise added by, edited by, or otherwise provided for the benefit of, a user or tenant of a multitenant software platform. In many embodiments, as noted above, tenant-owned content may be stored, transmitted, and/or formatted for display by a frontend of a software platform as structured data. In particular structured data that includes tenant-owned content may be referred to herein as a "data object" or a "tenant-specific data object."

In a more simple, non-limiting phrasing, any software platform described herein can be configured to store one or more data objects in any form or format unique to that platform. Any data object of any platform may include one or more attributes and/or properties or individual data items that, in turn, include tenant-owned content input by a user.

Example tenant-owned content can include personal data, private data, health information, personally-identifying information, business information, trade secret content, copyrighted content or information, restricted access information, research and development information, classified information, mutually-owned information (e.g., with a third party or government entity), or any other information, multi-media, or data. In many examples, although not required, tenant-owned content or, more generally, organization-owned content may include information that is classified in some manner, according to some procedure, protocol, or jurisdiction-specific regulation.

In particular, the embodiments and architectures described herein can be leveraged by a provider of multitenant software and, in particular, by a provider of suites of multitenant software platforms, each platform being configured for a different particular purpose. Herein, providers of systems or suites of multitenant software platforms are referred to as "multiplatform service providers."

In general, customers/clients of a multiplatform service provider are typically tenants of multiple platforms provided by a given multiplatform service provider. For example, a single organization (a client of a multiplatform service provider) may be a tenant of a messaging platform and, separately, a tenant of a project management platform.

The organization can create and/or purchase user accounts for its employees so that each employee has access to both messaging and project management functionality. In some cases, the organization may limit seats in each tenancy of each platform so that only certain users have access to messaging functionality and only certain users have access to project management functionality; the organization can exercise discretion as to which users have access to either or both tenancies.

In another example, a multiplatform service provider can host a suite of collaboration tools. For example, a multiplatform service provider may host, for its clients, a multitenant issue tracking system, a multitenant code repository service, and a multitenant documentation service. In this example, an organization that is a customer/client of the service provider may be a tenant of each of the issue tracking system, the code repository service, and the documentation service.

As with preceding examples, the organization can create and/or purchase user accounts for its employees, so that certain selected employees have access to one or more of issue tracking functionality, documentation functionality, and code repository functionality.

In this example and others, it may be possible to leverage multiple collaboration tools to advance individual projects or goals. For example, for a single software development project, a software development team may use (1) a code repository to store project code, executables, and/or static assets, (2) a documentation service to maintain documentation related to the software development project, (3) an issue tracking system to track assignment and progression of work, and (4) a messaging service to exchange information directly between team members.

However, as organizations grow, as project teams become larger, and/or as software platforms mature and add features or adjust user interaction paradigms over time, using multiple software platforms can become inefficient for both individuals and organizations. To counteract these effects, many organizations define internal policies that employees are required to follow to maintain data freshness across the various platforms used by an organization.

For example, when a developer submits a new pull request to a repository service, that developer may also be required by the organization to (1) update a description of the pull request in a documentation service, (2) change a project status in a project management application, and/or (3) close a ticket in a ticketing or issue tracking system relating to the pull request. In many cases, updating and interacting with multiple platforms on a regular and repeating basis is both frustrating and time consuming for both individuals and organizations, especially if the completion of work of one user is dependent upon completion of work of another user.

Some solutions to these and related problems often introduce further issues and complexity. For example, many software platforms include an in-built automation engine that can expedite performance of work within that software platform. In many cases, however, users of a software platform with an in-built automation engine may not be familiar with the features of the automation engine, nor may those users understand how to access, much less efficiently utilize, that automation engine. For example, in many cases, accessing in-built automation engines of a software platform requires diving deep into a settings or options menu, which may be difficult to find.

Other solutions involve an inter-platform bridge software that allows data from one platform to be accessed by another platform. Typically, such bridging software is referred to as an "integration" between platforms. An integration between different platforms may allow content, features, and/or functionality of one platform to be used in another platform.

For example, a multiplatform service provider may host an issue tracking system and a documentation system. The provider may also supply an integration that allows issue tracking information and data objects to be shown, accessed, and/or displayed from within the documentation system. In this example, the integration itself needs to be separately maintained in order to be compliant with an organization's data sharing and/or permissions policies. More specifically, an integration must ensure that authenticated users of the documentation system that view a page that references information stored by the issue tracking system are also authorized to view that information by the issue tracking system.

Phrased in a more general way, an architecture that includes one or more integrations between tenancies of different software platforms requires multiple permissions requests that may be forwarded to different systems, each of which may exhibit different latencies, and have different response formats, and so on. More broadly, some system architectures with integrations between software platforms necessarily require numerous network calls and requests, occupying bandwidth and computational resources at both software platforms and at the integration itself, to simply share and request information and service requests for information by and between the different software platforms. This architectural complexity necessitates careful management to prevent inadvertent information disclosure.

Furthermore, the foregoing problem(s) with maintaining integrations' compliance with an organization's policies and organization-owned content access policies may be exacerbated as a provider's platform suite grows. For example, a provider that maintains three separate platforms may choose to provide three separate integrations interconnecting all three platforms. (e.g., 3 choose 2). In this example, the provider is also tasked with maintaining policy compliance associated with those three platforms and three integrations. If the provider on-boards yet another platform, a total of six integrations may be required (e.g., 4 choose 2). If the provider on-boards a fifth platform, a total of ten integrations may be required (e.g., 5 choose 2). Generally, the difficulties of maintaining integrations between different software platforms (in a permissions policy compliant manner) scales exponentially with the number of platforms provided.

Further to the inadvertent disclosure risk and maintenance obligations associated with inter-platform integrations, each integration is still only configured for information sharing, and not automation of tasks. Although context switching to copy data between two integrated platforms may be reduced, the quantity of tasks required of individual users may not be substantially reduced.

Further solutions involve creating and deploying dedicated automation platforms that may be configured to operate with one, and/or perform automations of, or more platforms of a multiplatform system. These, however, much like automation engines in-built to individual platforms, may be difficult to use, access, or understand. Similarly, much like integrations described above, dedicated automation platforms require separate maintenance and employee training, in addition to licensing costs and physical or virtual infrastructure allocations to support the automation platform(s).

In still further other circumstances, many automations may take longer for a user to create than the time saved by automating that particular task. In these examples, individual users may avoid defining automations altogether, despite that, in aggregate, automation of a given task may save an organization substantial time and cost.

These foregoing and other embodiments are discussed below with reference to FIGS. 1-21. The detailed description given herein with respect to these figures is for explanation only and should not be construed as limiting.

User Input Resulting in Generative Output

FIG. 1 depicts a simplified diagram of a system, such as described herein that can include and/or may receive input from a generative output engine as described herein. The system 100 is depicted as implemented in a client-server architecture, but it may be appreciated that this is merely one example and that other communications architectures are possible.

In particular the system 100 includes a set of host servers 102 which may be one or more virtual or physical computing resources (collectively referred in many cases as a "cloud platform"). In some cases, the set of host servers 102 can be physically collocated or in other cases, each may be positioned in a geographically unique location.

The set of host servers 102 can be communicably coupled to one or more client devices; two example devices are shown as the client device 104 and the client device 106. The client devices 104, 106 can be implemented as any suitable electronic device. In many embodiments, the client devices 104, 106 are personal computing devices such as desktop computers, laptop computers, or mobile phones.

The set of host servers 102 can be supporting infrastructure for one or more backend applications, each of which may be associated with a particular software platform, such as a documentation platform or an issue tracking platform. Other examples include ITSM systems, chat platforms, messaging platforms, and the like. These backends can be communicably coupled to a generative output engine that can be leveraged to provide unique intelligent functionality to each respective backend. For example, the generative output engine can be configured to receive user prompts, such as described above, to modify, create, or otherwise perform operations against content stored by each respective software platform.

By centralizing access to the generative output engine in this manner, the generative output platform can also serve as an integration between multiple platforms. For example, one platform may be a documentation platform and the other platform may be an issue tracking system. In these examples, a user of the documentation platform may input a prompt requesting a summary of the status of a particular project documented in a particular page of the documentation platform. A comprehensive continuation/response to this summary request may pull data or information from the issue tracking system as well.

A user of the client devices may trigger production of generative output in a number of suitable ways. One example is shown in FIG. 1. In particular, in this embodiment, each of the software platforms can share a common feature, such as a common centralized editor rendered in a frame of the frontend user interfaces of both platforms.

Turning to FIG. 1, a portion of the set of host servers 102 can be allocated as physical infrastructure supporting a first platform backend 108 and a different portion of the set of host servers 102 can be allocated as physical infrastructure supporting a second platform backend 110.

The two different platforms may be instantiated over physical resources provided by the set of host servers 102. Once instantiated, the first platform backend 108 and the second platform backend 110 can each communicably couple to a centralized content editing frame service 112 (also referred to more simply as an "editor" or an "editor service").

The centralized content editing frame service 112 can be configured to cause rendering of a frame within respective frontends of each of the first platform backend 108 and the second platform backend 110. In this manner, and as a result of this construction, each of the first platform and the second platform present a consistent user content editing experience.

More specifically, the centralized content editing frame service 112 may be a rich text editor with added functionality (e.g., slash command interpretation, in-line images and media, and so on). As a result of this centralized architecture, multiple platforms in a multiplatform environment can leverage the features of the same rich text editor. This provides a consistent experience to users while dramatically simplifying processes of adding features to the editor.

For example, in one embodiment, a user in a multiplatform environment may use and operate a documentation platform and an issue tracking platform. In this example, both the issue tracking platform and the documentation platform may be associated with a respective frontend and a respective backend. Each platform may be additionally communicably and/or operably coupled to a centralized content editing frame service 112 that can be called by each respective frontend whenever it is required to present the user of that respective frontend with an interface to edit text.

For example, the documentation platform's frontend may call upon the centralized content editing frame service 112 to render, or assist with rendering, a user input interface element to receive user text input when a user of the documentation platform requests to being editing a document stored by the documentation platform backend.

Figure 2A:
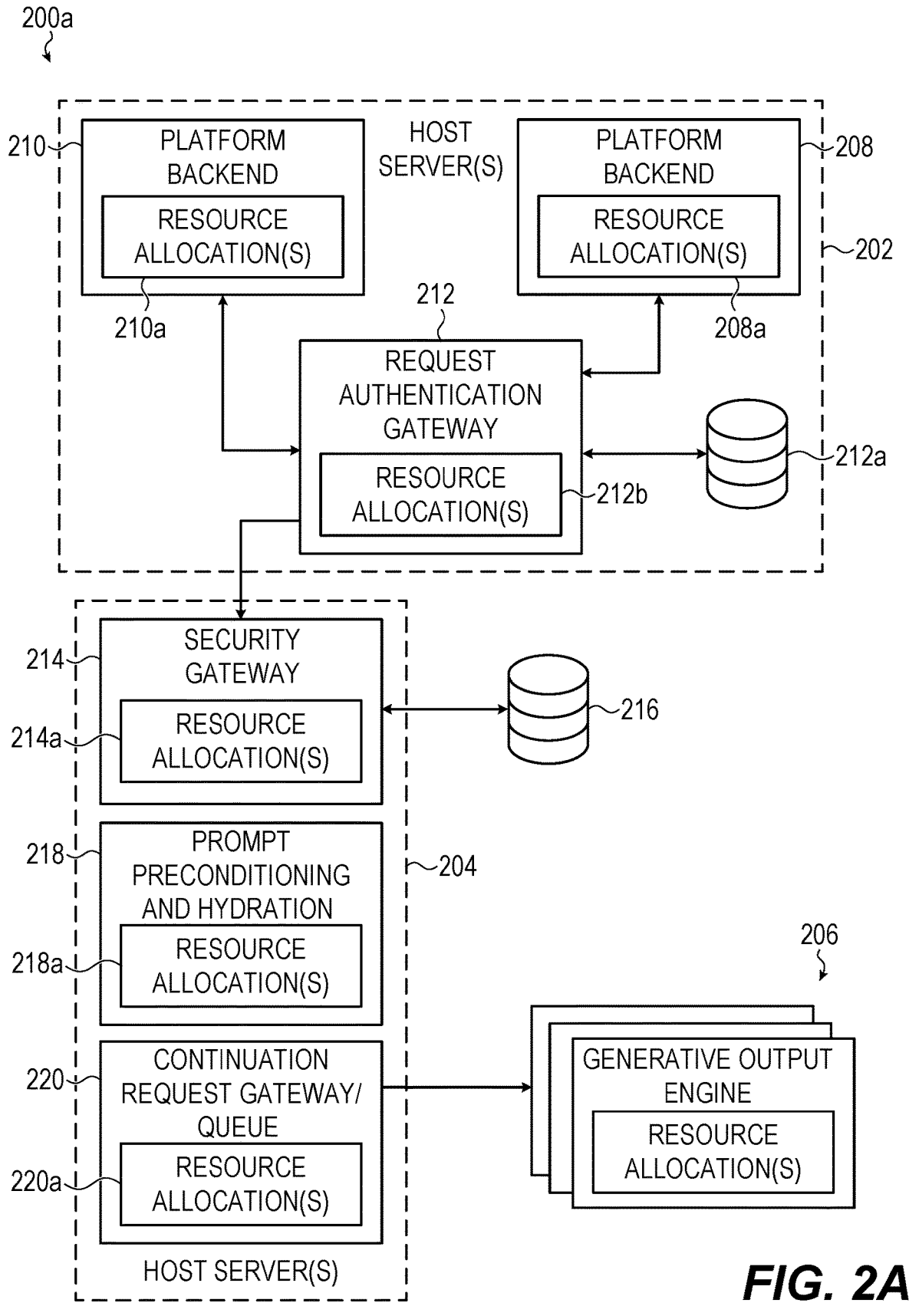
FIG. 2A depicts a simplified diagram of a system, such as described herein that can include and/or may receive input from a generative output engine.
Figure 2B:
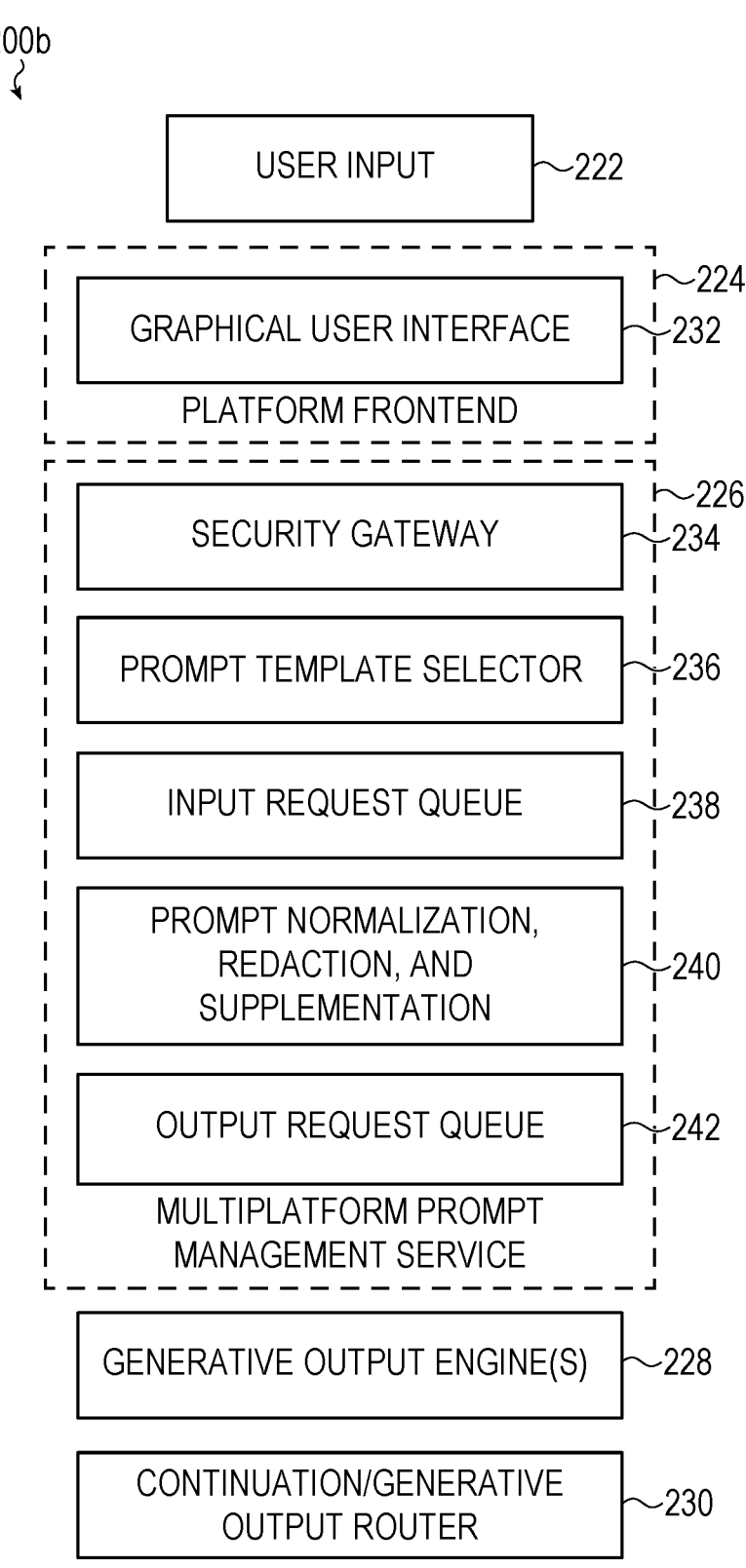
FIG. 2B depicts a functional system diagram of a system that can be used to implement a multiplatform prompt management service.

Similarly, the issue tracking platform's frontend may call upon the centralized content editing frame service 112 to render, or assist with rendering, a user input interface element to receive user text input when a user of the documentation platform opens a new issue (also referred to as a ticket), and begins typing an issue description (see e.g., FIG. 2B).

In these examples, the centralized content editing frame service 112 can parse text input provided by users of the documentation platform frontend and/or the issue tracking platform backend, monitoring for command and control keywords, phrases, trigger characters, and so on. In many cases, for example, the centralized content editing frame service 112 can implement a slash command service that can be used by a user of either platform frontend to issue commands to the backend of the other system.

For example, the user of the documentation platform frontend can input a slash command to the content editing frame, rendered in the documentation platform frontend supported by the centralized content editing frame service 112, in order to type a prompt including an instruction to create a new issue or a set of new issues in the issue tracking platform. Similarly, the user of the issue tracking platform can leverage slash command syntax, enabled by the centralized content editing frame service 112, to create a prompt that includes an instruction to edit, create, or delete a document stored by the documentation platform.

As described herein, a "content editing frame" references a user interface element that can be leveraged by a user to draft and/or modify rich content including, but not limited to: formatted text; image editing; data tabling and charting; file viewing; and so on. These examples are not exhaustive; the content editing elements can include and/or may be implemented to include many features, which may vary from embodiment to embodiment. For simplicity of description the embodiments that follow reference a centralized content editing frame service 112 configured for rich text editing, but it may be appreciated that this is merely one example.

As a result of architectures described herein, developers of software platforms that would otherwise dedicate resources to developing, maintaining, and supporting content editing features can dedicate more resources to developing other platform-differentiating features, without needing to allocate resources to development of software components that are already implemented in other platforms.

In addition, as a result of the architectures described herein, services supporting the centralized content editing frame service 112 can be extended to include additional features and functionality-such as a slash command and control feature-which, in turn, can automatically be leveraged by any further platform that incorporates a content editing frame, and/or otherwise integrates with the centralized content editing frame service 112 itself. In this example, slash commands facilitated by the editor service can be used to receive prompt instructions from users of either frontend. These prompts can be provided as input to a prompt engineering/prompt preconditioning service (such as the prompt management service 114) that, in turn, provides a modified user prompt as input to a generative engine service 116.

The generative output engine service may be hosted over the host servers 102 or, in other cases, may be a software instance instantiated over separate hardware. In some cases, the generative engine service may be a third party service that serves an API interface to which one or more of the host services and/or preconditioning service can communicably couple.

The generative output engine can be configured as described above to provide any suitable output, in any suitable form or format. Examples include content to be added to user-generated content, API request bodies, replacing user-generated content, and so on.

In addition, a centralized content editing frame service 112 can be configured to provide suggested prompts to a user as the user types. For example, as a user begins typing a slash command in a frontend of some platform that has integrated with a centralized content editing frame service 112 as described herein, the centralized content editing frame service 112 can monitor the user's typing to provide one or more suggestions of prompts, commands, or controls (herein, simply "preconfigured prompts") that may be useful to the particular user providing the text input. The suggested preconfigured prompts may be retrieved from a database 118. In some cases, each of the preconfigured prompts can include fields that can be replaced with user-specific content, whether generated in respect of the user's input or generated in respect of the user's identity and session.

In some embodiments, the centralized content editing frame service 112 can be configured to suggest one or more prompts that can be provided as input to a generative output engine as described herein to perform a useful task, such as summarizing content rendered within the centralized content editing frame service 112, reformatting content rendered within the centralized content editing frame service 112, inserting cross-links within the centralized content editing frame service 112, and so on.

The ordering of the suggestion list and/or the content of the suggestion list may vary from user to user, user role to user role, and embodiment to embodiment. For example, when interacting with a documentation system, a user having a role of "developer" may be presented with prompts associated with tasks related to an issue tracking system and/or a code repository system.

Alternatively, when interacting with the same documentation system, a user having a role of "human resources professional" may be presented with prompts associated with manipulating or summarizing information presented in a directory system or a benefits system, instead of the issue tracking system or the code repository system.

More generally, in some embodiments described herein, a centralized content editing frame service 112 can be configured to suggest to a user one or more prompts that can cause a generative output engine to provide useful output and/or perform a useful task for the user. These suggestions/prompts can be based on the user's role, a user interaction history by the same user, user interaction history of the user's colleagues, or any other suitable filtering/selection criteria.

In addition to the foregoing, a centralized content editing frame service 112 as described herein can be configured to suggest discrete commands that can be performed by one or more platforms. As with preceding examples, the ordering of the suggestion list and/or the content of the suggestion list may vary from embodiment to embodiment and user to user. For example, the commands and/or command types presented to the user may vary based on that user's history, the user's role, and so on.

More generally and broadly, the embodiments described herein reference systems and methods for sharing user interface elements rendered by a centralized content editing frame service 112 and features thereof (such as a slash command processor), between different software platforms in an authenticated and secure manner. For simplicity of description, the embodiments that follow reference a configuration in which a centralized content editing frame service is configured to implement a slash command feature—including slash command suggestions—but it may be appreciated that this is merely one example and other configurations and constructions are possible.

More specifically, the first platform backend 108 can be configured to communicably couple to a first platform frontend instantiated by cooperation of a memory and a processor of the client device 104. Once instantiated, the first platform frontend can be configured to leverage a display of the client device 104 to render a graphical user interface so as to present information to a user of the client device 104 and so as to collect information from a user of the client device 104. Collectively, the processor, memory, and display of the client device 104 are identified in FIG. 1 as the client devices resources 104a-104c, respectively.

As with many embodiments described herein, the first platform frontend can be configured to communicate with the first platform backend 108 and/or the centralized content editing frame service 112. Information can be transacted by and between the frontend, the first platform backend 108 and the centralized content editing frame service 112 in any suitable manner or form or format. In many embodiments, as noted above, the client device 104 and in particular the first platform frontend can be configured to send an authentication token 120 along with each request transmitted to any of the first platform backend 108 or the centralized content editing frame service 112 or the preconditioning service or the generative output engine.

Similarly, the second platform backend 110 can be configured to communicably couple to a second platform frontend instantiated by cooperation of a memory and a processor of the client device 106. Once instantiated, the second platform frontend can be configured to leverage a display of the client device 106 to render a graphical user interface so as to present information to a user of the client device 106 and so as to collect information from a user of the client device 106. Collectively, the processor, memory, and display of the client device 106 are identified in FIG. 1 as the client devices resources 106a-106c, respectively.

As with many embodiments described herein, the second platform frontend can be configured to communicate with the second platform backend 110 and/or the centralized content editing frame service 112. Information can be transacted by and between the frontend, the second platform backend 110 and the centralized content editing frame service 112 in any suitable manner or form or format. In many embodiments, as noted above, the client device 106 and in particular the second platform frontend can be configured to send an authentication token 122 along with each request transmitted to any of the second platform backend 110 or the centralized content editing frame service 112.

As a result of these constructions, the centralized content editing frame service 112 can provide uniform feature sets to users of either the client device 104 or the client device 106. For example, the centralized content editing frame service 112 can implement a slash command processor to receive prompt input and/or preconfigured prompt selection provided by a user of the client device 104 to the first platform and/or to receive input provided by a different user of the client device 106 to the second platform.

As noted above, the centralized content editing frame service 112 ensures that common features, such as slash command handling, are available to frontends of different platforms. One such class of features provided by the centralized content editing frame service 112 invokes output of a generative output engine of a service such as the generative engine service 116.

For example, as noted above, the generative engine service 116 can be used to generate content, supplement content, and/or generate API requests or API request bodies that cause one or both of the first platform backend 108 or the second platform backend 110 to perform a task. In some cases, an API request generated at least in part by the generative engine service 116 can be directed to another system not depicted in FIG. 1. For example, the API request can be directed to a third-party service (e.g., referencing a callback, as one example, to either backend platform) or an integration software instance. The integration may facilitate data exchange between the second platform backend 110 and the first platform backend 108 or may be configured for another purpose.

As with other embodiments described herein, the prompt management service 114 can be configured to receive user input (provided via a graphical user interface of the client device 104 or the client device 106) from the centralized content editing frame service 112. The user input may include a prompt to be continued by the generative engine service 116.

The prompt management service 114 can be configured to modify the user input, to supplement the user input, select a prompt from a database (e.g., the database 118) based on the user input, insert the user input into a template prompt, replace words within the user input, preform searches of databases (such as user graphs, team graphs, and so on) of either the first platform backend 108 or the second platform backend 110, change grammar or spelling of the user input, change a language of the user input, and so on. The prompt management service 114 may also be referred to herein as herein as an "editor assistant service" or a "prompt constructor." In some cases, the prompt management service 114 is also referred to as a "content creation and modification service."

Output of the prompt management service 114 can be referred to as a modified prompt or a preconditioned prompt. This modified prompt can be provided to the generative engine service 116 as an input. More particularly, the prompt management service 114 is configured to structure an API request to the generative engine service 116. The API request can include the modified prompt as an attribute of a structured data object that serves as a body of the API request. Other attributes of the body of the API request can include, but are not limited to: an identifier of a particular LLM or generative engine to receive and continue the modified prompt; a user authentication token; a tenant authentication token; an API authorization token; a priority level at which the generative engine service 116 should process the request; an output format or encryption identifier; and so on. One example of such an API request is a POST request to a Restful API endpoint served by the generative engine service 116. In other cases, the prompt management service 114 may transmit data and/or communicate data to the generative engine service 116 in another manner (e.g., referencing a text file at a shared file location, the text file including a prompt, referencing a prompt identifier, referencing a callback that can serve a prompt to the generative engine service 116, initiating a stream comprising a prompt, referencing an index in a queue including multiple prompts, and so on; many configurations are possible).

In response to receiving a modified prompt as input, the generative engine service 116 can execute an instance of a generative output engine, such as an LLM. As noted above, in some cases, the prompt management service 114 can be configured to specify what engine, engine version, language, language model or other data should be used to continue a particular modified prompt.

The selected LLM or other generative engine continues the input prompt and returns that continuation to the caller, which in many cases may be the prompt management service 114. In other cases, output of the generative engine service 116 can be provided to the centralized content editing frame service 112 to return to a suitable backend application, to in turn return to or perform a task for the benefit of a client device such as the client device 104 or the client device 106. More particularly, it may be appreciate that although FIG. 1 is illustrated with only the prompt management service 114 communicably coupled to the generative engine service 116, this is merely one example and that in other cases the generative engine service 116 can be communicably coupled to any of the client device 106, the client device 104, the first platform backend 108, the second platform backend 110, the centralized content editing frame service 112, or the prompt management service 114.

In some cases, output of the generative engine service 116 can be provided to an output processor or gateway configured to route the response to an appropriate destination. For example, in an embodiment, output of the generative engine may be intended to be prepended to an existing document of a documentation system. In this example, it may be appropriate for the output processor to direct the output of the generative engine service 116 to the frontend (e.g., rendered on the client device 104, as one example) so that a user of the client device 104 can approve the content before it is prepended to the document. In another example, output of the generative engine service 116 can be inserted into an API request directly to a backend associated with the documentation system. The API request can cause the backend of the documentation system to update an internal object representing the document to be updated. On an update of the document by the backend, a frontend may be updated so that a user of the client device can review and consume the updated content.

In other cases, the output processor/gateway can be configured to determine whether an output of the generative engine service 116 is an API request that should be directed to a particular endpoint. Upon identifying an intended or specified endpoint, the output processor can transmit the output, as an API request to that endpoint. The gateway may receive a response to the API request which in some examples, may be directed to yet another system (e.g., a notification that an object has been modified successfully in one system may be transmitted to another system).

More generally, the embodiments described herein and with particular reference to FIG. 1 relate to systems for collecting user input, modifying that user input into a particularly engineered prompt, and submitting that prompt as input to a trained large language model. Output of the LLM can be used in a number of suitable ways.

In some embodiments, user input can be provided by text input that can be provided by a user typing a word or phrase into an editable dialog box such as a rich text editing frame rendered within a user interface of a frontend application on a display of a client device. For example, the user can type a particular character or phrase in order to instruct the frontend to enter a command receptive mode. In some cases, the frontend may render an overlay user interface that provides a visual indication that the frontend is ready to receive a command from the user. As the user continues to type, one or more suggestions may be shown in a modal UI window.

These suggestions can include and/or may be associated with one or more "preconfigured prompts" that are engineered to cause an LLM to provide particular output. More specifically, a preconfigured prompt may be a static string of characters, symbols and words, that causes—deterministically or pseudo-deterministically—the LLM to provide consistent output. For example, a preconfigured prompt may be "generate a summary of changes made to all documents in the last two weeks." Preconfigured prompts can be associated with an identifier or a title shown to the user, such as "Summarize Recent System Changes." In this example, a button with the title "Summarize Recent System Changes" can be rendered for a user in a UI as described herein. Upon interaction with the button by the user, the prompt string "generate a summary of changes made to all documents in the last two weeks" can be retrieved from a database or other memory, and provided as input to the generative engine service 116.

Suggestions rendered in a UI can also include and/or may be associated with one or more configurable or "templatized prompts" that are engineered with one or more fields that can be populated with data or information before being provided as input to an LLM. An example of a templatized prompt may be "summarize all tasks assigned to $ {user} with a due date in the next 2 days." In this example, the token/field/variable $ {user} can be replaced with a user identifier corresponding to the user currently operating a client device.

This insertion of an unambiguous user identifier can be performed by the client device, the platform backend, the centralized content editing frame service, the prompt management service, or any other suitable software instance. As with preconfigured prompts, templatized prompts can be associated with an identifier or a title shown to the user, such as "Show My Tasks Due Soon." In this example, a button with the title "Show My Tasks Due Soon" can be rendered for a user in a UI as described herein. Upon interaction with the button by the user, the prompt string "summarize all tasks assigned to user123 with a due date in the next 2 days" can be retrieved from a database or other memory, and provided as input to the generative engine service 116.

Suggestions rendered in UI can also include and/or may be associated with one or more "engineered template prompts" that are configured to add context to a given user input. The context may be an instruction describing how particular output of the LLM/engine should be formatted, how a particular data item can be retrieved by the engine, or the like. As one example, an engineered template prompt may be "$ {user prompt}. Provide output of any table in the form of a tab delimited table formatted according to the markdown specification." In this example, the variable $ {user prompt} may be replaced with the user prompt such that the entire prompt received by the generative engine service 116 can include the user prompt and the example sentence describing how a table should be formatted.

In yet other embodiments, a suggestion may be generated by the generative engine service 116. For example, in some embodiments, a system as described herein can be configured to assist a user in overcoming a cold start/blank page problem when interacting with a new document, new issue, or new board for the first time. For example, an example backend system may be Kanban board system for organizing work associated with particular milestones of a particular project. In these examples, a user needing to create a new board from scratch (e.g., for a new project) may be unsure how to begin, causing delay, confusion, and frustration.

In these examples, a system as described herein can be configured to automatically suggest one or more prompts configured to obtain output from an LLM that programmatically creates a template board with a set of template cards. Specifically, the prompt may be a preconfigured prompt as described above such as "generate a JSON document representation of a Kanban board with a set of cards each representing a different suggested task in a project for creating a new iced cream flavor." In response to this prompt, the generative engine service 116 may generate a set of JSON objects that, when received by the Kanban platform, are rendered as a set of cards in a Kanban board, each card including a different title and description corresponding to different tasks that may be associated with steps for creating a new iced cream flavor. In this manner, the user can quickly be presented with an example set of initial tasks for a new project.

In yet other examples, suggestions can be configured to select or modify prompts that cause the generative engine service 116 to interact with multiple systems. For example, a suggestion in a documentation system may be to create a new document content section that summarizes a history of agent interactions in an ITSM system. In some cases, the generative engine service 116 can be called more than once (and/or it may be configured to generate its own follow-up prompts or prompt templates which can be populated with appropriate information and re-submitted to the generative engine service 116 to obtain further generative output. More simply, in some embodiments, generative output may be recursive, iterative, or otherwise multi-step in some embodiments.

These foregoing embodiments depicted in FIG. 1 and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, it may be appreciated that all software instances described above are supported by and instantiated over physical hardware and/or allocations of processing/memory capacity of physical processing and memory hardware. For example, the first platform backend 108 may be instantiated by cooperation of a processor and memory collectively represented in the figure as the resource allocations 108*a*.

Similarly, the second platform backend 110 may be instantiated over the resource allocations 110*a* (including processors, memory, storage, network communications systems, and so on). Likewise, the centralized content editing frame service 112 is supported by a processor and memory and network connection (and/or database connections) collectively represented for simplicity as the resource allocations 112*a*.

The prompt management service 114 can be supported by its own resources including processors, memory, network connections, displays (optionally), and the like represented in the figure as the resource allocations 114*a*.

In many cases, the generative engine service 116 may be an external system, instantiated over external and/or third-party hardware which may include processors, network connections, memory, databases, and the like. In some embodiments, the generative engine service 116 may be instantiated over physical hardware associated with the host servers 102. Regardless of the physical location at which (and/or the physical hardware over which) the generative engine service 116 is instantiated, the underlying physical hardware including processors, memory, storage, network connections, and the like are represented in the figure as the resource allocations 116*a*.

Further, although many examples are provided above, it may be appreciated that in many embodiments, user permissions and authentication operations are performed at each communication between different systems described above. Phrased in another manner, each request/response transmitted as described above or elsewhere herein may be accompanied by user authentication tokens, user session tokens, API tokens, or other authentication or authorization credentials.

Generally, generative output systems, as described herein, should not be usable to obtain information from an organization's datasets that a user is otherwise not permitted to obtain. For example, a prompt of "generate a table of social security numbers of all employees" should not be executable. In many cases, underlying training data may be siloed based on user roles or authentication profiles. In other cases, underlying training data can be preconditioned/scrubbed/tagged for particularly sensitive datatypes, such as personally identifying information. As a result of tagging, prompts may be engineered to prevent any tagged data from being returned in response to any request. More particularly, in some configurations, all prompts output from the prompt management service 114 may include a phrase directing an LLM to never return particular data, or to only return data from particular sources, and the like.

In some embodiments, the system 100 can include a prompt context analysis instance configured to determine whether a user issuing a request has permission to access the resources required to service that request. For example, a prompt from a user may be "Generate a text summary in Document123 of all changes to Kanban board 456 that do not have a corresponding issue tagged in the issue tracking system." In respect of this example, the prompt context analysis instance may determine whether the requesting user has permission to access Document123, whether the requesting user has written permission to modify Document123, whether the requesting user has read access to Kanban board 456, and whether the requesting user has read access to referenced issue tracking system. In some embodiments, the request may be modified to accommodate a user's limited permissions. In other cases, the request may be rejected outright before providing any input to the generative engine service 116.

Furthermore, the system can include a prompt context analysis instance or other service that monitors user input and/or generative output for compliance with a set of policies or content guidelines associated with the tenant or organization. For instance, the service may monitor the content of a user input and block potential ethical violations including hate speech, derogatory language, or other content that may violate a set of policies or content guidelines. The service may also monitor output of the generative engine to ensure the generative content or response is also in compliance with policies or guidelines. To perform these monitoring activities, the system may perform natural language processing on the monitored content in order to detect key words or phrases that indicate potential content violations. A trained model may also be used that has been trained using content known to be in violation of the content guidelines or policies.

FIGS. 2A-2B depicts system diagrams and network/communication architectures that may support a system as described herein. Referring to FIG. 2A, the system 200*a* includes a first set of host servers 202 associated with one or more software platform backends. These software platform backends can be communicably coupled to a second set of host servers 204 purpose configured to process requests and responses to and from one or more generative output engines 206.

Specifically, the first set of host servers 202 (which, as described above can include processors, memory, storage, network communications, and any other suitable physical hardware cooperating to instantiate software) can allocate certain resources to instantiate a first and second platform backend, such as a first platform backend 208 and a second platform backend 210. Each of these respective backends can be instantiated by cooperation of processing and memory resources associated to each respective backend. As illustrated, such dedicated resources are identified as the resource allocations 208*a* and the resource allocations 210*a*.

Each of these platform backends can be communicably coupled to an authentication gateway 212 configured to verify, by querying a permissions table, directory service, or other authentication system (represented by the database 212*a*) whether a particular request for generative output from a particular user is authorized. Specifically, the second platform backend 210 may be a documentation platform used by a user operating a frontend thereof.

The user may not have access to information stored in an issue tracking system. In this example, if the user submits a request through the frontend of the documentation platform to the backend of the documentation platform that in any way references the issue tracking system, the authentication gateway 212 can deny the request for insufficient permissions. This example is merely one and is not intended to be limiting; many possible authorization and authentication operations can be performed by the authentication gateway 212. The authentication gateway 212 may be supported by physical hardware resources, such as a processor and memory, represented by the resource allocations 212*b*.

Once the authentication gateway 212 determines that a request from a user of either platform is authorized to access data or resources implicated in service that request, the request may be passed to a security gateway 214, which may be a software instance supported by physical hardware identified in FIG. 2A as the resource allocations 214*a*. The security gateway 214 may be configured to determine whether the request itself conforms to one or more policies or rules (data and/or executable representations of which may be stored in a database 216) established by the organization. For example, the organization may prohibit executing prompts for offensive content, value-incompatible content, personally identifying information, health information, trade secret information, unreleased product information, secret project information, and the like. In other cases, a request may be denied by the security gateway 214 if the prompt requests beyond a threshold quantity of data.

Once a particular user-initiated prompt has been sufficiently authorized and cleared against organization-specific generative output rules, the request/prompt can be passed to a preconditioning and hydration service 218 configured to populate request-contextualizing data (e.g., user ID, page ID, project ID, URLs, addresses, times, dates, date ranges, and so on), insert the user's request into a larger engineered template prompt and so on. Example operations of a preconditioning instance are described elsewhere herein; this description is not repeated. The preconditioning and hydration service 218 can be a software instance supported by physical hardware represented by the resource allocations 218*a*. In some implementations, the hydration service 218 may also be used to rehydrate personally identifiable information (PII) or other potentially sensitive data that has been extracted from a request or data exchange in the system.

One a prompt has been modified, replaced, or hydrated by the preconditioning and hydration service 218, it may be passed to an output gateway 220 (also referred to as a continuation gateway or an output queue). The output gateway 220 may be responsible for enqueuing and/or ordering different requests from different users or different software platforms based on priority, time order, or other metrics. The output gateway 220 can also serve to meter requests to the generative output engines 206.

FIG. 2B depicts a functional system diagram of the system 200*a* depicted in FIG. 2A. In particular, the system 200*b* is configured to operate as a multiplatform prompt management service supporting and ordering requests from multiple users across multiple platforms. In particular, a user input 222 may be received at a platform frontend 224. The platform frontend 224 passes the input to a prompt management service 226 that formalizes a prompt suitable for input to a generative output engine 228, which in turn can provide its output to an output router 230 that may direct generative output to a suitable destination. For example, the output router 230 may execute API requests generated by the generative output engine 228, may submit text responses back to the platform frontend 224, may wrap a text output of the generative output engine 228 in an API request to update a backend of the platform associated with the platform frontend 224, or may perform other operations.

Specifically, the user input 222 (which may be an engagement with a button, typed text input, spoken input, chat box input, and the like) can be provided to a graphical user interface 232 of the platform frontend 224. The graphical user interface 232 can be communicably coupled to a security gateway 234 of the prompt management service 226 that may be configured to determine whether the user input 222 is authorized to execute and/or complies with organization-specific rules.

The security gateway 234 may provide output to a prompt selector 236 which can be configured to select a prompt template from a database of preconfigured prompts, templatized prompts, or engineered templatized prompts. Once the raw user input is transformed into a string prompt, the prompt may be provided as input to a request queue 238 that orders different user request for input from the generative output engine 228. Output of the request queue 238 can be provided as input to a prompt hydrator 240 configured to populate template fields, add context identifiers, supplement the prompt, and perform other normalization operations described herein. In other cases, the prompt hydrator 240 can be configured to segment a single prompt into multiple discrete requests, which may be interdependent or may be independent.

Thereafter, the modified prompt(s) can be provided as input to an output queue at 242 that may serve to meter inputs provided to the generative output engine 228.

These foregoing embodiments depicted in FIGS. 2A-2B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

Figure 3A:
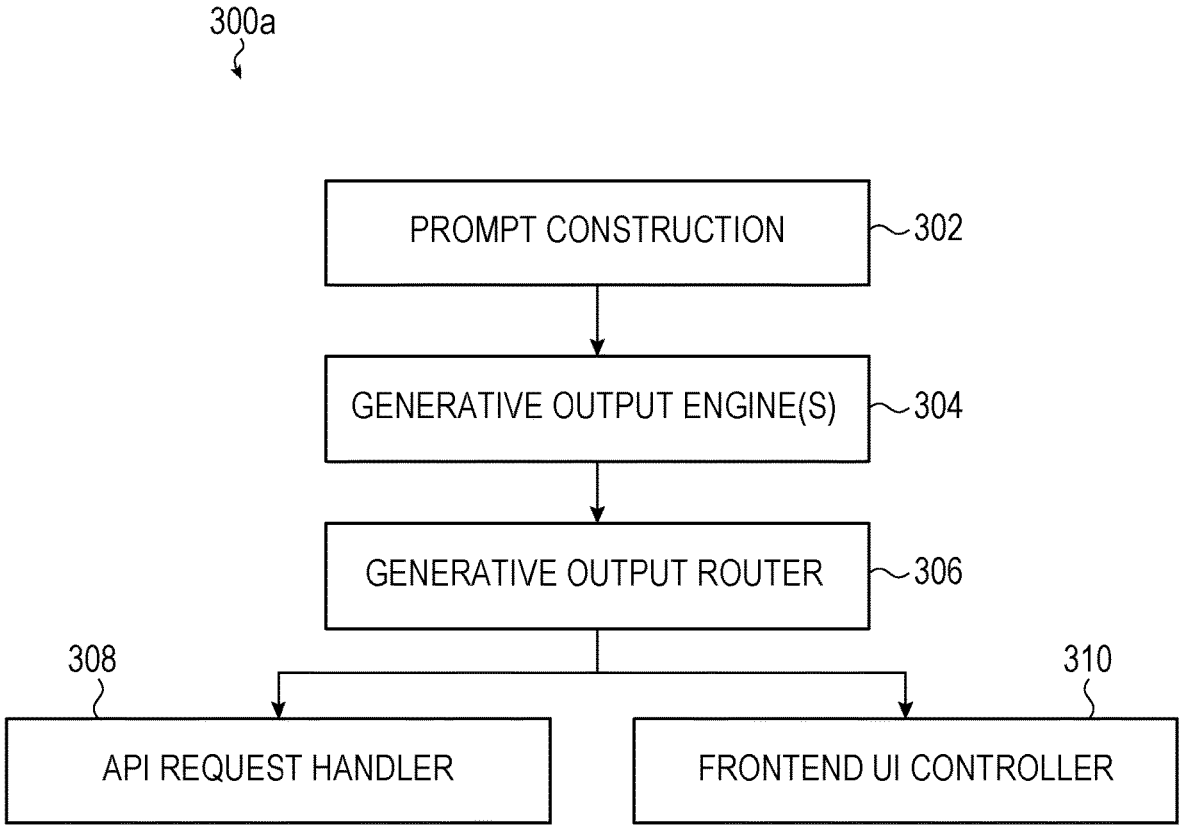
FIG. 3A depicts a simplified system diagram and data processing pipeline.

For example, although many constructions are possible, FIG. 3A depicts a simplified system diagram and data processing pipeline as described herein. The system 300*a* receives user input, and constructs a prompt therefrom at operation 302. After constructing a suitable prompt, and populating template fields, selecting appropriate instructions and examples for an LLM to continue, the modified constructed prompt is provided as input to a generative output engine 304. A continuation from the generative output engine 304 is provided as input to a router 306 configured to classify the output of the generative output engine 304 as being directed to one or more destinations. For example, the router 306 may determine that a particular generative output is an API request that should be executed against a particular API (e.g., such as an API of a system or platform as described herein). In this example, the router 306 may direct the output to an API request handler 308. In another example, the router 306 may determine that the generative output may be suitably directed to a graphical user interface/frontend. For example, a generative output may include suggestions to be shown to a user below a user's partial input, such as shown in FIGS. 2A-2B.

Figure 3B:
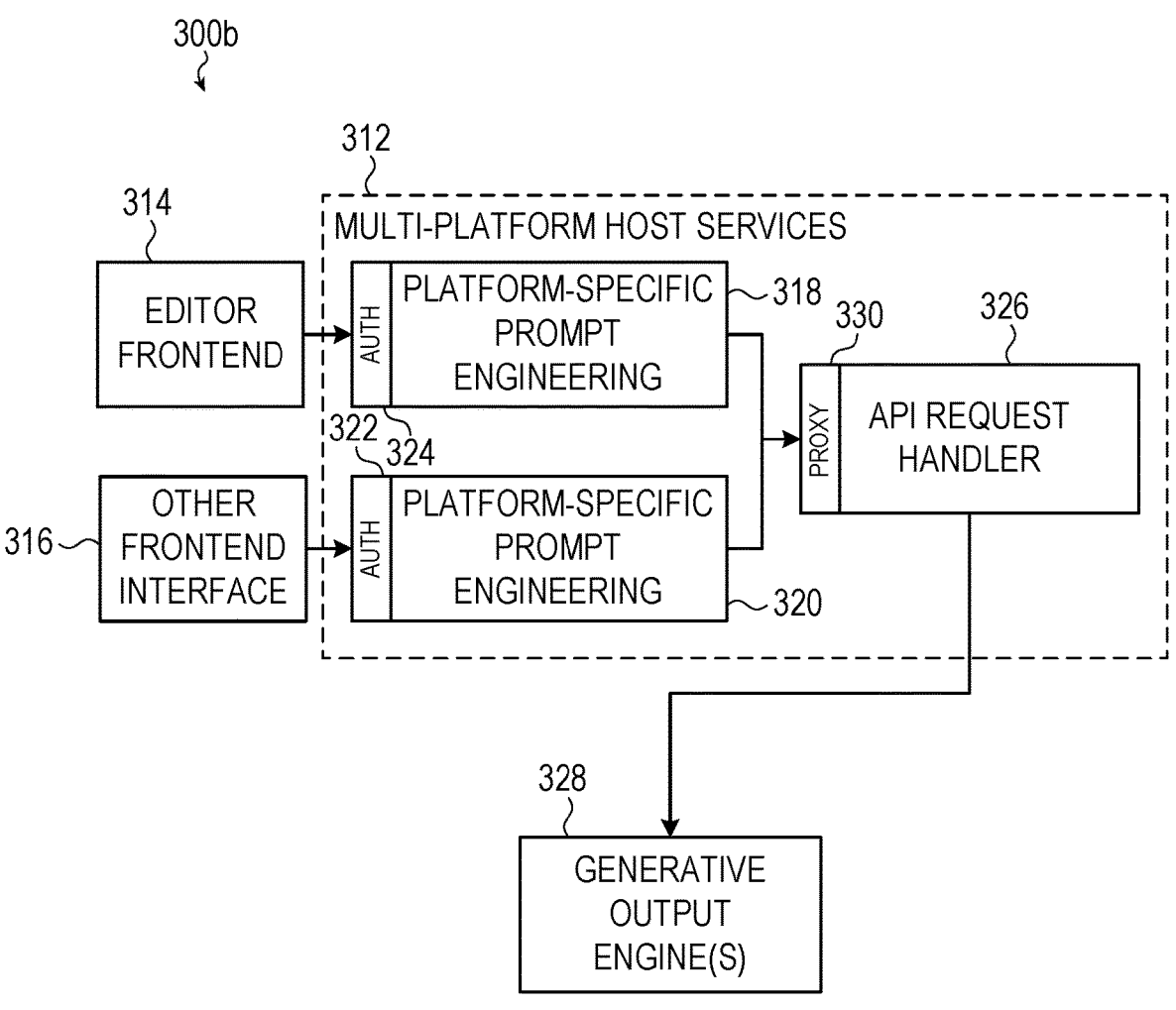
FIG. 3B depicts a system providing multiplatform prompt management as a service.

Another example architecture is shown in FIG. 3B, illustrating a system providing prompt management, and in particular multiplatform prompt management as a service. The system 300*b* is instantiated over cloud resources, which may be provisioned from a pool of resources in one or more locations (e.g., datacenters). In the illustrated embodiment, the provisioned resources are identified as the multi-platform host services 312.

The multi-platform host services 312 can receive input from one or more users in a variety of ways. For example, some users may provide input via an editor region 314 of a frontend, such as described above. Other users may provide input by engaging with other user interface elements 316 unrelated to common or shared features across multiple platforms. Specifically, the second user may provide input to the multi-platform host services 312 by engaging with one or more platform-specific user interface elements. In yet further examples, one or more frontends or backends can be configured to automatically generate one or more prompts for continuation by generative output engines as described herein. More generally, in many cases, user input may not be required and prompts may be requested and/or engineered automatically.

The multi-platform host services 312 can include multiple software instances or microservices each configured to receive user inputs and/or proposed prompts and configured to provide, as output, an engineered prompt. In many cases, these instances—shown in the figure as the platform-specific prompt engineering services 318, 320—can be configured to wrap proposed prompts within engineered prompts retrieved from a database such as described above.

In many cases, the platform-specific prompt engineering services 318, 320 can be each configured to authenticate requests received from various sources. In other cases, requests from editor regions or other user interface elements of particular frontends can be first received by one or more authenticator instances, such as the authentication instances 322, 324. In other cases, a single centralized authentication service can provide authentication as a service to each request before it is forwarded to the platform-specific prompt engineering services 318, 320.

Once a prompt has been engineered/supplemented by one of the platform-specific prompt engineering services 318, 320, it may be passed to a request queue/API request handler 326 configured to generate an API request directed to a generative output engine 330 including appropriate API tokens and the engineered prompt as a portion of the body of the API request. In some cases, a service proxy 330 can interpose the platform-specific prompt engineering services 318, 320 and the request queue/API request handler 326, so as to further modify or validate prompts prior to wrapping those prompts in an API call to the generative output engine 328 by the request queue/API request handler 326 although this is not required of all embodiments.

These foregoing embodiments depicted in FIGS. 2A-2B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

More generally, it may be appreciated that a system as described herein can be used for a variety of purposes and functions to enhance functionality of collaboration tools. Detailed examples follow. Similarly, it may be appreciated that systems as described herein can be configured to operate in a number of ways, which may be implementation specific.

For example, it may be appreciated that information security and privacy can be protected and secured in a number of suitable ways. For example, in some cases, a single generative output engine or system may be used by a multiplatform collaboration system as described herein. In this architecture, authentication, validation, and authorization decisions in respect of business rules regarding requests to the generative output engine can be centralized, ensuring auditable control over input to a generative output engine or service and auditable control over output from the generative output engine. In some constructions, authentication to the generative output engine's services may be checked multiple times, by multiple services or service proxies. In some cases, a generative output engine can be configured to leverage different training data in response to differently-authenticated requests. In other cases, unauthorized requests for information or generative output may be denied before the request is forwarded to a generative output engine, thereby protecting tenant-owned information within a secure internal system. It may be appreciated that many constructions are possible.

Additionally, some generative output engines can be configured to discard input and output once a request has been serviced, thereby retaining zero data. Such constructions may be useful to generate output in respect of confidential or otherwise sensitive information. In other cases, such a configuration can enable multi-tenant use of the same generative output engine or service, without risking that prior requests by one tenant inform future training that in turn informs a generative output provided to a second tenant. Broadly, some generative output engines and systems can retain data and leverage that data for training and functionality improvement purposes, whereas other systems can be configured for zero data retention.

In some cases, requests may be limited in frequency, total number, or in scope of information requestable within a threshold period of time. These limitations (which may be applied on the user level, role level, tenant level, product level, and so on) can prevent monopolization of a generative output engine (especially when accessed in a centralized manner) by a single requester. Many constructions are possible.

Figure 4:
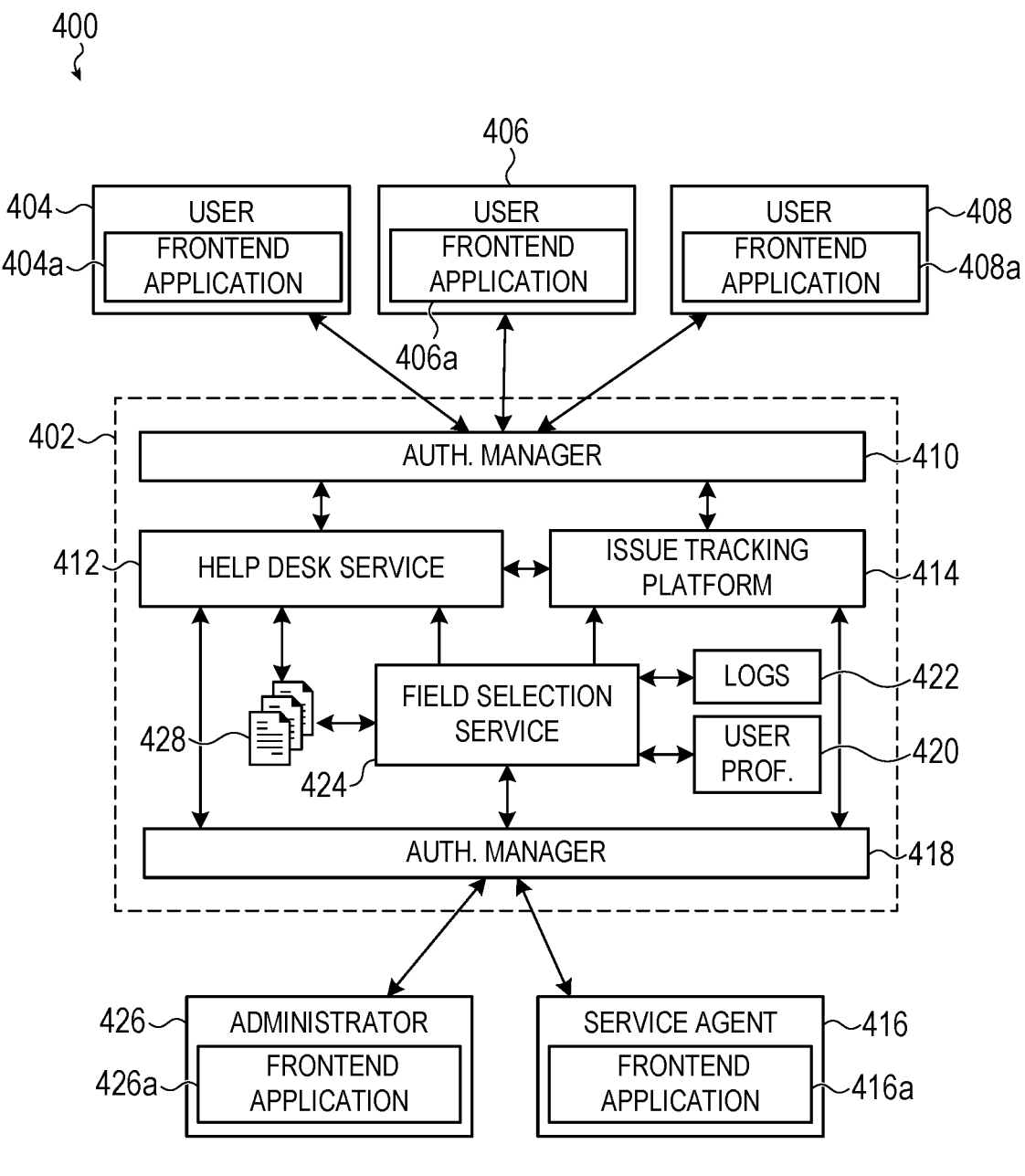
FIG. 4 depicts a system diagram of an issue tracking system configured to select and sort fields, such as described herein.

FIG. 4 shows an example simplified system diagram 400 including the issue tracking system 402 described herein. The system 400 is depicted as implemented in a client-service architecture; however, other implementations and communications architectures are possible. The system 400 may include a set of host servers, which may be one or more virtual or physical computing resources (e.g., as a cloud platform). More generally, the issue tracking system 402 can be the infrastructure and services through which IT and/or enterprise service management services are provided.

The issue tracking system 402 may be communicatively coupled to one or more client devices from users 404, 406, and/or 408, which may be any suitable electronic device. Each client device from users 404-408 may be associated with a different user. The client device from users 404, 406,

408 may each be operable to instantiate instances of a frontend application 404a, 406a, 408a on their device. These frontend applications may be of any of the platforms and/or services of the issue tracking system 402.

As discussed above, the issue tracking system 402 can support infrastructure for one or more backend applications, each of which may be associated with different software platforms that are part of or support the issue tracking system 402. Users 404, 406, 408 may access applications or services of the issue tracking system 402 via an authentication manager 410. The authentication manager 410 may be a single centralized that can provide authentication as a service to each request before it is forwarded to other platforms or services. In some cases, the authentication manager 410 may be authentication instances which are platform- or service-specific. More generally, the authentication manager 410 authenticates users (e.g., from client devices from users 404-408) based on, for example, user credentials. In this example, the authentication manager 410 may receive usernames, passwords, pins, passphrases, biometric data, or other user-identifying information. The user authentication data may be stored and/or tracked using tokens, cookies, or other data elements. Upon successful authentication by the authentication manager 410, the user may access the platforms and/or services of the issue tracking system 402, such as a help desk service 412 and the Issue Tracking Platform 414.

In the current example, the issue tracking system 402 presents multiple different interfaces depending on the level of access and role of a particular authenticated user: a first interface provided by the help desk service 412 providing an issue reporting interface, a second interface provided by the form builder 428 (e.g., leveraging the field selection service 424), which allows administrators to design, configure, and modify the issue reporting interface, and a third interface provided to an issue tracking platform 414, which allows users to process and monitor issues or tickets initiated by the help desk service 412.

In the example of an information technology environment, the help desk service 412 may refer to an interface that can be used to collect information about a user's technical issue and create a ticket that is processed by an issue tracking platform. The help desk service 412 may be operable to accept, classify, and define technical issues provided by users accessing a portal or interface provided by frontend applications 404, 406a, 408a operating on the client devices 404, 406, 408. In some cases the users operating the frontend applications 404, 406a, 408a are authenticated users. In some cases, the users are anonymous or manually enter identifying information through the help desk service 412. In some cases, the help desk service 412 may also provide a knowledge base and reporting services. In some examples, the help desk service 412 may also include community forums where users can ask and answer questions from other users in the community. An example of a help desk service 412 interface is shown in FIGS. 6A-6C, and a workflow is included in FIG. 5A. More generally, the help desk service 412 is the starting point for documenting issues and organizing them according to enterprise policies.

The help desk service 412 may be configured in any number of ways that allows the user to report issues, look for help regarding issues, and the like. In some embodiments, the help desk service 412 may include department-specific or project-specific selections that help route the issue and resolve those issues in a streamlined fashion. In some cases, each department, project, or the like may be associated with different intake interfaces. As described herein, intake interfaces may refer to a series of screens and/or interface forms presented in accordance with a project defined by the form builder 428. These screens are presented to users in a help desk interface. Each intake interface may be tailored to each department, project, or the like to best capture useful information to resolve the issue. As explained above, information is captured via input items (representing fields) contained in each intake interface. The input items may include required and optional information. While hundreds if not thousands of field items may be available for different issues, displaying a limited number of fields as input items is important to avoid overwhelming users, to streamline issue creation, and to cabin the type of information used in the different requests.

In many cases, service agents 416 may access the help desk service 412 on behalf of users 404-408. In other cases, users 404-408 may access the help desk service 412 to report issues and the service agents 416 may be available to resolve those issues once opened (e.g., via the issue tracking platform). For example, service level agreements (SLA) may be in place between a business and the customer (e.g., an enterprise). Service agents 416 may access an authentication manager 418, which may be the same or different from authentication manager 410. Once authenticated, the service agent 416 may access a different frontend application 416a from the frontend applications 404a-408a described above. Via frontend application 416a, the service agent 416 may access additional information not visible to users 404-408. For example, the service agent 416 may access user profiles 420 to obtain user data, such role of the user, one or more groups of which the user is a member, one or more projects that the user is associated with, identifying information, one or more tickets related to the user, and the like. In some cases, the user profile 420 may include user permission settings, user history, system settings, and other system profile data associated with the backend applications of the service management system 402.

In some embodiments, the issue tracking system 402 may include event log modules 422. The event log modules 422 may track and/or store user actions, system events, or other data generated in accordance with activity performed by the system users. The event log module 422 may include navigation events that are generated in response to user navigation to various pages, documents, user selection of certain issue items, user selection of field items, and the like. For example, the user event log modules 422 may be used to determine recently-used fields in a intake interface builder. As another example, the event log module 422 may also include logged activities from users (e.g., customers) at the help desk service 412, including fields filled out, and the like. In some examples, the event log module 422 may also include fields used and/or filled in by a service agent in the issue tracking platform. In some examples, the event log module 422 may also include fields commonly used by the administrator 426 in the intake interface builder. Details of the various events may be accessed by a field selection service 424 for selecting and sorting fields for displaying in issue intake builder.

A field selection service 424 selects and sorts fields in an issue intake builder. An issue intake builder is a service which allows an administrator 426 to build intake interfaces. The intake interfaces determine the number of fields, type of fields, required fields, and the like, to be displayed to users (e.g., users 404-408 or service agents 416) accessing the help desk service 412 and to users accessing the issue tracking platform 444. More specifically, the field selection service 424 is available to administrators 426 to facilitate building custom intake interfaces.

More specifically, an administrator 426 may access the service management system 402 through a frontend application 426*a* executing on a client device. The frontend application 426*a* may be a different application from non-administrator users, such as users 404-408 and service agent 416. For example, the frontend application 426*a* of the administrator 426 may include the intake interface builder which is supported by the field selection service 424. The frontend application 404*a*-408*a* of users 404-408, respectively, may include a more intuitive interface that allows users to quickly report an issue in the help desk service 412. An authentication manager 418, which may be different from authentication manager 410, may retrieve the administrator's 426 user credentials and authenticate the administrator. In some cases, the authentication manager 418 may retrieve different user credentials or employ a higher-security authentication protocol to authenticate the user. For example, the authentication manager 418 may require two-factor authentication.

Once authenticated, the administrator 426 may access an issue intake builder, which instantiates an instance of the field selection service 424. The issue intake builder is part of the issue tracking system 402 interface. The issue intake builder allows administrators to create and edit intake interfaces. In many cases, for each project, new intake interfaces are needed to capture the needs of the project. As described herein, projects may refer to a broad category of portals within the help desk and within the issue tracking platform under which issue intake categories may be organized. For example, a project related to software development for a videogame may have different service requirements from a project related to hardware changes within an enterprise. Accordingly, a first request type may prompt the user to provide details on the version number of the software and a description of the issue. A second request, relating to hardware changes, may prompt the user to provide details on their current hardware and role within the organization. Generally, the issue intake builder allows administrators to determine which fields are visible in a frontend application 404*a* generated by the help desk service 412 when filling out an issue item for a given project. The request form may also be used to determine what fields (and in what order) are visible in an issue tracking system. The fields visible in the issue tracking system may be the same fields or different fields from the fields presented in the intake interface at the help desk.

As explained above, the issue tracking system 402 may have hundreds, thousands, or hundreds of thousands of fields, depending on the size of the enterprise or the business managing the issue tracking system system on behalf of multiple enterprises. These field items may be stored in a database and leveraged by a form builder 428. The form builder 428 may be a service which allows users to configure forms for collecting and organizing data. The forms described herein may be deployed within any platform of the service management system 402.

The field selection service 424 may leverage the user profiles 420, user event logs 422, and existing forms and field elements (e.g., from the form builder 428 or databases associated with the form builder 428) to sort and display suggested fields to the administrator 426. For example, the field selection service 424 may retrieve field items that the administrator has recently used (e.g., while building a different intake interface), field items that other users associated with the administrator have used, field items associated with particular projects, and so on. The field selection service 424 may select certain field items from the field items retrieved to display to the user and sort the selected field items in accordance with a criteria. In some embodiments, the criteria may take into account recently used items, type of field item, frequency of use, whether the field item is associated with a project where the intake interface is being created, field items frequently used together, and so on.

At the frontend application of the interface creation module, the sorted field items may be displayed in a field region. The field region may include the sorted field items displayed as field elements. Each field element may be selectable. For example, a user may drag or select the field element to be included in a request editing region. The request editing region may include selected field elements that form the intake interface. An administrator may change the order in which the field elements are displayed, the settings of each field, and other display preferences. For example, an administrator may edit whether fields are hidden in the help desk interface when a user opens a ticket. In some cases, hidden fields may be automatically populated by the help desk service 412. As another example, an administrator may elect certain fields to be visible and locked to users filling out a help ticket in the help desk interface. In other embodiments, the administrator may elect which fields are optional and required.

Regardless of the selections in the request editing regions, the field elements displayed in the field region are streamlined such that administrators can find relevant fields faster. In some cases, the field elements may be updated as the administrator selects certain fields and/or as other administrator-input is received. In some cases, the field selection service 424 selects a predetermined number of fields, and, upon an administrator selecting all the fields, the service repopulates the field region with a new set of field elements sorted in accordance with a criteria. In this configuration, a user can scroll through limited options in batches.

Once an administrator finishes selecting fields in the request editing region, a intake interface is created. The intake interface may be available in the help desk and include the fields as configured in the request creator. In some cases, the request creator may also modify what fields are displayed in the issue tracking system and/or in other platforms within the service management system. As another example, the request creator may dictate the workflow that an issue takes when routed through the issue tracking system. For example, an intake interface may include a "PRIORITY" field. Upon selecting the "PRIORITY" field to default to "URGENT," a workflow within the issue tracking platform may change to expedite resolution of the issue item. Workflow details are provided in FIGS. 5A-5B.

Figure 5A:
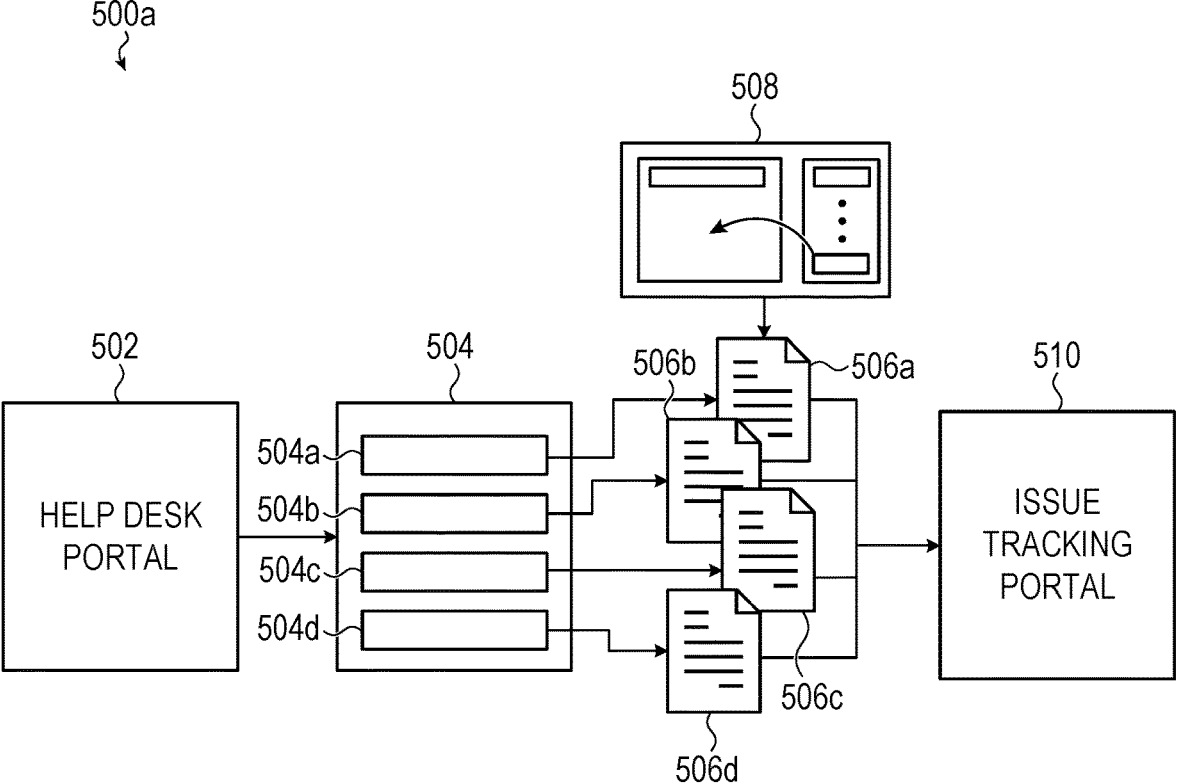
FIG. 5A depicts a workflow of an issue tracking system configured to select and sort fields, such as described herein.
Figure 6C:
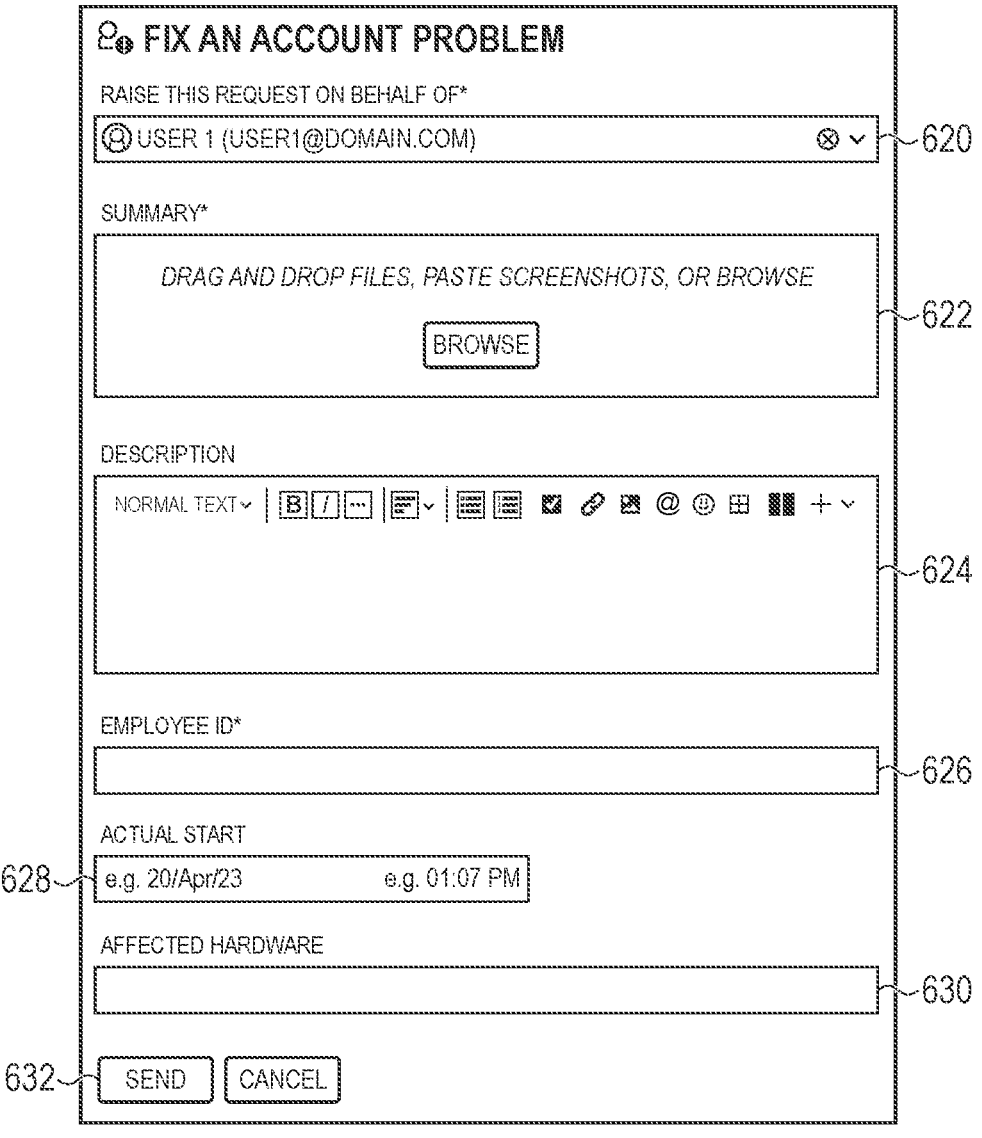

FIG. 5A shows an example workflow 500 for a user reporting an issue. Following authentication, a user (e.g., a service agent or a customer) may access the help desk portal 502. An example graphical user interface is presented in FIGS. 6A-6C. As shown in FIG. 6A, a home page of the help desk portal 502 may include sub-portals, which are defined by a series of interfaces defined in accordance with a project or intake category. Selecting an intake category may cause the portal to route a user to different features of the help desk. For example, the help desk portal 502 may include an ITSM 602 where a user may seek IT-related assistance. Similarly, the help desk may include portals 604 for different departments of an enterprise, including human resources, finances, and so on. The help desk portal 502 may also include a search bar 606 to facilitate finding of information, such as documents relating to a knowledge base.

Upon selecting a sub-portal, such as the ITSM portal 602, an interface for raising an issue is presented, as shown in FIG. 6B. The interface may include multiple input items that correspond to fields, such as a request type field 612, a requestor field 614, a summary field 616, and a description field 618. Upon selecting the request type field 612, the user may be presented with a menu of intake categories. This menu of intake categories may correspond with the menu 504 of FIG. 5A. As shown in FIGS. 6A and 6B, the menu of intake categories allows users to select a request that best fits their needs. For example, "FIX AN ACCOUNT PROBLEM," "GET A GUEST WIFI ACCOUNT," "GET IT HELP," "NEW MOBILE DEVICE," and "ONBOARD NEW EMPLOYEES" may each correspond to different requests. Each of these requests may correspond to intake interfaces 504*a-d* in FIG. 5A.

Upon selection of an intake interface (e.g., 504*a, b, c,* or *d*), a backend application may retrieve a form 506*a-d* that corresponds to the intake interface. Each of these forms may be created by an administrator via a request creator form interface 508. In some embodiments, each form is unique to the intake interface and includes input items that correspond to field elements from the request item builder and which are tailored to the user's issue category. An example form (e.g., 506*a*) is presented in FIG. 6C.

As shown in FIG. 6C, the form is tailored to relevant information relating to a "FIX AN ACCOUNT PROBLEM" issue. For example, the form may include a user field 620, a summary field 622, a description field 624, a department number field 626, an actual start 628, and an affected hardware field 630. As shown in the figure, certain fields may be required, such as the summary field 622, the user field 620, and the department number field 626. As explained above, each of these fields may be tailored to the particular problem.

Once a user (e.g., a customer user, a service agent) fills out and submits the form (e.g., via "SEND" button 632), the service management system may transmit the data to an issue tracking system, which generates an issue item based on the data from the form. As shown in FIG. 5A, a service agent may have access to an issue tracking portal 510, which may be a graphical user interface of the issue tracking system (e.g., Issue Tracking Platform 414). At the issue tracking portal, a user may view the data input into the form from the help desk, view the status of the ticket, view/edit other information, and the like.

The issue tracking portal 510 may display an issue item and relevant tracking information. For example, the data input in the form 506*a* may be displayed in a first display area 402. In some cases, users (e.g., agents, administrators) may edit these fields as more information is received. In some cases, the intake interfaces may include hidden fields. These hidden fields may be displayed to users in the first display area 402.

The issue tracking portal 510 may also gather other data (e.g., from user event logs or databases coupled to the issue tracking system), including similar requests 404 and activity 406. In many cases, enterprises use a service-level agreement (SLA), which specifies the process, timelines, and metrics by which services, such as IT, are provided. The issue tracking system may include issue item metric regions, such as regions 408 and 410, which may track metrics according to the SLA. For example, upon generating an issue item, the issue tracking system may automatically set a time for reply and completion that may correspond to the SLA. Similarly, region 410 may include editable field items that may be used to resolve the issue. For example, an issue item may be assigned to particular service agents, the urgency of the request may be set, and the like. The issue tracking portal 510 may also include other fields 412 which may be used by service agents to track metrics, add labels, track time, and the like.

The issue tracking platform may process each of the issues or tickets in accordance with a workflow or series of predefined states that the issue must traverse in order to be resolved by the issue tracking platform. An example workflow from the time an issue time is created is presented in FIG. 5B. In some embodiments, at the intake interface builder interface, a workflow can be defined contemporaneously with the intake interface and with the issue item view in an issue tracking platform. When an issue is created 512, a workflow for resolving the issue is generated (e.g., via a backend application of the service management portal, such as the issue tracking system). As a first step, the issue may be assigned 514 to a service agent or other users. In some embodiments, the request type and/or other fields from the intake interface may determine the assigning step. For example, a group of users may be assigned to particular intake categories. As another example, a group of users may be assigned to a project where the particular request type can be used. As yet another example, a particular data input to a field (e.g., "AFFECTED HARDWARE") may determine a user or a group of users to be assigned to the issue.

Once an issue item is assigned, the user or group of users assigned to the item may review 516 the issue. On review of the issue, the assigned users may resolve 520 the issue or may transfer 518 the issue, as an example. Upon transferring 518, updated assignees may review 516 the issue again to ensure proper routing of the issue item. In some cases, the issue may be canceled 522 or it may be linked to another issue for a combined resolution. In some cases, depending on the complexity and/or the type of request, the workflow may include additional steps or less steps. More generally, the request type may dictate the number of steps and workflow used for each of the issue items. Accordingly, building a intake interface may determine the fields displayed in the help desk, the fields visible in the issue tracking system, and the workflow associated with the issue item.

Figure 7:
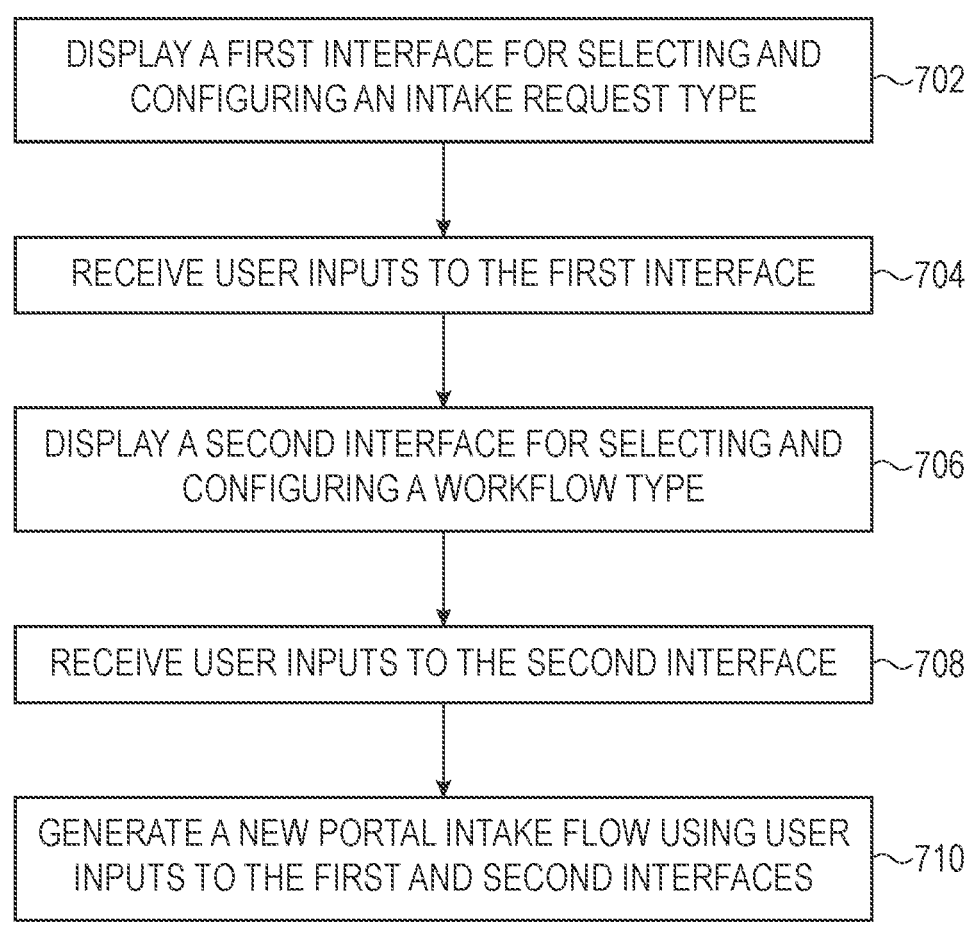
FIG. 7 depicts an example process for creating a new portal intake flow for an issue tracking system.

FIG. 7 shows an example process 700 for creating a new portal intake flow for an issue tracking system. The process 700 can be performed by the systems described herein and be used to gnat a new portal intake flow based on user inputs during the generation process. The new portal intake flow can be used to generate new issues at an issue tracking system, as described herein. Examples of graphical interface for generating a new portal intake flow are shown in FIGS. 8-11.

At operation 702, the process 700 can include displaying a first interface for selecting and configuring an intake request type. The first interface may be an example of an issue intake builder that allows users (e.g., an administrative user) to build intake interfaces, as described herein (e.g., in relation to FIG. 4).

Figure 5B:
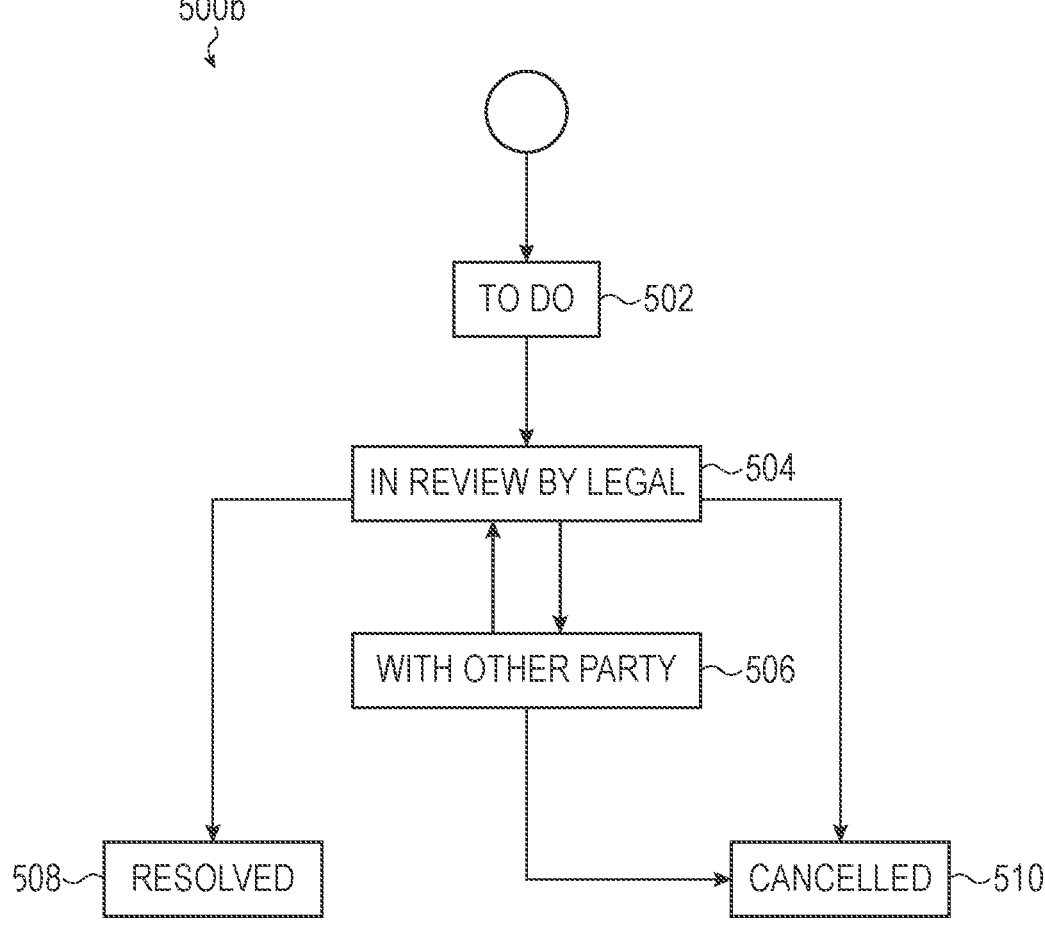
FIG. 5B depicts a workflow of an issue item existing in an issue tracking system, such as described herein.

The user interface can allow custom portal intake flows to be generated, which may be an example of the intake interfaces described herein, and can define a workflow for resolving an issue that is generated (e.g., via a backend application of the service management portal, such as the issue tracking system) such as described in relation to FIGS. 5A and 5B. The use interface can provide options for customizing the portal intake flow, including options to select an intake request type and workflow for an intake flow during the generation process. The process for generating a new portal intake flow may include displaying a first UI that includes a first selection panel having a set of tiles that each correspond to an intake request type. The first selection panel may arrange and/or display tiles based on a category associated with the request types. For example, the first UI may display tiles corresponding to intake request types for IT. As another example, the first UI may display tiles corresponding to intake request types for HR.

The system may receive a user input indicating a selection of a particular tile of the set of tiles. In response to the selection of a particular time, the system may display in the first UI, a first preview panel including a dynamic preview of an intake interface for the request type associated with the selected tile. The intake interface may include intake fields that are used to collect information related to the particular request type as part of the intake portal flow. For example, the fields may include fields for identifying the requestor or a user associated with the request, fields for providing a summary of the issue/request, and so on. The fields displayed in the dynamic preview may be a set of default fields associated with a particular request type. For example, an IT request type may be different fields than an HR request type. Additionally a first IT request type may have different fields from a second different IT request type.

At operation 704, the process 700 can include receiving user inputs to the first interface displaying different fields corresponding to a particular intake request type. The fields shown in the dynamic preview in the first UI may be configurable by the user. For example, the user may remove fields for the request type, add fields for the request type, change parameters and/or information associated with a field, and so on. As part of the portal intake flow generation process, the fields associated with the intake flow may be customized by a user. Accordingly, when the system generates the portal intake flow it will be initially configured with the fields that are selected and/or customized as part of the generation process.

At operation 706, the process 700 can include displaying a second interface for selecting and configuring a workflow type. In response to the system receiving a selection of a particular intake request type, the system may cause a second UI to be displayed. The second UI may include a second selection panel that includes a second set of tiles each corresponding to a workflow type for processing an issue using the issue tracking system. A workflow type may define a process that is used by the issue tracking system to handle a corresponding issue. The workflow type may define a set of statuses and transitions as part of the process for handling an issue. For example, when an issue is first submitted using the portal intake flow, the issue tracking system may define "to-do" or pending status, once the issue has been picked up or begun to be worked on, the system may update the status to "in progress," and once the issue has been resolved the system may update the status to "completed." The process intake flow may also define actions that occur in response to updates to the status or actions taken on the issue.

At operation 708, the process 700 can include receiving user inputs to the second interface. The issue tracking system may include different workflow types and the user may select a tile corresponding to the desired workflow type to assign that workflow to the portal intake flow. In some cases, the second UI can also display a preview panel that includes a schematic of a particular workflow for a selected tile of the second set of tiles. For example, if the system detects an input to a particular tile corresponding to a particular workflow type, the system may cause a preview of the particular workflow to be displayed in the preview panel. The preview of the particular workflow may include a flow diagram that outlines the workflow process and/or steps taken in response to particular events occurring. In some cases, a user may modify a particular workflow in the preview panel.

At operation 710, the process 700 can include generating a new portal intake flow using user inputs to the first and second interfaces. In response to a selection of a workflow using the second interface, the system can create the new portal intake flow based on the inputs/selections during the generation process. The new portal intake flow be used by the issue tracking system to generate a new issue using a UI that is configured in accordance with the selected and/or modified intake request type and having a workflow configured in accordance with the selected workflow. Accordingly, the process of generating the portal intake flow allows a user to configure the workflow during the generation process.

Figure 8:
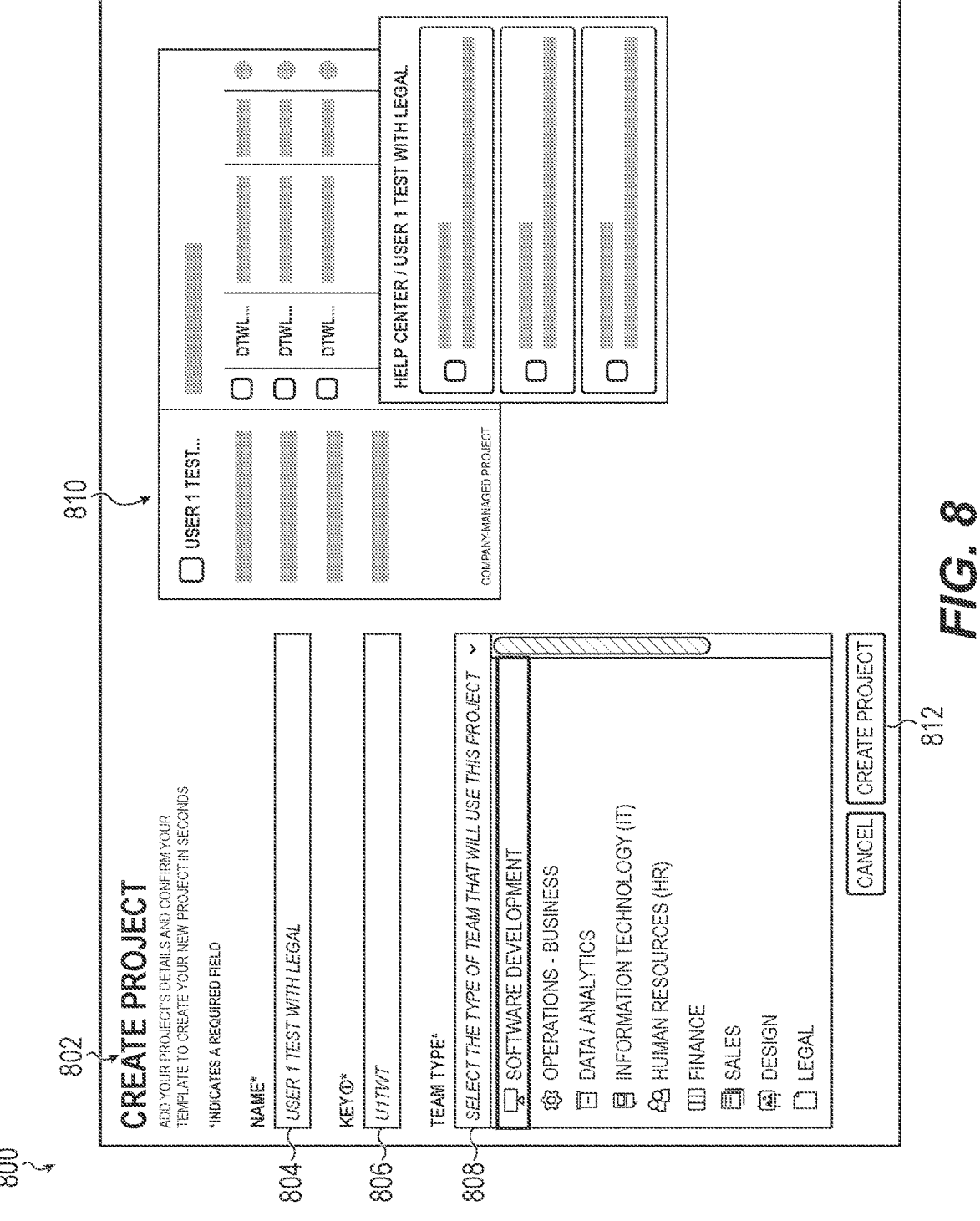
FIG. 8 depicts a user interface for creating a portal intake flow for an issue tracking system.

FIG. 8 depicts a user interface 800 for creating a portal intake flow for an issue tracking system. The portal intake flows may be an example of the workflows described herein and the interface 800 may be an example of the intake interface and/or issue intake builder as described herein.

The user interface 800 can be part of a first web-based service (e.g., a form builder/issue intake builder as described herein) for the issue tracking. The intake flows generated by the system can be part of a second web-based service (e.g., an issue reporting interface) for the issue tracking system that presents the intake flows to users and generates service tickets at the issue tracking system based on user inputs to the intake flows. The user interface 800 and process for generating a portal intake flow can be performed using the devices and systems described herein.

The user interface 800 can be a first user interface in a series of user interfaces that are used to guide a user through a process for creating a portal intake flow. The user interface 800 may include a first region 802 that includes one or more input areas for generating a portal intake flow. The first region 802 can include a first input area 804 for assigning a name to the portal intake flow. The system may be configured to the first input area 804 to receive input from the user. The first region 802 can also include a second input area 806 for assigning a key to the portal intake flow. The key may be used as a unique identification for the portal intake flow. The first region 802 can also include a third input area 808 for assigning the portal intake flow to a particular team, such as an IT team, HR team, Legal team, and so on. The assignment may be used to group the portal intake flow with other intake flows. For example, a user using the second web-based service to submit an issue at the issue tracking system may view portal intake flows based on an assigned team. Accordingly, the user may select an option to view all portal intake flows associated with a particular team.

The user interface 800 can also include a second region 810 that generated a preview of the portal intake flow using the information that was input by the user in the input areas. For example, the preview may show a summary of the information input by the user and/or some default options associated with the portal intake flow.

The user interface 800 may also include an option 812 to start the process for generating the portal intake flow. In response to selecting the option 812, the system may display a second user interface that is used to further define one or more parameters for the portal intake flow.

Figure 9:
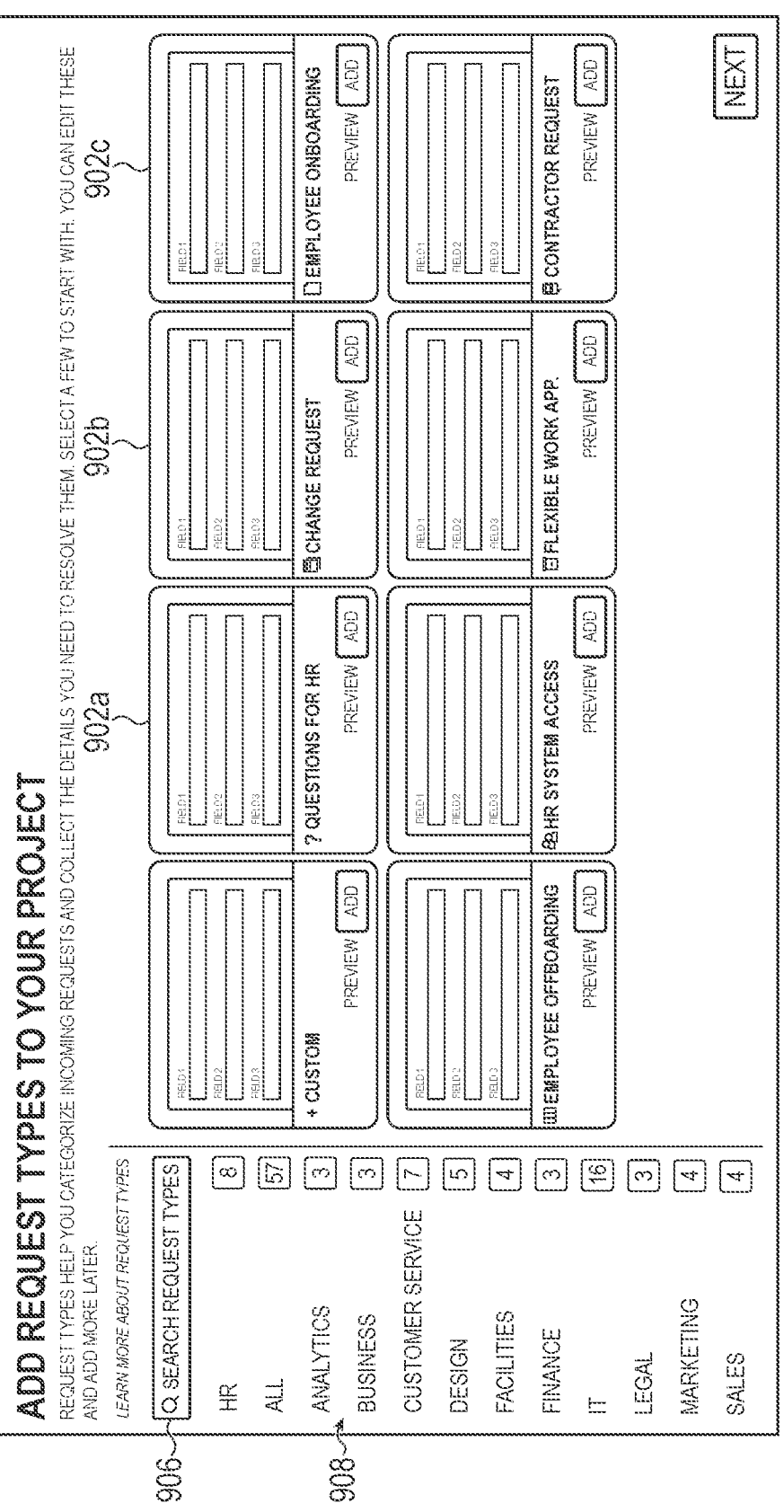
FIG. 9 depicts a user interface including tiles corresponding to intake request type.

FIG. 9 depicts a user interface including 900 that is used to define a request type for a portal intake flow. The interface can be displayed in response to a user inputting information using the user interface 800 and/or selecting the option 812 to start a process for generating a portal intake flow. In some cases the user interface 900 can be the initial/first interface that is presented to the user as part of the portal intake flow generation process. The user interface 900 and process for generating a portal intake flow can be performed using the devices and systems described herein.

The user interface 900 can include a set of tiles 902 (only some of which are labeled) each corresponding to intake request type. For example, the system may have a defined set of request types that can be modified/customized as part of the portal intake flow generation process. In some cases, the request types presented as tiles 902 in the user interface 900 can be based on a team type selected in the first user interface 800 (e.g., as input to the third input area). In other cases, the second user interface 900 can include an option 904 for selecting a particular team. The system may associate one or more request types with a particular team and display those request types in response to a user selecting a particular team. The request types associated with a particular team may be request types that are commonly used by members of that team. For example, IT may have request types that are configured to be used for common IT issues, such as trouble logging in, trouble connecting to the internet and so on. A legal team may have request types that are configured for common legal issues such as contract review. In some cases, a user may use a search input function 906 to search for particular teams, categories of request type or specific request types.

In response to the user selecting a HR category for the request types, the set of tiles 902 can include tiles 902 correspond to default request types. Additional or alternatively, the tiles 902 can include request types that have been configured for previously generated portal intake flows. For example, a first tile 902a may correspond to a first HR request type that is associated with sending a question to HR. A second tile 902b may correspond to a second HR request type that is associated with a change request to Hr. A third tile 902c may be associated with a third HR request type that is used for employee onboarding. In some cases, the set of tiles may also include a custom request type, which may not have any HR specific configuration or a predefined configuration.

In response to a user selecting a particular tile 902 and/or selecting an option 908 to use the intake request type associated with the selected tile 902, the system may update the user interface 900 or display a new user interface that includes a preview panel that includes a dynamic interface for the selected intake request type.

Figure 10:
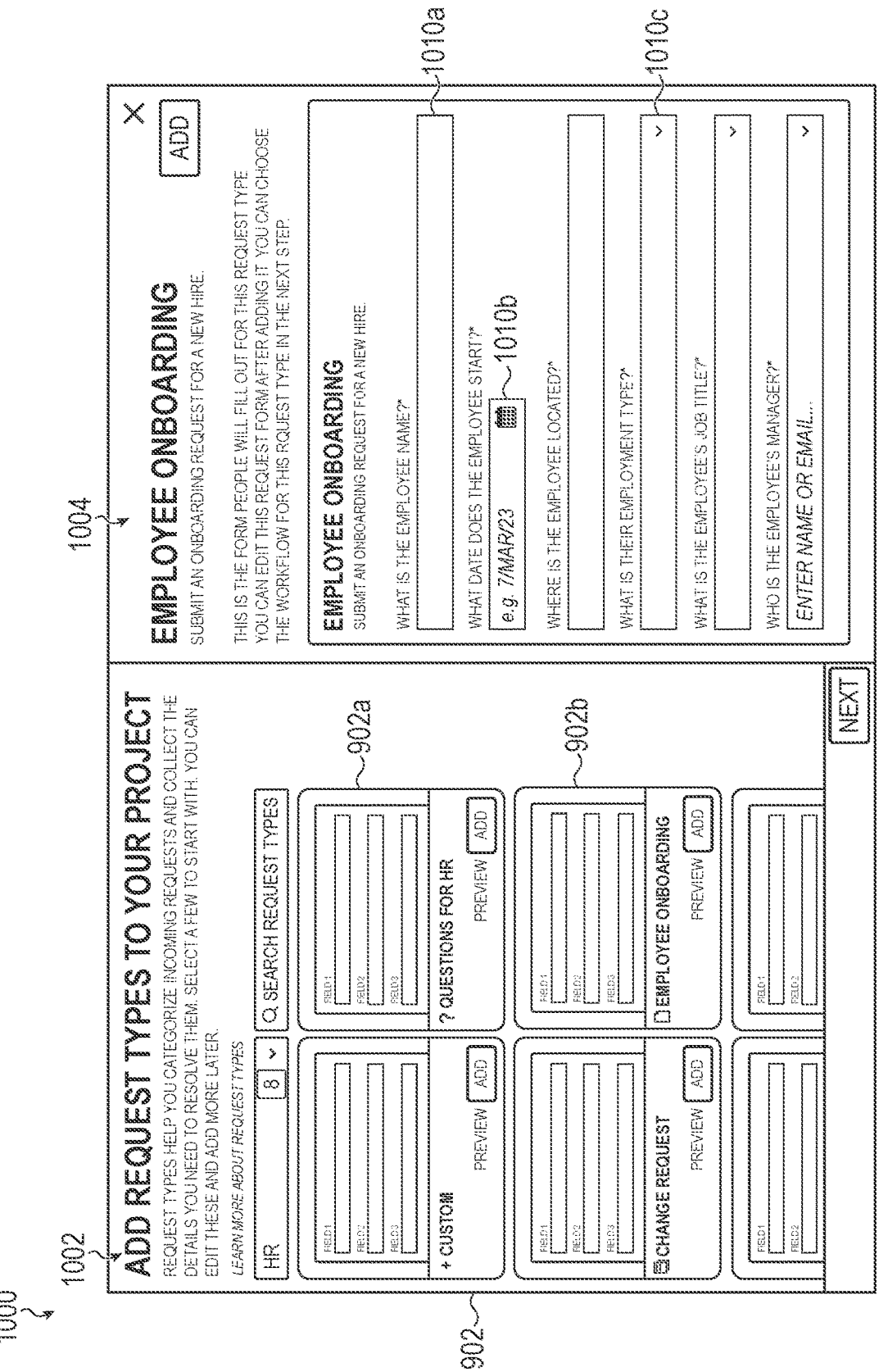
FIG. 10 depicts a user interface including a preview panel including a set of intake fields corresponding to request type of a selected tile.

FIG. 10 depicts a user interface 1000 including a preview panel including a set of intake fields corresponding to request type of a selected tile. The user interface can be an updated version of the interface 900 or a new interface that is displayed in response to selection of a particular tile 902 corresponding to an intake request type. The interface 1000 and process for generating a portal intake flow can be performed using the devices and systems described herein.

The interface 1000 can include a first selection panel 1002 that displays tiles 902 associated with different intake request types. The interface 1000 can include a preview panel 1004 that includes a dynamic preview of an intake interface for the intake request type associated with a selected tile 902. For example, if a user selects the first tile 902a, the preview panel 1004 can include a dynamic preview of the intake interface for the corresponding intake request type.

The dynamic preview can include a set of intake fields 1010 arranged in accordance with an intake form layout. The intake fields 1010 can include input areas for entering information about an issue when using the portal intake flow. In some cases, the dynamic preview can include a default set of intake fields 1010 that may be associated with the particular intake request type. A user may modify one or more aspects of the fields 1010. For example, a user may use the dynamic interface to add fields, remove fields, modify text associated with a field, change the order of fields and/or otherwise parameters of the fields.

A first field 1010a may include a field that is configured to receive a text input from a user while generating an issue. A second field 1010b provides an example of a field that includes a date selection tool, in which a user may interact with a calendar feature to select a date. A third field provides an example of a drop-down field in which the field displays a list of items that are available to select in a drop down menu. The fields 1010 are provided as examples and other types of fields are possible.

The dynamic preview can be used to define the intake parameters associated with the corresponding portal intake flow. Accordingly, the configuration of the fields in the preview panel is used to generate parameters of the portal intake flow.

In response to receiving a selection of a particular intake request type and inputs configuring one or more fields 1010, the system can be configured to display a user interface configuring a workflow for the portal intake flow. In some cases, the user interface 800 may include a selectable element for displaying the user interface for configurating the workflow. For example, the selectable element may include a UI element that is displayed as part of the user interface 1000 (e.g., in a region of an intake request type and/or the corresponding dynamic preview for the intake request type).

Figure 11:
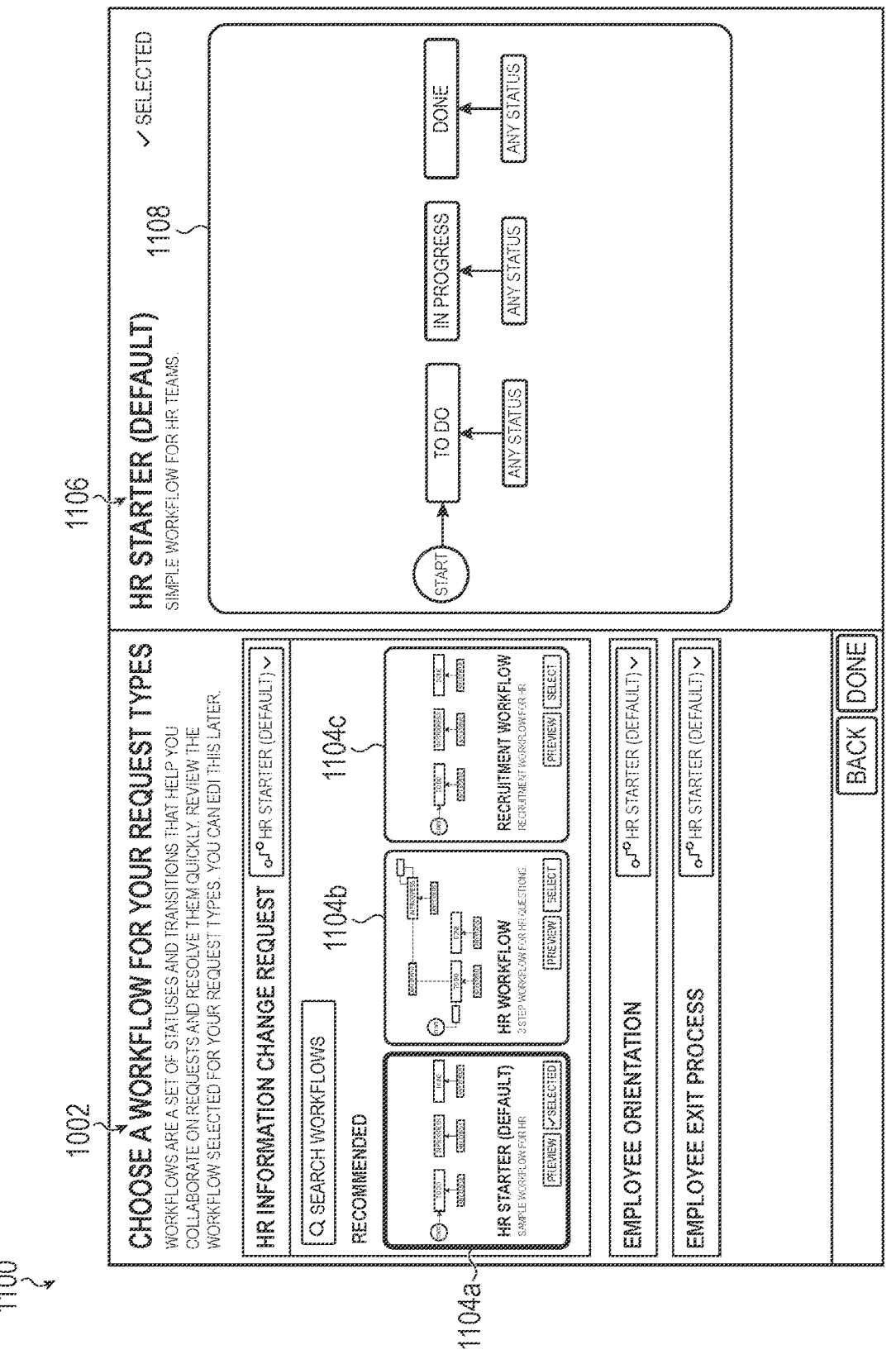
FIG. 11 depicts a user interface including tiles corresponding to a workflow type for processing an issue using the issue tracking system.

FIG. 11 depicts a user interface 1100 for configuring a workflow for a portal intake flow. The interface 1100 and process for generating a portal intake flow can be performed using the devices and systems described herein.

The interface 1100 can include a selection panel 1102 that includes a set of tiles 1104 each corresponding to a workflow type for processing an issue using the issue tracking system. The workflow types can define a set of statuses and transitions that are used by the issue tracking system to track and process an issue. For example, the workflow types can define a current status, what happens when the current status satisfies one or more criteria, a progression of the issue to through different steps that are performed to resolve the issue and so on. In some cases, a workflow type can define timelines for an issue, inputs required from various users, manage approvals and/or other process for advancing an issue.

In some cases, the selection panel 1102 can include a defined set of tiles 1104 that are associated with a particular category (e.g., IT, HR, Legal, and so on) and/or associated with particular intake requests (e.g., password troubleshooting, onboarding, and so on). The set of tiles 1104 may include default tiles that may are configured with generalized or common workflows. Additionally or alternatively, the set of tiles 1104 may include workflows that have previously been configurated as part of an already generated intake flow. In some cases, the set of tiles 1104 may include workflows that were created as part of a generative output from a generative output engine as described herein.

The user interface 1100 may include a preview panel 1106 that includes a schematic 1108 of a particular workflow for a selected tile 1104 of the set of tiles. For example, if a first tile 1104a is selected in the selection panel, the system may display a schematic 1108 corresponding to the particular workflow for the first tile 1104a.

In some cases, the preview panel 1106 may include a dynamic preview panel that allows a user to modify the workflow using the schematic 1108. For example, the user may modify one or more process steps, conditions for progressing an issue, a process flow for an issue and/or other parameters associated with the corresponding workflow. Accordingly, user updates to the preview panel 1106 may be used to configure the workflow for the portal intake flow that is generated.

In response to a selection of a particular workflow type and/or user input to the user interface 1100 confirming selection of a workflow, the system can create the new portal intake flow for use in a web based service. The new portal intake flow can be configured to generate a new issue using an intake interface that is configured in accordance with the intake request type and having a workflow configured in accordance with the selected workflow.

Figure 12A:
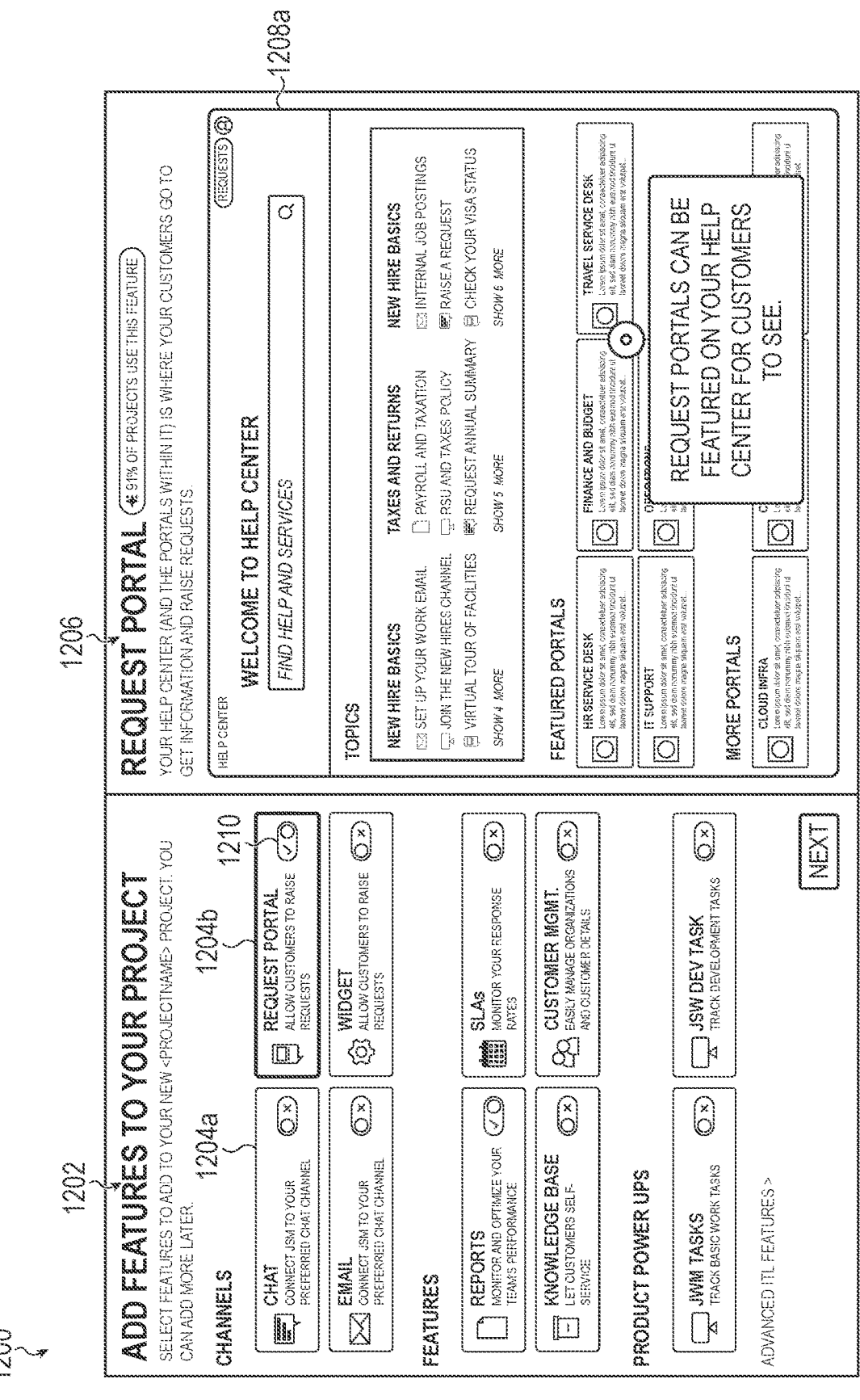
FIG. 12A depicts an interface that can be used to generate a project management interface for a web-based service.

FIG. 12A depicts an interface 1200 for a first web-based service of an issue tracking system that can be used to generate a project management interface for a second web-based service of the issue tracking system. The interface 1200 can be generated by an issue tracking system as described herein and be part of a process that is used to generate the project management interface.

The interface 1200 can include a selection panel 1202, which includes one or more tiles 1204 (only some of which are labeled), each corresponding to a feature type that can be incorporated into the project management interface. The selection panel 1202 can be configured by the issue tracking system based on features that are supported by the issue tracking system. For example, the issue tracking system may support a chat feature and a first tile 1204a can provide a first interface element corresponding to the chat feature. The issue tracking system may support a request portal, where a user can submit requests, and a second tile 1204b can provide a second interface element corresponding to the request portal feature.

Each tile 1204 may be an active element that causes the interface 1200 to be updated/changed in response to the system detecting a user interaction with a particular tile 1204. In some cases, each tile 1204 may be configured with selection functionality, which causes a preview of the corresponding interface for the second-web based service to be displayed. For example, in response to a user selecting the second tile 1204b, the system can cause a preview panel 1206 to be displayed. The preview panel can display the user interface for the second-web based service corresponding to the selected tile 1204. For example, in response to selection of the second tile 1204b, the preview panel 1206 can include a second user interface 1208 that would be displayed to users of the issue tracking system. The first web-based service provides the interface 1200 that is used to configure a user/client facing user interface (e.g., the second user interface 1208a).

In some cases, the second interface 1208a may be configured by the first service of issue tracking system as a dynamic interface that allows a user to configure parameters of the second user interface that will be generated as part of the second service. For example, in the preview panel 1206, a user may be able to modify parameters of the corresponding feature (e.g., the request portal). For example, the preview panel 1206 may be configured to allow the user to rearrange how fields (or other objects) in the request portal are displayed, add fields, remove fields, and so on.

Additionally or alternatively, in response to a user selecting a feature from the selection panel 1202, the system can generate a summary for the selected feature in the preview panel. For example, in response to determining a user selection of the second tile 1204b, the system can cause the preview panel 1206 to display the second interface corresponding to an interface for a feature corresponding to the selected second tile 1204b (e.g., a user interface for the request portal). The system may cause the preview panel to display an overlay window 1110 that generates a summary corresponding to the second interface 1208a displayed in the preview panel 1206.

In some cases, the overlay window 1110 can include a summary that is produced as a generative output from a generative output service, as described herein. For example, in response to receiving a selection of the second tile 1204b, the system may extract content from the set of fields for the second interface 1208a (e.g., fields for the request portal). The system may generate a prompt for the generative output service including predetermined text to a command and the extracted content from the set of fields. The system can transmit the prompt to a generative output model and receive a generative response, as described herein. The generative response can include a summary for the feature corresponding to the selected tile 1204, which in this example is a summary for the request portal feature. The system can cause the summary to be displayed in the overlay window 1110. In some cases, the generative output can be based on user changes to the second user interface 1208a (e.g., changes to the arrangement of fields, addition and/or removal of fields, and so on).

Additionally or alternatively, each tile 1204 can include an activation element 1210. The activation element 1210 can be used to activate the corresponding feature in the second service. For example, in response to a user interaction with the second activation element 1210b, the issue tracking system can configure the second service to include the feature associated with the second tile (e.g., the intake portal feature). Accordingly, the first web-based service of an issue tracking system that can be configured to both generate and configure which features will be included in the project management interface for the second web-based service. For example, the user may select, configure, and activate features as part of the generation process for the project management interface.

Figure 12B:
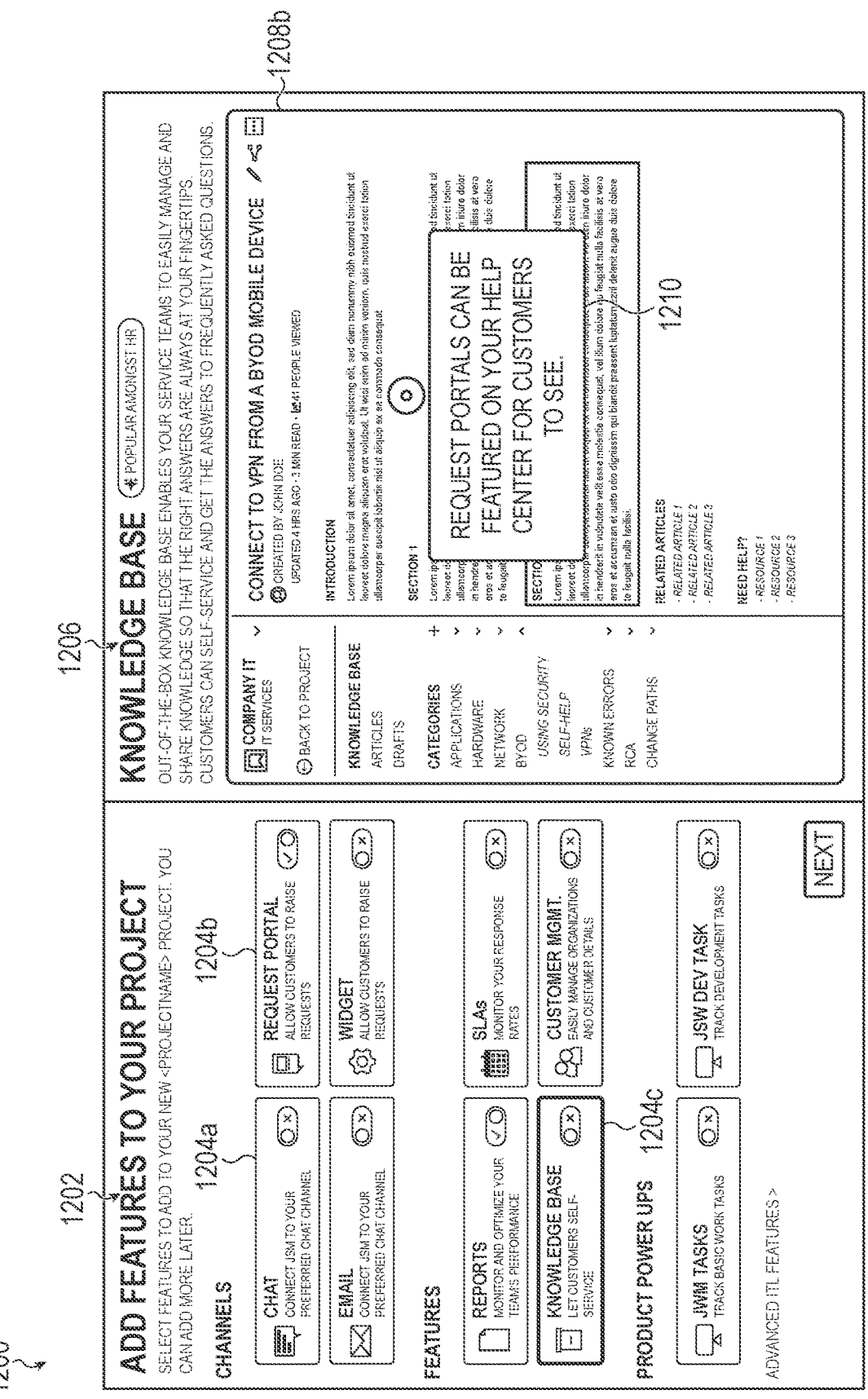
FIG. 12B depicts an interface that can be used to generate a project management interface for a web-based service.

FIG. 12B show an example of the interface 1200, with a third tile 1204c selected. The third tile 1204c can correspond to a knowledge base feature that can be configured into the project management interface of the second service. The knowledge base feature may also be referred to as a content collaboration platform.

In response to selection of the third tile 1204c, the system can cause the preview panel 1206 to display a third interface 1208b corresponding to the featured of the selected third tile 1204c. The third interface 1208b can be a dynamic interface, which can be modified by the user as described herein. The third interface can also include the overlay window 1210, which can include a summary of the corresponding feature (e.g., the content collaboration platform). The summary can be based on a generative output for the corresponding feature, as described herein.

In some cases, the system may allow the content displayed in the third interface 1208b may allow a user to access the corresponding feature service and interact with the corresponding service within the preview panel 1206.

For example, the third user interface 1208*b* may include an interface corresponding to a content collaboration platform and the system may access the corresponding feature to allow the user to navigate and view features of the content collaboration platform within the preview panel 1206. For example, the user may search for view and/or otherwise navigate the content collaboration platform within the second preview panel and as part of the process for generating the project management interface for the second web-based service.

Current queues may lack the ability to organize, group or otherwise display issues according to different criteria. For example, traditional queues may display issues based on an order that each issue was received. Further, given the small amount of space that an issue queue provides, it can be difficult to readily provide a user with information needed to determine what actions need to be take, urgencies associated with different issues, a status of a particular issue, items that are holding up an issue and so on. As a result, the following figures provide examples of how items can be grouped and how generative content can be used to provide descriptive content and/or summaries within the context of the queue interface.

Figure 13:
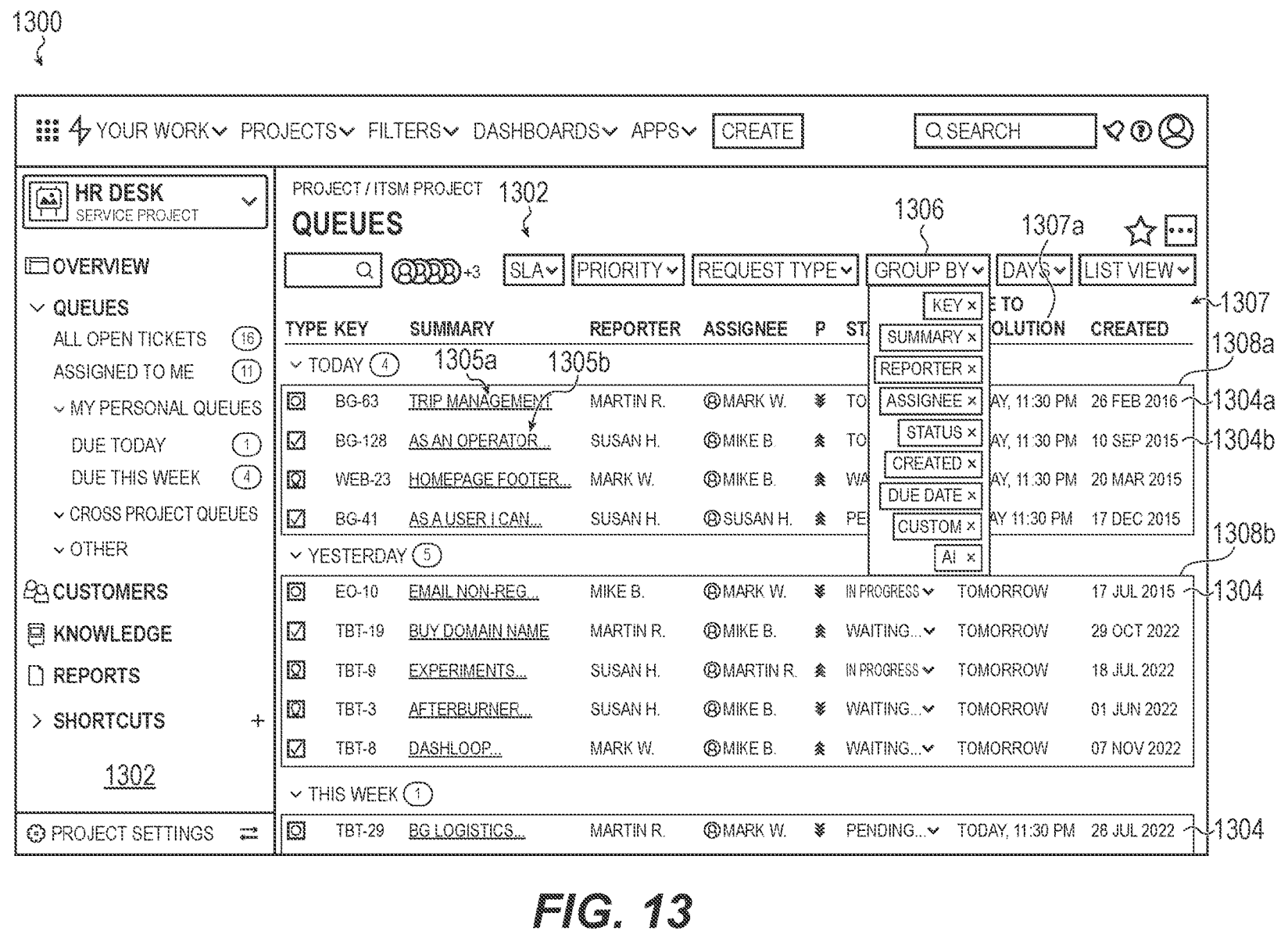

FIG. 13 depicts an interface 1300 that arranges a list of issues in a queue. Issues the list of issues can be managed by an issue tracking system and grouped according to one or more criteria. The interface 1300 can be generated by an issue tracking system as described herein.

The interface 1300 can include a navigation panel 1301 and a content panel 1302. The navigation panel 1301 can be used to select content that is displayed in the content panel 1302. For example, the issue tracking systems described herein may use queues to manage workflows for various issues. An example queue is shown in the content panel 1302. The example queue may be displayed in response to a selection of a queue from the list of queues in the navigation panel 1301.

The queue can include a list of issues 1304 (some of which are labeled) that are each displayed as a row in the interface 1300 and managed by an issue tracking system. Each issue 1304 in the queue can include additional information which may be displayed in a detail view, such as the detailed issue view 1600 shown in FIG. 16. In some cases, each issue 1304 can be associated with a selectable element 1305, which can cause a detailed view (e.g., detailed view 1600) to be displayed. In some cases, the selectable element 1305 can include a hyperlink that is associated with the row (or a portion of the row) corresponding to an issue. For example, a first issue 1304*a* may be displayed as a first row in the queue and a second issue 1304*b* may be displayed as a second row in the queue.

Each row may include a subset of details associated with an issue. For example, a first row may indicate an issue type, include an issue key, a summary and/or title, a reporter, an assignee, a priority, a status, a date for completing the work and a creation date corresponding to the first issue 1304*a*. These are just examples of information that can be displayed in a row and each row can include additional or fewer fields.

In some cases, the selectable element 1305 may be implemented as a hyperlink attached to one or more fields in a row. For example, a title/summary of an issue may include a hyperlink which causes a detailed view of an issue to be displayed (e.g., the detailed issue view shown in FIG. 16). In other cases, the entire row or other fields may serve as a selectable element that causes the detailed view for the issue to be displayed.

The system may arrange the order of issue in the queue in a variety of ways. In some cases, the issues can be arranged according to a creation date, a resolution deadline, based on assignee or other parameter. In some examples, the system may have a default arrangement and a user may be able to change the arrangement using the interface 1300. For example, in response to a selection of a particular field 1307, the system may change the arrangement of the rows for each issue 1304. For example, selecting a first field 1307*a*, corresponding to a time to resolution, may cause the system to arrange the issues 1304 based on a resolution date. The arrangement may be in ascending order, descending order, and/or the like.

In some cases, the system may display issues in groups according to a selected grouping category. For example, the user interface 1300 may include a selectable option 1306 for selecting a grouping category. The selectable option 1306 may include a menu with different grouping categories. Example grouping categories may include a key, a summary, a reporter, an assignee, a status, a creation date, a due date associated with an issue 1304, a custom category (which may be user defined), and/or an AI category. In response to selection of a grouping category, the system may determine an arrangement of the issues based on the grouping category and display those issues in accordance with the determined arrangement. For example, if the selected grouping category is a due date, the user interface 1300 may include a first group 1308*a* that includes issues 1304 that are due on a same date (e.g., the current day), a second group 1308*b* that includes issues that are due a different date (e.g., the next day) and so on.

In some cases, the AI selectable option may group the issues in the queue based on a generative output from a genitive output engine. For example, selecting the AI option may cause the system to generate a prompt for a generative output model, which may extract issue information and text directed to a command, as described herein. For example, the system may extract due data information, priority information, comments and so on and the text directed to the command may include a request for the generative output engine to provide a list that ranks the highest priority to the lowest priority. The system may receive a generative response and may correlate a list provided in the generate response to issues in the que and display the issues according to the ranking in the list.

FIG. 14 depicts an example process 1400 for generating a summary window including a generative response for an issue displayed in a queue. The process 1400 can be performed by the device and systems described herein.

At operation 1402, the process 1400 can include detecting a user input at a designated region associated with an issue. The issue may be displayed in a queue interface for an issue tracking system and be one of multiple issues displayed in the queue, as described herein. For example, the issue may be displayed in a row of the queue that includes details corresponding to the issue. Detecting the user input at a designated region associated with the issue can include detecting a hover of a cursor over the region defining the row corresponding to the issue, a touch input to the region defining the row, selection of field (e.g., via a hyperlink) displayed in a row corresponding to an issue or detecting any other suitable input corresponding to the issue.

At operation 1404, the process 1400 can include generating a prompt for a generative output model. The prompt can automatically be generated in response to detecting the user input at the designated region of the issue. Generating the prompt can include extracting issue data for the issue.

The data may include an issue identification, issue title, summary, events that are associated with the issue such as comments, status changes, approvals or denials of work/task completed as part of the issue and/or other information associated with a particular issue, as described herein.

The data may be extracted from a set of fields stored by the issue tracking system and corresponding to the issue. For example, a comments field may include comments that have been submitted by various users associated with an issue. The comments field may include comments from a user that submitted the issue, comments from other users who are working to resolve the issue and/or perform tasks associated with the issue. Another field may include a current status of the issue such as a pending status, waiting approval, in progress and so on. Other fields may include user assigned to the issue, description of the issue, and so on.

The prompt can include predetermined text that is directed to a command and the extracted content from the set of fields. The prompt can be an example of the prompts described herein and be configured to receive a particular type of output from a generative output model based on the command and the extracted content. For example, the command may be configured to elicit a summary of key events associated with an issue from the generative output model. In some cases, an issue may be associated with multiple different events including the submission of the issue, comments made by one or more users, approvals, status changes, information related to subtask and so on. Some of these events may correspond to aspects or subtasks that have been completed.

Issues displayed may be displayed in a queue for the purpose of advancing an issue to completion. Accordingly, it can be useful to display information that is relevant to advancing an issue. This information may include actions that have been taken, an approval status for a pending task, one or more feature task/subtasks that need to be completed to resolve an issue, inputs required to complete those feature subtask, user inputs required for the future subtasks. Additionally or alternatively, information relevant to completing an issue may include information that is associated with past events and/or completed tasks. For example, if the issue is waiting for approval from a supervisor, the supervisor may use information from a completed subtask to determine whether to approve a current stage. The command may be configured to elicit a response from the generative output that extracts the relevant information from all the information associated with an issue and provides that information as output.

As an example, an issue may be related to a user that cannot log into a service. The user and/or other user's working on the issue may have performed multiple actions including trying to rest a password for the user account associated with the user, checking network connectivity. The issue may include comments between the user and the users working on the issue and so on. Accordingly, the predetermined command may be configured to elicit relevant events related to solving the issue. For example, the command may include a natural language command to summarize the issue and actions that have been taken to resolve the issue, as described herein.

The command may be determined in different ways. In some cases, a command may be controlled using a user-controlled setting and/or system setting. In other cases, the command may be based on user input to the system. For example, a user interface may present multiple different preconfigured commands and present the commands for selection by a user. In other cases, the commands may be input by a user as natural language command, which may be an example of the natural language inputs described herein which can be input to a generative output engine.

The command along with the extracted issue data may be transmitted as a prompt to the generative output model, which may analyze the prompt and return a generative output, as described herein. In some embodiments, a prompt provided as input to a generative output engine can be engineered from user input, as described herein. As discussed above, a prompt can be preconditioned and/or parsed to extract certain content therefrom. The extracted content can be used to inform selection of a particular engineered prompt template from a database of engineered prompt templates. Once the selected prompt template is selected, the extracted content can be inserted into the template to generate a populated engineered prompt template that, in turn, can be provided as input to a generative output engine as described herein.

In some cases, the extracted content and/or the predetermined text directed to a command can be configured to elicit specific information from the generative output model. The predetermined text may be a prompt that requests a summary of the issue and what has been done to resolve the issue. In some cases, the extracted content may be based on the predetermined text for example, the extracted content may include a user summary of the issues, comments made on the issue by various users, a description of the issue provided in the issue details and so on. Additionally or alternatively, the command can include example output formats, which can be used to structure outputs received by the generative output engine, which can then be processed by the issue tracking system.

The generative output model can use the prompt and the specific extracted content to generate a generative output as described herein. The generative output can take the extracted content and provide a summary of the issue. Additionally, the extracted content may include state transitions of the issue, for example a subtask is completed and approved, the issue may transition between different states. In these cases the generative output may also include a summary of the state transitions.

In some cases, the system can be configured with the predetermined text and configured to extract the specific content that is provided to the generative output model. In these cases, the process may happen automatically, in response to the user input at the designated region. In other cases, the system may define multiple designated regions that each are associated with a different predetermined text for a command associated with a region and configured to extract content relevant to the specific command. For example, if the system detects a user input at a first designated region, the system may generate a first prompt comprising a first set of predetermined text directed to a first command (e.g., text requesting a summary of the issue) and extract a first set of content for providing to the generative output model. If the system detects a user input at a second designated region, the system may generate a second prompt comprising a second set of predetermined text directed to a second command (e.g., text requesting a summary of status changes for the issue). And extract a second set of content for providing to the generative output model. Accordingly, selecting different regions associated with an issue can cause the generative output mode to provide different responses.

In other examples, the predetermined text directed to a command can include text requesting a summary of comments associated with an issue, a summary of recommended actions for an issue, and/or other suitable requests for information related to an issue.

In some cases, the prompt can be a prompt to provide information about multiple issues. For example, in cases where the interface groups issues according to a grouping parameter, the predetermined text can be directed to a request for information summarizing aspects of the group of issues. For example, if the issues are grouped by due date, the prompt may include predetermined text to a command for ranking a priority of the issues. Accordingly, the output from the generative output model may include a ranking of priority that can be used to determine which issue, of a group of issues due on the same day, has a highest priority and should be worked on first.

At operation 1406, the process 1400 can include receiving a generative response from the generative output model. The generative response may include a response to the prompt based on the extracted content associated with the issue. For example, in response to a prompt that requested a summary of the issue and actions that have been taken to resolve the login issue for the user, the generative output may include a summary of the key events. For example, the generative summary may include text for an issue (e.g., "the user cannot login to the service portal" and "the user is not getting any emails from the system"), and text summarizing actions that have been taken (e.g., "the user has tried to reset their password").

Figure 16:
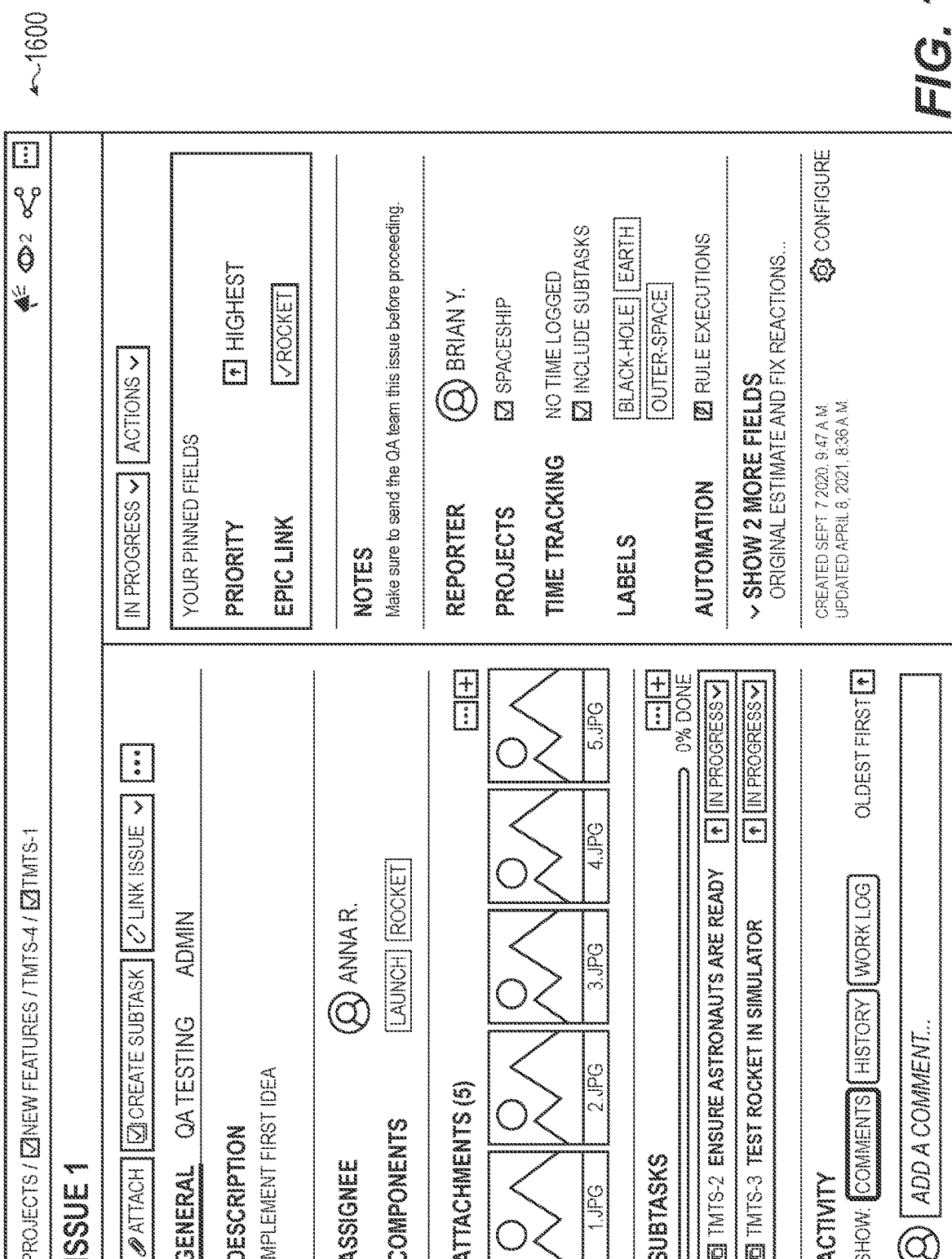
FIG. 16 depicts an example of a detailed issue view for an issue managed by an issue tracking system.

At operation 1408, the process 1400 can include displaying a summary window that includes as least a portion of the generative response. For example, the summary can include the text summarizing the issue and the text summarizing the actions that have been taken. Additionally or alternatively, the summary can also include a selectable option to display a detailed view of the issue (e.g., as shown in FIG. 16).

Figure 15:
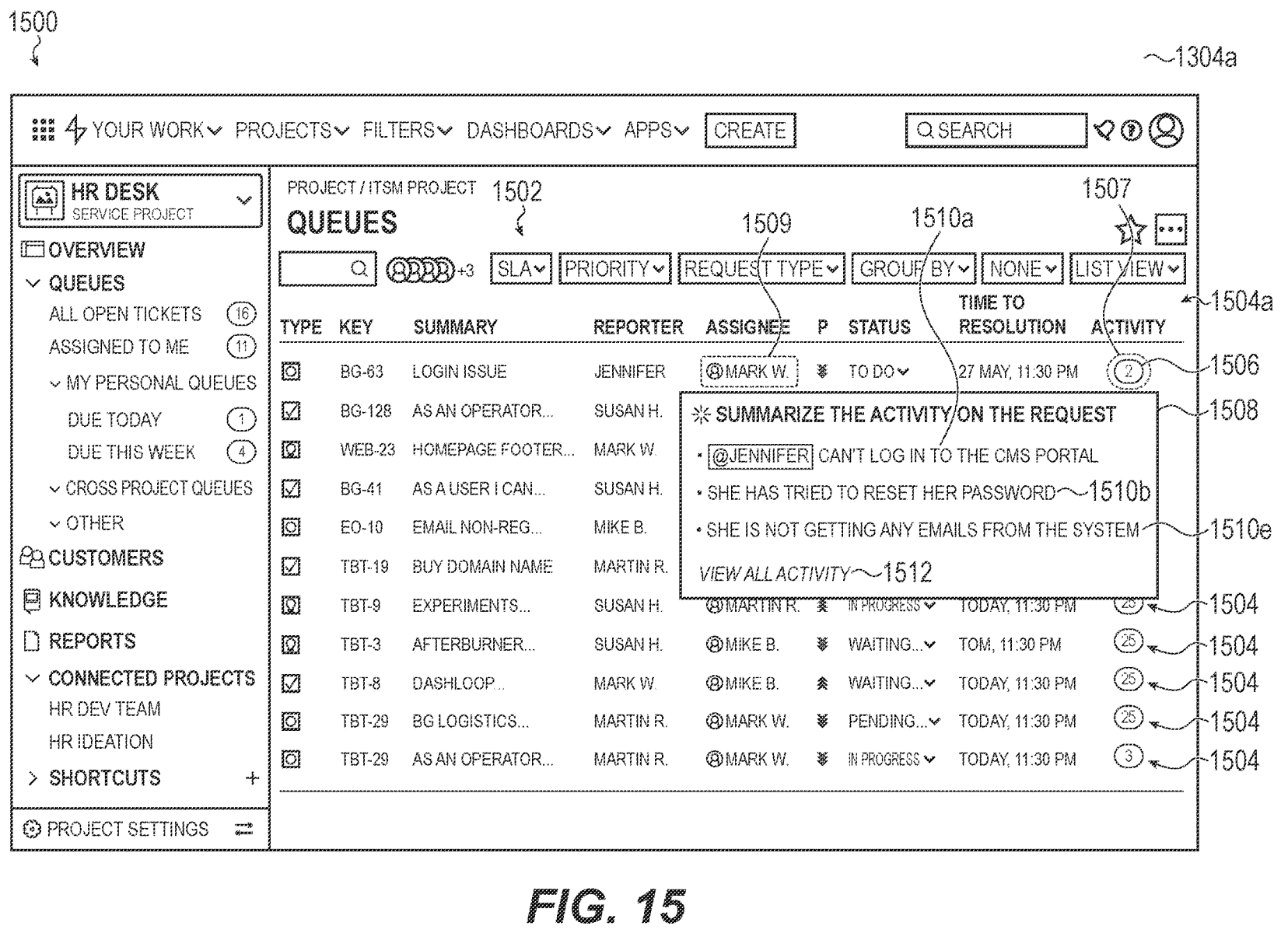

FIG. 15 depicts a user interface 1500 that includes summary window comprising a generative response to an issue displayed in a queue. The user interface 1500 may be generated by the issue tracking systems described herein.

The interface 1500 can include a content panel 1502 that displays a list of issues 1504 (only some of which are labeled) in a queue, which can be an example of the content panels described herein (e.g., content panel 1302). Each issue in the list of issues may be displayed as a row in the queue and include issue data corresponding to the issue, as described herein. In some cases, the user interface 1500 may include an action count, which may summarize activity/events that are associated with the corresponding issue. For example, the queue may include a first issue 1504a that has an action count field 1506. The action count may summarize activity associated with the first issue such as comments made on the issue, approvals, state transitions, a work log and so on. In some cases, the action count field 1506 may include a number that indicates an amount of activity (e.g., the number may be a sum of comments, approvals, state transitions, and/or other events that are associated with the issue).

In some cases, each issue can include a designated region that causes a generative summary for the issue to be displayed. In some case, one or more fields of an issue 1504 can be associated with one or more designated regions. For example, the action count field 1506 may be associated with a designated region, and in response to detecting a user input at the region 1507 of the action count filed 1506, the system can generate a prompt for a generative output model and display of a summary window 1508 that include outputs from the generative response model, as described herein. For example, in response to detecting a user engagement with the region 1507, the system may generate a prompt that includes predetermined text directed to a command and extract content associated with the first issue 1504a to send to the generative output model, as described herein.

In some cases, the predetermined text directed to the command and the extracted content can be based on a particular region/field of an issue 1504. For example, the region 1507 may be configured to generate predetermined text directed to a command for the generative output model to provide a summary of activity for the corresponding issue (e.g., the first issue 1504a). Additionally the extracted content for the issue may be based on the command. In the example of the first issue 1504a, the extracted content may include data for the issue that is associated with an activity field. Examples of data may include, comments, status changes, approvals, a summary of the issue, ticket creation, state changes and/or other data associated with the first issue 1504a. Accordingly, the extracted content provided as part of the prompt to the generative output model may be tailored/based on the command.

As another example, the predetermined text may be a request to prioritize active tasks associated with an issue. The system may be configured to extract content that is related to the active tasks, a user(s) assigned to the task, approval status, comments related to the tasks and so on.

In some cases, an issue 1504 may include multiple regions that each are associated with a different predetermined text directed to a command and/or configured to extract different content associated with an issue 1504. For example, the first issue 1504a may include a second field (e.g., an assignee field) that is associated with a second region 1509. In response to detecting a user interaction with the second region 1509, the system may generate a second prompt that is different from the prompt for that action count region 1507. For example, the second prompt may include a command to provide a summary of all actions that the assignee has performed on the first issue 1504a and include extracted content for activity/actions performed by the assignee. Accordingly, the generative output model may return different outputs for different regions.

The summary window 1508 can include content 1510 from the generative response. For example, the generative response may include a first portion 1510a that summarizes the issue, a second portion 1510b that summarizes actions taken and a third portion 1510c that summarizes related issues, which may be displays in the summary window 1508. In some cases, the generative output may include other data, which is not displayed in the summary window 1508. For example, this data may identify the issue that the generative output is associated with, information on the time/date that the output was generated, and/or other information that relates to the issue. In some cases, the summary window 1508 may include an option to view the detailed issue view and selection of this option may cause a detailed issue interface to be displayed (e.g., the detailed issue interface 1600 shown in FIG. 16).

FIG. 16 depicts an example of a detailed issue view for an issue managed by an issue tracking system. Specifically, the graphical user interface 1600 depicts issue object data associated with an issue managed and tracked by a corresponding issue tracking system or platform. The graphical user interface 1600 may be displayed in response to a user selection of one of the issue objects described herein. The graphical user interface 1600 may be provided by a frontend or client of an issue tracking platform executing or operating on a client device. The graphical user interface 1600 may include various issues or object data that is associated with the respective issue. As described previously, some of this issue data may be used to generate the issue graphical elements in the virtual whiteboarding application. Changes to the issue data occurring due to input received at the graphical user interface 1600 or otherwise implemented by the issue tracking system will automatically be updated when the issue graphical element is loaded or refreshed. The graphical user interface 1600 depicts the issue on a single screen, however, the issue data may be displayed using a series of tabs or links available through the graphical user interface 1600.

As shown in FIG. 16, the issue data includes text stored as fields or elements of the issue object. Issue fields include, for example, issue title, issue description, notes, and comments. Other issue data may include attachments or non-text content that is associated or stored with the issue object. Example non-text content includes screenshots, diagrams, and other graphical content that may be stored as images or other media files. Other example attachment content includes source code files, test results, user logs, and other similar content. The issue data may also include references or links to other system objects including, for example, projects or epics, which may have a parent-child relationship with the particular issue. Similarly, the issue data may include references or links to other issues identified as subtasks of the issue and may have a child-parent relationship with the particular issue. The issue data may also include references or pointers to other system elements like a system user or user profile identified as an assignee, owner, reviewer, or other role associated with the issue object.

Figure 17:
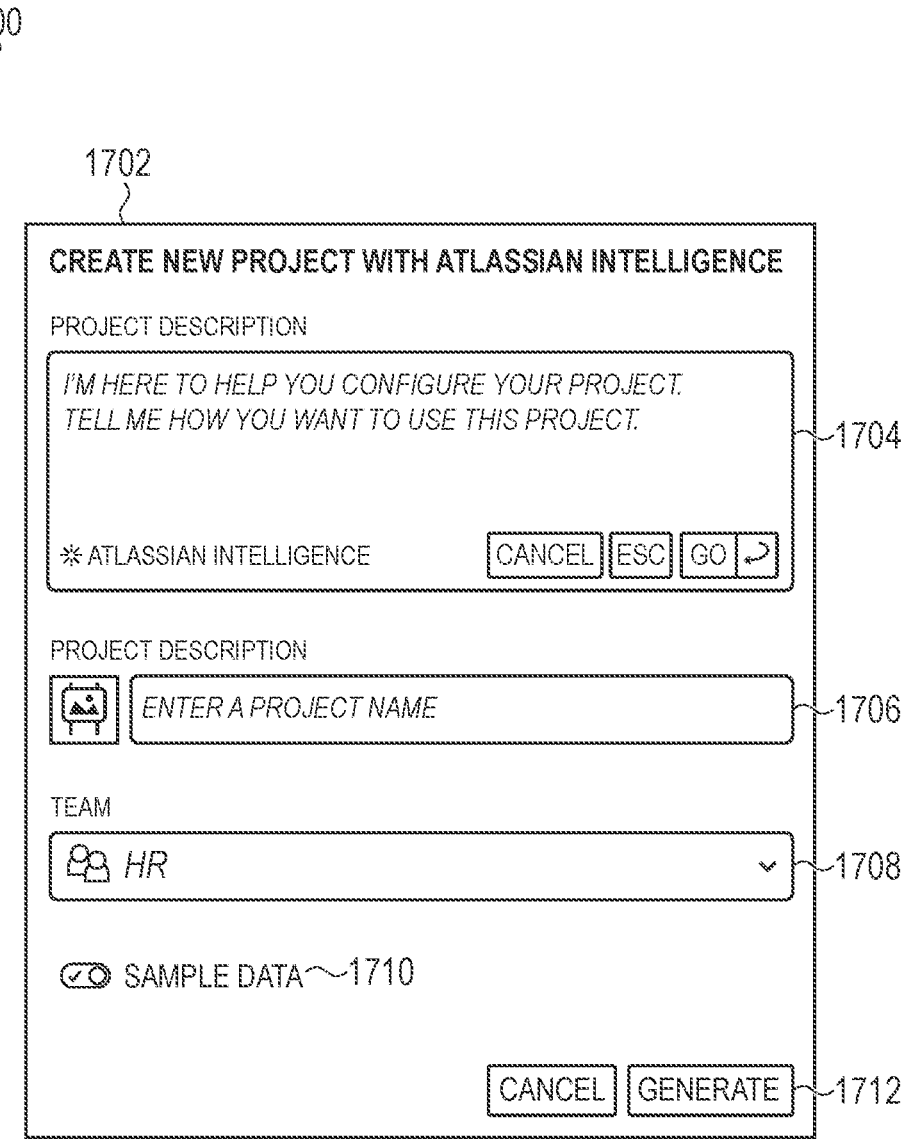
FIG. 17 depicts an interface for generating a protect management interface using a generative output model.

FIG. 17 depicts an interface 1700 for generating a protect management interface using a generative output model. The interface 1700 can be generated by the system described herein including the issue tracking system. Can be displayed as part of a process for a second service of the issue tracking system that is used to create and configure a project management interface for a first service (e.g., a user facing service) that can be used to submit/open new issues at the issue tracking system.

The project management interface 1700 can include a project creation interface 1702, that can leverage a generative output model to identify and/or suggest features that can be incorporated into the project management interface. For example, the project creation interface 1702 may be used to identify and/or suggest portal intake flows for incorporation into a project management interface. The suggested portal intake flows can be examples of the portal intake workflows described herein.

The project creation interface 1702 can include a first input region 1704, which can be configured to receive input from a user. The first input region can receive typed/written input provided in a natural language for input into a generative output model, as described herein. For example, the input region can be configured to receive a description of how the project management interface should be configured including portal intake flows or other features that should be included, configurations for the portal intake flows or other features, a description of the arrangement and/or any other suitable input from the user.

The project creation interface 1702 can include a second input region 1706, which can receive input that is associated with a project name. For example, user input to the second input region 1706 may become the name of the project.

The project creation interface 1702 can include a third input region 1708, which can be configured to identify a team that the project management interface is being configured for. For example, the third input region 1708 may include a drop-down menu that provides a list of different teams that can be selected, examples of which include HR, Legal, IT, Finance and so on.

The project creation interface 1702 may also include an option 1710 to provide sample data to the generative output model. The sample data may include any suitable data that is associated with a project. For example, if the user identifies the project as being associated with HR (e.g., using input region 1708), the system may provide sample data for the HR request, which may include usage statics associated with portal intake flows, fields included in portal intake flows, statics for issue that are associated with the HR team including resolution times, and/or any other suitable data managed by the issue tracking system.

The project creation interface 1702 can include an option 1712 to generate the new project management interface. Selection of the option 1712 can cause the system to generate one or more inputs for the generative output model including a prompt for creating the project management interface, which may be an example of the prompts described herein.

Figure 18:
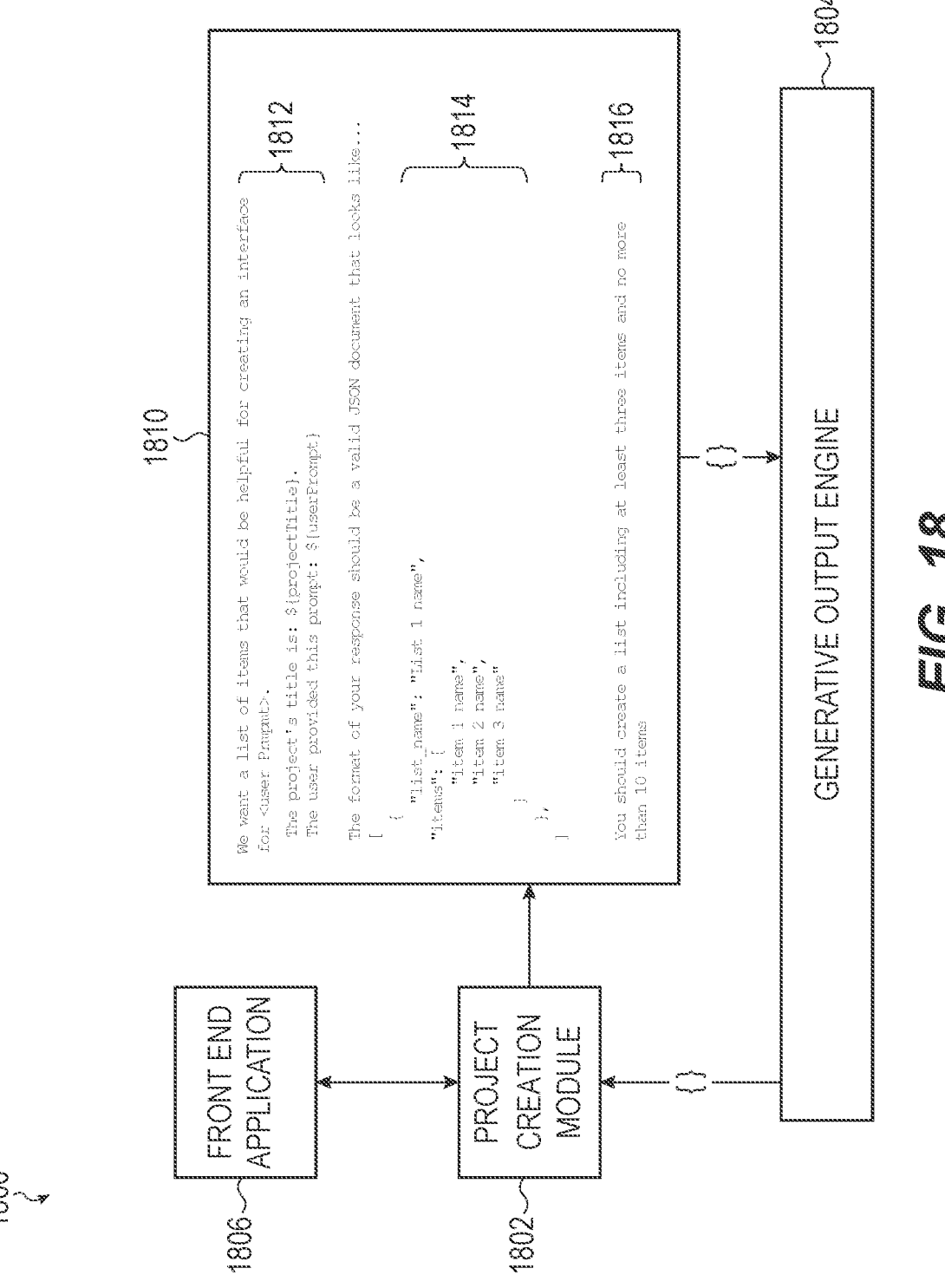
FIG. 18 depicts an example prompt that can be used to generate a project management interface.

FIG. 18 depicts a simple system schematic 1800 representing creation and use of a prompt in order to generate a project management interface. In general and similar to other examples described herein, an issue tracking system 1802 or other similar service may be used to extract the user input and gather other data used in the selection of preconfigured prompt language or for adapting prompt language for use by the system. As shown in FIG. 18, the prompt 1810, once generated by the issue tracking system 1802, may be transmitted or otherwise communicated to a generative output engine 1804, which may be an example of the generative output engines described herein.

The prompt 1810 may be transmitted as part of an application programing interface call and the content of the prompt may be transmitted as a JSON file or other serialized data scheme. In response, the generative output engine 1804 may generate a generative output or generative response that is provided to the issue tracking system 1802 as a response to the API including another serialized data component or multiple components. The response or generative output may be adapted by the issue tracking system 1802 or other module of the collaboration platform in order to produce the desired content. In this case the desired content is a new project management interface. The generated content is provided to the frontend application 1806 in order to render the content in a graphical user interface, as described herein. Specifically, the serialized content of the response may be converted into graphical objects and other native elements of the issue tracking system so that the newly created project management interface operates in a fashion that is identical or very similar to a manually created project management interface.

FIG. 18 also depicts an example prompt that can be used to generate a new project management interface, as described herein. Specifically, the prompt 1810 includes predetermined query prompt text that may be selected in accordance with context data obtained with the natural language user input or in response to a determination that the user input is directed to particular type or class of project management interface. For example, a first prompt with respective predetermined text may be selected in accordance with a determination that the project management interface to be created will be use for the HR team. A second prompt with different respective predetermined text may be selected in accordance with a determination that the project management interface is to be used by the IT team, legal team, a business team, or other team predicted to correspond to the user input and other context data. Furthermore, in some instances, each team or individual may adapt their own prompt or set of prompts that have been configured to produce a particular result. All or portions of the natural language prompt are added to the predetermined query prompt text before the prompt 1810 is transmitted or otherwise communicated to the generative output engine 1804.

In the present example of FIG. 18, the prompt 1810 may include multiple types of predetermined query prompt text. Specifically, the prompt 1810 may include a query or request portion 1812, which provides the overall context for the request and general parameters of what should be returned by the generative output engine 1804. As shown in this example, portions of the natural language input text may be incorporated through use of variable placeholders or system calls that may be populated with values from the natural language input text before the prompt is communicated.

For example the prompt may include a predefined portion and user input portion. The predefined portion may include a request "for a list of items that would be helpful in creating an interface for." The predefined portion may be followed by a natural language prompt from the user. For example, a user input to the first input region 1704 can be used as the natural language portion. The user input may be input from the input region 1704. For example, the user input to input region 1704 may include "an interface for submitting questions or performing actions related to human resources." Accordingly, the prompt may include the following query or request portion 1812: "We want to generate a list of items that would be helpful to creating an interface for submitting questions or performing actions related to human resources."

As another example, the predefined portion may include a request to solve a particular issue—e.g., "We want to generate a list of items that would be helpful in solving a problem related to." The user interface (e.g., interface 1700) may include an input region to ask a user for description of a problem that they would like to solve (e.g., at the first input region 1704). Accordingly, the user's input to this region can be used to complete the request portion 1812.

The prompt 1810 also includes an example text-based schema 1814 defining the preferred schema for the output or response of the generative output engine 1804. In this example, the schema example 1814 specifies a proposed structure for providing a list of items that corresponds to content generated by the generative output engine 1804 in response to the user prompt. The schema provides example punctuation and syntax, which the project creation module 1802 that is able to create issue tracking system object based on text received in the generative response. The schema examples 1814 may also be referred to as a requested output schema. The schema examples 1814 may include example input-output pairs or other schema examples.

The project creation module 1802, is able to interpret and convert into the native objects handled by the issue tracking system. For example, the project creation module 1802 may take items returned in the generative response and map the list of items to existing fields of the issue tracking system. The mapping may be done using natural language processing technique (e.g., tokenization, lemmatization, etc.) and then performing a semantic similarity or other comparison to determine corresponding field items that satisfy a similarity criteria. In one example, a generative response is formatted in accordance with a requested output schema (as specified in predetermined text of the prompt 1810. The project creation module 1802 may convert the generative response into objects of the issue tracking system based on the text and the formatting of the generative response, which may specify object types, object descriptions, and other attributes of the issue tracking object in accordance with the requested schema.

The project creation module 1802 may map each item in a list of items to a different portal intake flow. Accordingly, the project creation module 1802 may determine one or more project intake flows to include in the project management interface using the generative output. In some cases, the prompt may include a request to rank the items in order or relevance, importance, and/other metric. The project creation module 1802 may use the ranking to determine an arrangement of the portal intake flows in the project management interface (e.g., project management interface 1900). For example, portal intake flows corresponding to higher ranked items in the generative output may be positioned more proximately or higher in a list of project intake flows on the project management interface.

The prompt 1810 also includes other rules and instructions 1816 that specify permitted results and prohibited results in order to further guide the generative output engine 1804. Similar to other previous examples, prompt 1810 may also include example input-output pairs that provide further guidance for expected output in response to specified example input.

FIG. 19 depicts an interface 1900 that includes a dynamic preview of a project management interface created using a generative output model. The interface 1900 can be generated by the systems described herein including the issue tracking system. The interface 1900 can include a dynamic preview panel 1902 that displays a preview of how a project management interface (e.g., generated using the project creation interface 1700 and generative output engine) would be displayed by a first service of the issue tracking system (e.g., a service used to submit issues/request to the issue tracking system).

The preview panel 1902 can include features that can be modified in the preview panel. Modifications submitted in the preview panel 1902 can be used by the system to generate the project management interface. For example, the preview panel 1902 may include a list of portal intake flows 1904 that can be used to submit issues to the issue tracking system. The types and arrangement of the portal intake flows may be based on a generative output from the generative output engine and in response to a prompt submitted to the generative output engine (e.g., the prompt discussed in relation to FIG. 18).

In some cases, a user may change an arrangement of the portal intake flows 1904, add additional portal intake flows, remove portal intake flows and so on. In some cases, selection of a particular portal intake flow can cause the system to display a dynamic preview of the portal intake flow that can be modified by the user. For example, in response to selection of a first portal intake flow 1904*a*, the system may display a configuration interface that allows the user to configure/modify the corresponding portal intake flow.

Figure 20:
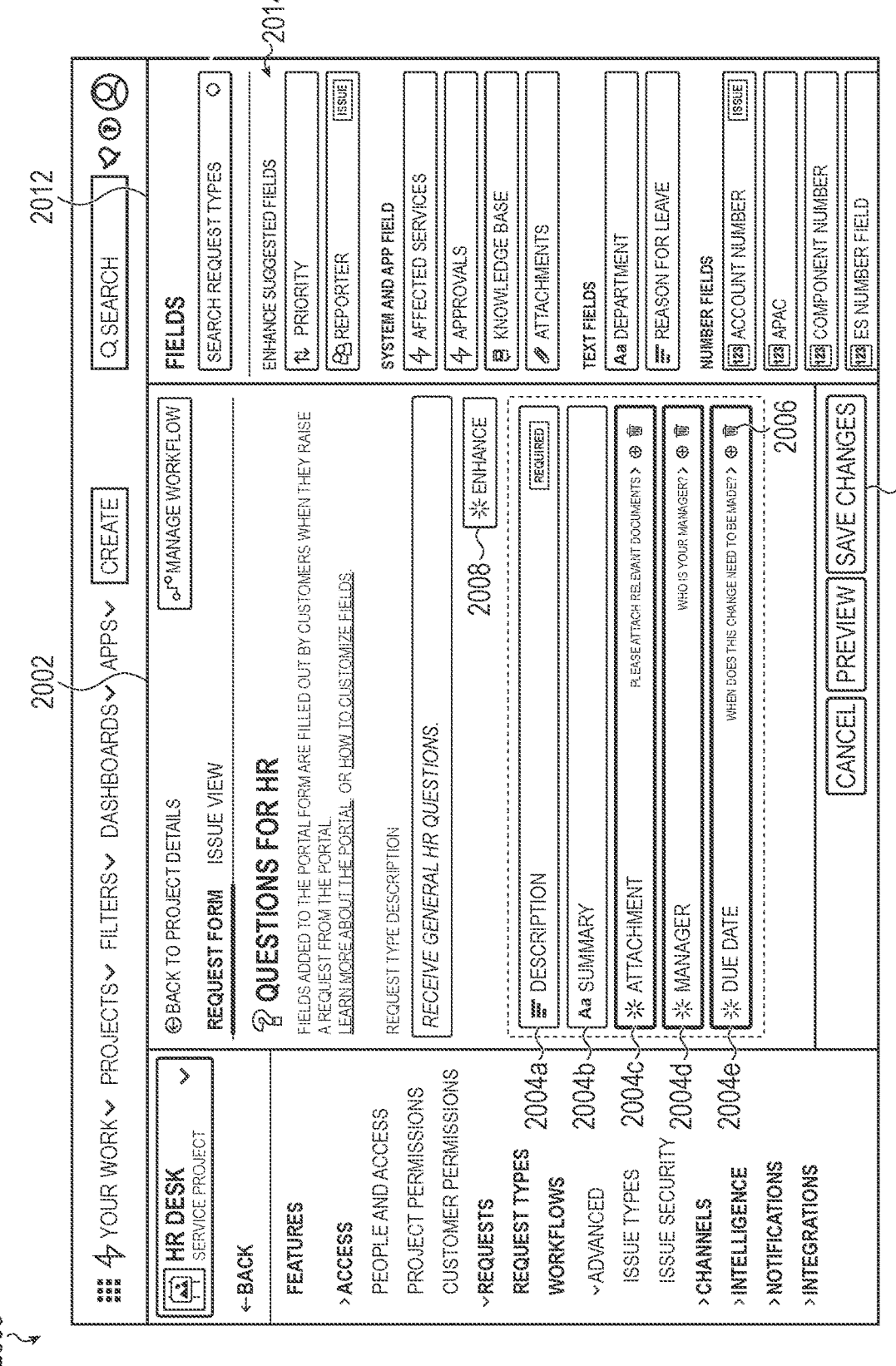
FIG. 20 depicts an interface that includes a dynamic preview of a portal intake flow that can be modified using a generative output model.

FIG. 20 depicts an interface 2000 that includes a configuration interface for a portal intake flow that can be modified using a generative output model. The portal intake flow may be an example of the workflows described herein (e.g., in relation to FIGS. 5A, 5B, and 7-11). The configuration interface for the portal intake flow can be displayed by the issue tracking system, in response to a user selecting a particular portal intake flow from a dynamic preview of a project management interface (e.g., as shown in FIG. 1900), in response to a user generating a new portal intake flow as described herein, in response to a user selecting to configure a current portal intake flow, or in response to other user input or system actions. The configuration interface may be an example of the form builders (e.g. form builder 428) and/or issue intake builders described herein.

The interface 2000 can include intake definition panel 2002 that includes one or more fields 2004 that are associated with an issue. The intake definition panel can also be referred to as a preview panel or intake preview. The one or more fields 2004 can include a first field 2004*a* that includes a description of the issue/question being submitted and results in a input region that a user can provide a description of the issue/question; a second filed 2004*b* that includes a summary, which may cause a second input region to be created; a third field 2004*c* for providing attachments, which may cause interface elements for submitting attachments to be created; a fourth field 2004*d* for associating a manager with the issue/question; a fifth field 2004*e* for setting a due date for the issue question, which may cause a date selection interface to be created. In some cases, one or more of the fields may be required fields, and cannot be removed using the interface 2000. For example, the first field 2004*a* may be a required field. Additionally or alternatively, one or more fields may be removed. For example, the third field 2004*c*, the fourth field 2004*d* and the fifth field 2004*e*, may each include an option 2006 (one of which is labeled) to remove the corresponding field from the portal intake flow. In other cases, the system may accept other user inputs, such as dragging a field 2004 out of the intake definition panel 2002, which can result in the field being removed from the portal intake flow.

The interface 2000 may include a generative input option 2008, which can be used to receive suggestions to modify the portal intake flow based on a generative output from a generative output engine. For example, in response to selection of the generative input option 2008, the system can generate a prompt for a generative output engine, which may be an example of the prompts described herein.

The prompt can include predetermined text that uses a generative output suggest fields that should be included in the portal intake flow, an arrangement of the fields, configuration of individual fields and so on. For example, as part of generating the prompt, the system can extract content from field items and/or extracted content data (e.g., type of portal intake flow and/or associated project, description of the portal intake and/or associated project, team associated with the project, and so on. The prompt may include a request for a list of additional information items that are needed, a request for any existing information items that may not be needed, and provide an example of input-output pairs to define a schema, as described herein.

In some cases, the prompt can include extracting issue data related to the portal intake flow and/or other portal intake flows. For example, for an existing portal intake flow that has been in use, the system may extract issue data for issues that have been submitted to the portal intake flow and provide the extracted issue data to the generative output engine, as described herein. In other examples, for example when the portal intake flow is a new intake flow, the system may identify the same/similar fields used in other intake flows and extract issue data using those fields.

The system may receive a generative output from the generative output engine, as described herein and use the generative output to provide one or more suggestions to the user. For example, the system (e.g., project creation module) may correlate outputs in the generative response with particular fields of the issue tracking system. For example, the generative output engine may indicate that a particular type of information would be useful and the project creation module may identify one or more fields that correspond to that information (e.g., using the format of the example input-output pairs). The system may suggest including one or more of the identified fields. Additionally or alternatively, the system may use the generative response to recommend removing a particular field 2004, adding a different field to the portal intake flow, modifying titles and/or other text associated with one or more fields 2004, changing an arrangement of the fields 2004, and/or changing other aspects of the portal intake flow. In some implementations, the system may suggest addition or removal of fields based on an analysis of prior field use within the system. For example, user event logs or system usage logs may be used to compute a use metric for fields or other system objects. The system may access use metrics for a set of fields in order to rank the fields by popularity or predicted relevance to a particular project or project type. The use metrics may also be used to add or emphasize recommended fields or eliminate fields for recommendation from a list that was produced using the generative response. The system may also add fields that have been designated for recommendation or remove fields that are being designated for obsolescence or reduced use.

A user may save changes to an existing portal intake flow and/or create a new portal intake flow by selecting a save option 2010, which may cause the system to update the existing portal intake flow and/or generate a new portal intake flow. In some cases, for example when the interface 2000 was displayed as part of process for generating a new project management interface (e.g., in response to selection of a portal intake flow 1904 described with respect to FIG. 19) the system may cause the interface 1900 to be displayed in response to determining a user section of the save option 2010. In other cases, the generative input option may be displayed as part of a process for generating a new portal intake flow (e.g., as described with respect to FIGS. 7-11).

The user interface 2000 can include a panel 2012 that displays fields that can be added to the portal intake flow. In some cases, the panel 2012 may include a field set 2014 that is determined using the generative output engine, as described herein. For example, the fields identified by the project creation module can be listed in the field set 2014.

FIG. 21 shows a sample electrical block diagram of an electronic device 2100 that may perform the operations described herein. The electronic device 2100 may, in some cases, take the form of any of the electronic devices described with reference to the figures, including client devices, and/or servers or other computing devices associated with the collaboration system 100. The electronic device 2100 can include one or more of a processing unit 2102, a memory 2104 or storage device, input devices 2106, a display 2108, output devices 2110, and a power source 2112. In some cases, various implementations of the electronic device 2100 may lack some or all of these components and/or include additional or alternative components.

The processing unit 2102 can control some or all of the operations of the electronic device 2100. The processing unit 2102 can communicate, either directly or indirectly, with some or all of the components of the electronic device 2100. For example, a system bus or other communication mechanism 2114 can provide communication between the processing unit 2102, the power source 2112, the memory 2104, the input device(s) 2106, and the output device(s) 2110.

The processing unit 2102 can be implemented as any electronic device capable of processing, receiving, or transmitting data or instructions. For example, the processing unit 2102 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 2100 can be controlled by multiple processing units. For example, select components of the electronic device 2100 (e.g., an input device 2106) may be controlled by a first processing unit and other components of the electronic device 2100 (e.g., the display 2108) may be controlled by a second processing unit, where the first and second processing units may or may not be in communication with each other.

The power source 2112 can be implemented with any device capable of providing energy to the electronic device 2100. For example, the power source 2112 may be one or more batteries or rechargeable batteries. Additionally, or alternatively, the power source 2112 can be a power connector or power cord that connects the electronic device 2100 to another power source, such as a wall outlet.

The memory 2104 can store electronic data that can be used by the electronic device 2100. For example, the memory 2104 can store electronic data or content such as, for example, audio and video files, documents and applications, device settings and user preferences, timing signals, control signals, and data structures or databases. The memory 2104 can be configured as any type of memory. By way of example only, the memory 2104 can be implemented as random access memory, read-only memory, Flash memory, removable memory, other types of storage elements, or combinations of such devices.

In various embodiments, the display 2108 provides a graphical output, for example associated with an operating system, user interface, and/or applications of the electronic device 2100 (e.g., a chat user interface, an issue-tracking user interface, an issue-discovery user interface, etc.). In one embodiment, the display 2108 includes one or more sensors and is configured as a touch-sensitive (e.g., single-touch, multi-touch) and/or force-sensitive display to receive inputs from a user. For example, the display 2108 may be integrated with a touch sensor (e.g., a capacitive touch sensor) and/or a force sensor to provide a touch- and/or force-sensitive display. The display 2108 is operably coupled to the processing unit 2102 of the electronic device 2100.

The display 2108 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 2108 is positioned beneath and viewable through a cover that forms at least a portion of an enclosure of the electronic device 2100.

In various embodiments, the input devices 2106 may include any suitable components for detecting inputs. Examples of input devices 2106 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 2106 may be configured to detect one or more particular types of input and provide a signal (e.g., an input signal) corresponding to the detected input. The signal may be provided, for example, to the processing unit 2102.

As discussed above, in some cases, the input device(s) 2106 includes a touch sensor (e.g., a capacitive touch sensor) integrated with the display 2108 to provide a touch-sensitive display. Similarly, in some cases, the input device(s) 2106 includes a force sensor (e.g., a capacitive force sensor) integrated with the display 2108 to provide a force-sensitive display.

The output devices 2110 may include any suitable components for providing outputs. Examples of output devices 2110 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 2110 may be configured to receive one or more signals (e.g., an output signal provided by the processing unit 2102) and provide an output corresponding to the signal.

In some cases, input devices 2106 and output devices 2110 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 2102 may be operably coupled to the input devices 2106 and the output devices 2110. The processing unit 2102 may be adapted to exchange signals with the input devices 2106 and the output devices 2110. For example, the processing unit 2102 may receive an input signal from an input device 2106 that corresponds to an input detected by the input device 2106. The processing unit 2102 may interpret the received input signal to determine whether to provide and/or change one or more outputs in response to the input signal. The processing unit 2102 may then send an output signal to one or more of the output devices 2110, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A computer-implemented method for creating dynamic summaries for an issue tracking system, the method comprising:

causing display of a list of issues in a queue, each issue displayed in a row and comprising:

at least one selectable element that, in response to a user selection, redirects the user to an issue detail view for the issue associated with the selectable element; and an action count indicating activity for the issue;

in response to a first user input with respect to a designated region of a particular row in the list of issues, generating a first summary window, the generation of the first summary window comprising:

identifying an issue corresponding to the designated region of the particular row;

extracting first content from a set of fields corresponding to the issue;

generating a first prompt, comprising:

first predetermined text directed to a first command; and the extracted first content from the set of fields;

transmitting the first prompt to a generative output model; and in response to transmitting the first prompt to the generative output model, receiving a first generative response;

causing display of the first summary window over at least a portion of the list of issues in the queue, the first summary window comprising at least a portion of the first generative response;

in response to a second user input with respect to a particular group in the list of issues, generating a second prompt corresponding to a particular group, the second prompt comprising:

second predetermined text directed to a second command; and second content extracted from issues associated with the particular group;

transmitting the second prompt to the generative output model;

receiving a second generative response from the generative output model; and causing display of a second summary window associated with the particular group, the second summary window comprising at least a portion of the second generative response.

2. The computer-implemented method of claim 1, wherein:

extracting first content from the set of fields of the issue comprises:

extracting a description from a description field of the set of fields; and extracting state transitions for the issue; and the first generative response comprises a summary of the description and the state transitions.

3. The computer-implement method of claim 1, wherein:

extracting first content from the set of fields of the issue comprises extracting comments associated with the issue; and the first generative response comprises a summary of the extracted comments.

4. The computer-implemented method of claim 1, wherein:

the first generative response comprises one or more recommended actions; and the first summary window displays at least one of the one or more recommended actions.

5. The computer-implemented method of claim 1, wherein the first predetermined text directed to the first command comprises example input/output pairs.

6. The computer-implemented method of claim 1 further comprising:

receiving a selection of a grouping category at the issue tracking system;

assigning each issue in the list of issues to a group in accordance with the grouping category; and causing display of the list of issues in accordance with an assigned group.

7. The computer-implemented method of claim 1, wherein the second generative response comprises a ranking of urgency for the issues assigned to the particular group.

8. A computer-implemented method for creating dynamic summaries for groups of issues managed by an issue tracking system, the method comprising:

causing display of an interface comprising:

a list of issues in a queue, each issue displayed in a row and comprising at least one selectable element that, in response to a user selection, redirects the user to an issue detail view for the issue associated with the selectable element; and a selectable element for selecting a grouping category for the list of issues in the queue;

in response to a selection of a particular grouping category:

assigning each issue in the list of issues to a group in accordance with the grouping category; and causing the interface to display the list of issues in accordance with an assigned group for each issue;

in response to a user input, generating a summary window, the generation of the summary window comprising:

extracting content for each issue assigned to a particular group using the grouping category;

generating a prompt, comprising:

predetermined text directed to a command; and at least a portion of the extracted content corresponding to the issues assigned to the particular group;

transmitting the prompt to a generative output model; and in response to transmitting the prompt to the generative output model, receiving a generative response comprising a summary of a status of the grouping category for the issues assigned to the particular group; and cause display of the summary window over at least a portion the particular group, the summary window comprising at least a portion of the generative response.

9. The computer-implemented method of claim 8, wherein:

the grouping category comprises a priority assigned to issues in the list of issues;

the issues in the list of issues are assigned to the particular group in accordance with a priority associated with an issue; and the generative response comprises a priority ranking for issues assigned to the particular group.

10. The computer-implemented method of claim 8, wherein:

the grouping category comprises an assignee associated with issues in the list of issues;

the particular group comprises issues assigned to a particular assignee; and the generative response comprises a status for the issues assigned to the particular assignee.

11. The computer-implemented method of claim 8, further comprising in response to a second user input, displaying a second summary window for an issue associated with a particular row, wherein the second summary window comprises details associated with the issue.

12. The computer-implemented method of claim 11, wherein generating the second summary window comprises:

transmitting a second prompt to the generative output model;

receiving a second generative response; and causing display of the second summary window, the second summary window comprising at least a portion of the generative response.

13. A server system comprising:

a memory allocation defined by:

a data store storing one or more executable assets; and a working memory allocation;

a processor allocation configured to load the one or more executable assets from the data store and into the working memory allocation to instantiate an instance of a client application on a client device, the one or more executable assets configured to:

cause display of a list of issues in a queue, each issue displayed in a row and comprising at least one selectable element that, in response to a user selection, redirects the user to an issue detail view for the issue associated with the selectable element;

in response to a first user input with respect to a designated region of a particular row in the list of issues, generate a first summary window, the generation of the first summary window further configures the one or more executable assets to:

generate a first prompt, comprising:

first predetermined text directed to a first command; and first extracted content for a first the issue;

transmit the first prompt to a generative output model; and in response to transmitting the first prompt to the generative output model, receive a first generative response;

cause display of the first summary window, the first summary window comprising at least a portion of the first generative response;

in response to a second user input associated with a particular group of issues in the list of issues, generate a second prompt, comprising:

second predetermined text directed to a second command; and second extracted content for a second issue;

transmit the second prompt to the generative output model;

in response to transmitting the second prompt to the generative output model, receive a second generative response; and cause display of a second summary window, the second summary window comprising at least a portion of the second generative response.

14. The server system of claim 13, wherein the first issue is an issue corresponding to the designated region of the particular row.

15. The server system of claim 13, wherein the first summary window is displayed over the at least a portion of the issue in the list of issues.

16. The server system of claim 13, wherein the designated region comprises an action count summarizing events associated with an issue.

17. The server system of claim 13, wherein the events at least one of comprise status changes, comments, and approvals associated with the issue.

\* \* \* \* \*